(12) United States Patent
Suckeveriene

(10) Patent No.: US 12,479,977 B2
(45) Date of Patent: Nov. 25, 2025

(54) NANOCOMPOSITE PARTICLES AND METHODS OF MAKING AND USING SAME

(71) Applicant: KINNERET ACADEMIC COLLEGE, Zemach (IL)

(72) Inventor: Ran Suckeveriene, Karmiel (IL)

(73) Assignee: Kinneret Academic College, Tel Katzir (IL)

(*) Notice: Subject to any disclaimer, the term of this patent is extended or adjusted under 35 U.S.C. 154(b) by 0 days.

(21) Appl. No.: 18/282,014

(22) PCT Filed: Mar. 2, 2022

(86) PCT No.: PCT/IL2022/050231
§ 371 (c)(1),
(2) Date: Sep. 14, 2023

(87) PCT Pub. No.: WO2022/195575
PCT Pub. Date: Sep. 22, 2022

(65) Prior Publication Data
US 2024/0301172 A1   Sep. 12, 2024

(30) Foreign Application Priority Data

Mar. 17, 2021   (IL) .......................................... 281582

(51) Int. Cl.
C08K 9/04 (2006.01)
B05D 3/04 (2006.01)
(52) U.S. Cl.
CPC ................ *C08K 9/04* (2013.01); *B05D 3/046* (2013.01); *B05D 2401/50* (2013.01); *B05D 2601/22* (2013.01); *C08K 2201/011* (2013.01)

(58) Field of Classification Search
None
See application file for complete search history.

(56) References Cited

U.S. PATENT DOCUMENTS

| | | | |
|---|---|---|---|
| 2002/0160196 A1* | 10/2002 | Carr | B01J 20/3078 |
| | | | 428/407 |
| 2011/0072967 A1 | 3/2011 | Wood et al. | |
| 2014/0334998 A1* | 11/2014 | Wood | B01J 20/3212 |
| | | | 428/36.1 |

FOREIGN PATENT DOCUMENTS

| | | |
|---|---|---|
| CN | 112126153 | 12/2020 |
| DE | 101 20 802 | 10/2002 |
| KR | 2015 0012614 | 2/2015 |
| KR | 2017 0121563 | 11/2017 |
| WO | WO 2009/027971 | 3/2009 |

OTHER PUBLICATIONS

Babaei M. et al.; "Promising gene delivery system based on polyetylenimine-modified silica nanoparticles"; published Jan. 27, 2017; Cancer Gene Therapy, vol. 24 pp. 156-164.

(Continued)

*Primary Examiner* — Michael P. Rodriguez
(74) *Attorney, Agent, or Firm* — PEARL COHEN ZEDEK LATZER BARATZ LLP

(57) ABSTRACT

A population of nanocomposite particles including nanoparticles and poly (ethylene imine) (PEI) grafted thereto. In some embodiments there is no intervening layer between the nanoparticles and the PEI. Methods of making and using nanocomposite particles are also disclosed.

20 Claims, 37 Drawing Sheets

(56) References Cited

OTHER PUBLICATIONS

Kapilov Buchman Y et al.;"Silica Nanoparticles and Polyethyleneimine (PEI)-Mediated Functionalization: A New Method of PEI Covalent Attachment for siRNA Delivery Applications"; published Nov. 4, 2013; Bioconjugate Chemistry, vol. 24, Issue 12, pp. 2076-2087.

Liu J et al.;"Preparation and characterization of ammonium-functionalized silica nanoparticle as a new adsorbent to remove methyl orange from aqueous solution"; published Nov. 10, 2012; Applied Surface Science, vol. 265, pp. 393-398.

Patel V. et al.;"Zinc Oxide Nanoparticles Supported Lipase Immobilization for Biotransformation in Organic Solvents: A Facile Synthesis of Geranyl Acetate, Effect of Operative Variables and Kinetic Study"; published Jan. 9, 2016; Applied Biochemistry and Biotechnology, vol. 178, pp. 1630-1651.

Wang T. et al.;"Potential application of functional porous Ti02 nanoparticles in light-controlled drug release and targeted drug delivery"; published Nov. 11, 2014; Acta Biomaterialia vol. 13, pp. 354-363.

Sunintaboon P et al., "Polyethyleneimine-functionalized poly (methyl methacrylate) colloidal nanoparticles for directly coating natural rubber sheet", Colloids and Surfaces A: Physiochemical and Engineering Aspects, Elsevier, Amsterdam, NL, vol. 350 No. 1-3, Oct. 20, 2009 (Oct. 20, 2009), pp. 114-120, XP026675445.

Shan Changsheng et al., "Polyethyleneimine-functionalized graphene and its layer-by-layer assembly with Prussian blue", Thin Solid Films, vol. 534, Feb. 15, 2013, pp. 572-576, XP093269023.

Shao Leishan et al: "PVA/polyethyleneimine-functionalized graphene composites with optimized properties", Materials & Design, vol. 99, May 9, 2016, pp. 235-242, XP093269028.

Watanabe Kanako et al., "Polyethylenimine-assisted synthesis of hollow silica spheres without shame deformation", Materials Chemistry and Physics, vol. 262, Jan. 13, 2021, p. 124267, XP093269326.

Swasy Maria et al., Poly (amine) modified kaolinite clay for VOC capture; Chemosphere, Pergamon Press, Oxford GB vol. 213, published Sep. 4, 2018.

\* cited by examiner

NANOCOMPOSITE PARTICLES AND METHODS OF MAKING AND USING SAME

CROSS-REFERENCE TO RELATED APPLICATIONS

This application is a National Phase Application of PCT International Application No. PCT/IL2022/050231, International Filing Date Mar. 2, 2022, claiming the benefit of Israeli Patent Application No. 281582, filed Mar. 17, 2021, which are hereby incorporated by reference by their entirety.

ACKNOWLEDGEMENT

This study was done as part of the CIRCLE consortium. The CIRCLE consortium is supported by the Technology Infrastructure Division of the Israel Innovation Authority.

FIELD OF THE INVENTION

The invention is in the field of nanoparticles.

BACKGROUND OF THE INVENTION

Plastic waste production in 2018 was approximately 360 million tons worldwide and it continues to rise. About 40% of plastic waste is converted to energy, mainly via combustion reactions. Only 15% of plastic waste is being recycled. Much of the remaining 45% of plastic waste is sent to landfills.

Recycling is more appealing from both economic and environmental standpoints. The demand for plastic packaging continues to increase while raw materials for production of "virgin" plastic are dwindling. Recycled packaging waste has the potential to contribute to a circular economy.

Unfortunately, recycled plastics from household waste have the potential to release more than 70 volatile compounds including aromatics (e.g. limonene). These compounds are referred to in general as "volatile organic compounds" or "VOCs" Volatile compounds (including VOCs) released by plastics are typically characterized/measured by gas chromatography-olfactometry (GC-O). GC-O relies on gas chromatography analysis to identify compounds responsible for odors augmented by human sensory perception. GC-O provides a correspondence between odor-active components molecular structure and human perception. GC-O has established that extrusion during recycling generates new aromas. In GC-O, gas chromatography mass spectroscopy (GCMS) is supplemented by results from a human "odor panel" of people that "sniff" the samples.

In addition microbial contamination organic matter which plastic waste has been in contact and/or fillers used in recycling can contribute to unwanted odors.

Alternatively or additionally, factors such as light, heat and irradiation can alter chemical and physical properties of polymers and cause emission of odorous materials.

In some cases fragrances are used to mask unwanted odors in plastics. In addition, odor reducing additives have been developed. For example, a graphene aerogel (GA) has been developed. GA is supposed to absorb VOCs.

SUMMARY OF THE INVENTION

A broad aspect of the invention relates reducing odors.

One aspect of some embodiments of the invention relates to poly (ethylene imine) (PEI) grafted to nanoparticles. In some embodiments the grafting is direct, meaning there is no pretreatment of the nanoparticle with another material prior to attachment of PEI. According to various exemplary embodiments of the invention the nanoparticles comprise fumed silica (hydrophilic and/or hydrophobic) and/or methacrylic silica and/or aluminum oxide (Al2O3) and/or zinc oxide (ZnO) and/or zeolite and/or titanium dioxide ($TiO_2$) and/or carbon nanotubes and/or graphene and/or carbon black. According to various exemplary embodiments of the invention the nanoparticles have an average size of at least 5 nm, at least 10 nm, at least 15 nm, at least 20 nm, at least 30 nm, at least 40 nm, at least 50 nm, at least 60 nm, at least 70 nm, at least 80 nm, at least 90 nm, at least 100 nm or intermediate or greater sizes. Alternatively or additionally, according to various exemplary embodiments of the invention the nanoparticles have an average size less than 200 nm, less than 100 nm, less than 90 nm, less than 80 nm, 70 nm, less than 60 nm, less than 50 nm, less than 40 nm, 30 nm, less than 25 nm, less than 20 nm, less than 15 nm, than 12 nm, less than 10 nm or intermediate or smaller sizes. According to various exemplary embodiments of the invention the PEI has a molecular weight of at least 600 g/mole, at least 1000 g/mole, at least 5000 g/mole, at least 10,000 g/mole, at least 15,000 g/mole, at least 20,000 g/mole, at least 25,000 g/mole, at least 10,000 g/mole, at least 15,000 g/mole, at least 20,000 g/mole, at least 25,000 g/mole, at least 30,000 g/mole, at least 35,000 g/mole, at least 40,000 g/mole, at least 45,000 g/mole, at least 50,000 g/mole, at least 55,000 g/mole, at least 60,000 g/mole, at least 65,000 g/mole, at least 70,000 g/mole, at least 75,000 g/mole, at least 70,000 g/mole, at least 75,000 g/mole, at least 80,000 g/mole, at least 85,000 g/mole, at least 90,000 g/mole, at least 95,000 g/mole, at least 190,000 g/mole, at least 290,000 g/mole, at least 390,000 g/mole, at least 490,000 g/mole, at least 590,000 g/mole, at least 690,000 g/mole or intermediate or greater molecular weights. Alternatively or additionally, according to various exemplary embodiments of the invention the PEI has a molecular weight less than 755,000 g/mole, less than 650,000 g/mole, less than 550,000 g/mole, less than 95,000 g/mole, less than 85,000 g/mole, less than 80,000 g/mole, less than 75,000 g/mole, less than 70,000 g/mole, less than 65,000 g/mole, less than 60,000 g/mole, less than 55,000 g/mole, less than 50,000 g/mole, less than 45,000 g/mole, less than 40,000 g/mole, less than 35,000 g/mole, less than 30,000 g/mole, less than 25,000 g/mole, less than 20,000 g/mole, less than 15,000 g/mole, less than 10,000 g/mole, less than 5,000 g/mole, less than 4,000 g/mole, less than 4,000 g/mole, less than 4,000 g/mole, less than 1,000 g/mole or intermediate or lower molecular weights. Alternatively or additionally, according to various exemplary embodiments of the invention the PEI is linear or branched.

Another aspect of some embodiments of the invention relates to use of sonication to graft poly (ethylene imine) (PEI) to nanoparticles. According to various exemplary embodiments of the invention the nanoparticles are as described above. According to various exemplary embodiments of the invention the amount of PEI relative to nanoparticles is at least 0.1%, at least 0.25%, at least 0.5%, at least 1%, at least 2.5%, at least 5%, at least 10%, at least 20%, at least 30%, at least 60%, at least 100%, at least 150%, at least 200% or at least 300% on a W/W basis or intermediate or higher percentages. Alternatively or additionally, according to various exemplary embodiments of the invention the amount of PEI relative to nanoparticles is less than 400%, less than 300%, less than 200%, less than 150%, less than 100%, less than 60%, less than 30%, less than 20%, or less than 10% on a W/W basis or intermediate or lower percentages. In some exemplary embodiments of the invention, addition of benzoyl peroxide (BP) during the sonication contributes to initiation of grafting of the PEI to the nanoparticles. In some embodiments BP provides free radicals. In some exemplary embodiments of the invention, nanoparticles are sonicated in a liquid carrier to form a suspension prior to grafting of PEI. According to various exemplary embodiments of the invention the amount of BP relative to nanoparticles is at least 0.1%, at least 0.25%, at least 0.5%, at least 1%, at least 1.5%, at least 2%, at least 3% or intermediate or greater percentages on a W/W basis. Alternatively or additionally, according to various exemplary embodiments of the invention the amount of BP relative to nanoparticles is less than 5%, less than 4%, less than 3%, less than 2%, less than 1.5%, less than 1%, less than 0.5%, less than 0.25%, less than 0.15% or intermediate or lower percentages.

A further aspect of some embodiments of the invention relates to incorporation of nanoparticles with PEI grafted to their surface as described above into polymeric materials. In some embodiments the incorporation occurs during, or prior to, a manufacturing process. According to various exemplary embodiments of the invention the polymeric material includes virgin material and/or recycled material. In some embodiments incorporation of nanoparticles with PEI grafted to their surface contributes to a reduction in odors emanating from the polymeric material(s) and/or from fillers and/or additives included therein.

A further additional aspect of some embodiments of the invention relates to application of nanoparticles with PEI grafted to their surface as described above to a surface of a product. In some embodiments application of nanoparticles with PEI grafted to their surface to a surface of a product contributes to a reduction in odors emanating from the product.

It will be appreciated that the various aspects described above relate to solution of technical problems associated with production of PEI coated nanoparticles.

Alternatively or additionally, it will be appreciated that the various aspects described above relate to solution of technical problems related to reduction of odors emanating from various types of products and/or various types of waste and/or from polymeric materials used in their production and/or from fillers in polymeric materials and/or from gasses.

In some exemplary embodiments of the invention there is provided a population of nanocomposite particles including: (a) hydrophilic fumed silica nanoparticles; and (b) poly (ethylene imine) (PEI) grafted thereto; wherein there is no intervening layer between the nanoparticles and the PEI.

In some exemplary embodiments of the invention there is provided a population of nanocomposite particles including: (a) hydrophobic fumed silica nanoparticles; and (b) poly (ethylene imine) (PEI) grafted thereto.

In some exemplary embodiments of the invention there is provided a population of nanocomposite particles including: (a) methacrylic silica nanoparticles; and (b) poly (ethylene imine) (PEI) grafted thereto.

In some exemplary embodiments of the invention there is provided a population of nanocomposite particles including: (a) aluminum oxide (Al2O3) nanoparticles; and (b) poly (ethylene imine) (PEI) grafted thereto.

In some exemplary embodiments of the invention there is provided a population of nanocomposite particles including: (a) zinc oxide (ZnO) nanoparticles; and (b) poly (ethylene imine) (PEI) grafted thereto.

In some exemplary embodiments of the invention there is provided a population of nanocomposite particles including: (a) zeolite nanoparticles; and (b) poly (ethylene imine) (PEI) grafted thereto.

In some exemplary embodiments of the invention there is provided a population of nanocomposite particles including: (a) titanium dioxide ($TiO_2$) nanoparticles; and (b) poly (ethylene imine) (PEI) grafted thereto.

In some exemplary embodiments of the invention there is provided a population of nanocomposite particles including: (a) carbon nanotube nanoparticles; and (b) poly (ethylene imine) (PEI) grafted thereto.

In some exemplary embodiments of the invention there is provided a population of nanocomposite particles including: (a) graphene nanoparticles; and (b) poly (ethylene imine) (PEI) grafted thereto.

In some exemplary embodiments of the invention there is provided a population of nanocomposite particles including: (a) carbon black nanoparticles; and (b) poly (ethylene imine) (PEI) grafted thereto.

With respect to each of the populations of nanocomposite particles defined above:

In some embodiments the population of nanocomposite particles as set forth above has no intervening layer between the nanoparticles and the PEI. Alternatively or additionally, in some embodiments the population of nanocomposite particles as set forth above has nanoparticles with an average size of 5-100 nm. Alternatively or additionally, in some embodiments the population of nanocomposite particles as set forth above has a molecular weight of the PEI of at least 600 g/mole. Alternatively or additionally, in some embodiments the population of nanocomposite particles as set forth above has a molecular weight of the PEI less than or equal to 100,000 g/mole.

In some exemplary embodiments of the invention there is provided a an organic solvent (e.g. ethanol) including: (a) adding at least 5% poly(ethylene imine) (PEI) relative to nanoparticles dispersed in ethanol on a W/W basis; (b) adding at least 0.1% benzoyl peroxide (BP) relative to the nanoparticles on a W/W basis; and (c) sonicating. In some embodiments the method includes sonicating nanoparticles in the organic solvent (e.g. ethanol). Alternatively or additionally, in some embodiments the nanoparticles include fumed silica and/or methacrylic silica and/or aluminum oxide (Al2O3) and/or ZnO and/or zeolites and/or $TiO_2$ and/or carbon nanotubes and/or graphene and/or carbon black. Alternatively or additionally, in some embodiments the method includes adding at least 30% PEI relative to nanoparticles. Alternatively or additionally, in some embodiments the method includes adding at least 100% PEI relative to nanoparticles. Alternatively or additionally, in some embodiments the method includes adding at least 1% BP relative to nanoparticles. Alternatively or additionally, in some embodiments the method includes adding at least 2% BP relative to nanoparticles. Alternatively or additionally, in some embodiments the method includes washing the nanoparticles with ethanol and/or another organic solvent. Alternatively or additionally, in some embodiments the method includes extracting non-grafted PEI with xylene. Alternatively or additionally, in some embodiments the method includes cooling the ethanol (or other solvent) to 4° C. during the sonication. Alternatively or additionally, in some embodiments the method includes incubating at room temperature overnight.

In some exemplary embodiments of the invention there is provided a method including: (a) premixing nanoparticles coated with PEI with polymeric material to form a premix;

(b) mixing additional polymeric material with the premix to form a final mixture; and (c) extruding the final mixture. In some embodiments the polymeric material and/or additional polymeric material are being recycled. Alternatively or additionally, in some embodiments the method includes adding filler during the mixing. Alternatively or additionally, in some embodiments the method includes adding filler during the extruding. Alternatively or additionally, in some embodiments the polymeric material and the additional polymeric material each independently include at least one material selected from the group consisting of polyvinyl chloride (PVC), Polyethylene (PE, LDPE, HDPE, PEX), polypropylene (PP), polycarbonate (PC), polyamide (PA), polyacrylate, polymethacrylate (PAM), polystyrene (PS), Ethylene vinyl alcohol (EVOH), Ethylene-vinyl acetate (EVA), Isoprene, styrene-isoprene-styrene (SIS) block copolymer, butadiene and Acrylonitrile butadiene styrene (ABS). Alternatively or additionally, in some embodiments the final mixture includes at least 0.01% (W/W) nanoparticles coated with PEI. Alternatively or additionally, according to various exemplary embodiments of the invention the final mixture includes 25% (W/W) or less nanoparticles coated with PEI. Additional embodiments of the invention relate to a product produced by a method as set forth above.

In some exemplary embodiments of the invention there is provided a method including: (a) dispersing nanoparticles coated with PEI in a liquid media to produce a suspension; (b) applying the suspension to a surface of a product; and (c) evaporating the liquid media. In some embodiments the method includes gelation of the liquid media. Alternatively or additionally, in some embodiments the liquid media includes water. Alternatively or additionally, in some embodiments the liquid media includes an organic solvent. Alternatively or additionally, in some embodiments the organic solvent includes ethanol. Alternatively or additionally, in some embodiments the nanoparticles coated with PEI include at least one member of the group consisting of silica nanoparticles, methacrylic silica nanoparticles, aluminum oxide ($Al_2O_3$) nanoparticles, ZnO nanoparticles, Zeolite nanoparticles, $TiO_2$ nanoparticles, Carbon nanotube nanoparticles and graphene nanoparticles. Alternatively or additionally, in some embodiments the nanoparticles coated with PEI are present in the liquid media at a concentration of at least 0.01% W/V. Alternatively or additionally, in some embodiments the applying includes at least one action selected from the group consisting of spraying, brushing, daubing, rolling, smear coating and dipping. Alternatively or additionally, in some embodiments the product includes at least one material selected from the group consisting of polyvinyl chloride (PVC), Polyethylene (PE, LDPE, HDPE, PEX), polypropylene (PP), polycarbonate (PC), polyamide (PA), polyacrylate, polymethacrylate (PAM), polystyrene (PS), high-density polystyrene (HIPS), Ethylene vinyl alcohol (EVOH), Ethylene-vinyl acetate (EVA), Isoprene, styrene-isoprene-styrene (SIS) block copolymer, butadiene and Acrylonitrile butadiene styrene (ABS).

Unless otherwise defined, all technical and scientific terms used herein have the same meaning as commonly understood by one of ordinary skill in the art to which this invention belongs. Although suitable methods and materials are described below, methods and materials similar or equivalent to those described herein can be used in the practice of the present invention. In case of conflict, the patent specification, including definitions, will control. All materials, methods, and examples are illustrative only and are not intended to be limiting.

As used herein, the terms "comprising" and "including" or grammatical variants thereof are to be taken as specifying inclusion of the stated features, integers, actions or components without precluding the addition of one or more additional features, integers, actions, components or groups thereof. This term is broader than, and includes the terms "consisting of" and "consisting essentially of" as defined by the Manual of Patent Examination Procedure of the United States Patent and Trademark Office. Thus, any recitation that an embodiment "includes" or "comprises" a feature is a specific statement that sub embodiments "consist essentially of" and/or "consist of" the recited feature.

The phrase "consisting essentially of" or grammatical variants thereof when used herein are to be taken as specifying the stated features, integers, steps or components but do not preclude the addition of one or more additional features, integers, steps, components or groups thereof but only if the additional features, integers, steps, components or groups thereof do not materially alter the basic and novel characteristics of the claimed composition, device or method.

The phrase "adapted to" as used in this specification and the accompanying claims imposes additional structural limitations on a previously recited component.

The term "method" refers to manners, means, techniques and procedures for accomplishing a given task including, but not limited to, those manners, means, techniques and procedures either known to, or readily developed from known manners, means, techniques and procedures by practitioners of architecture and/or computer science.

Percentages (%) are W/W (weight per weight) unless otherwise indicated.

Indicated molecular weights are based on product data sheets supplied by manufacturers but may vary according to actual measurement conditions.

BRIEF DESCRIPTION OF THE DRAWINGS

In order to understand the invention and to see how it may be carried out in practice, embodiments will now be described, by way of non-limiting example only, with reference to the accompanying figures. In the figures, identical and similar structures, elements or parts thereof that appear in more than one figure are generally labeled with the same or similar references in the figures in which they appear. Dimensions of components and features shown in the figures are chosen primarily for convenience and clarity of presentation and are not necessarily to scale. The attached figures are.

DETAILED DESCRIPTION OF EMBODIMENTS

Figure 1:
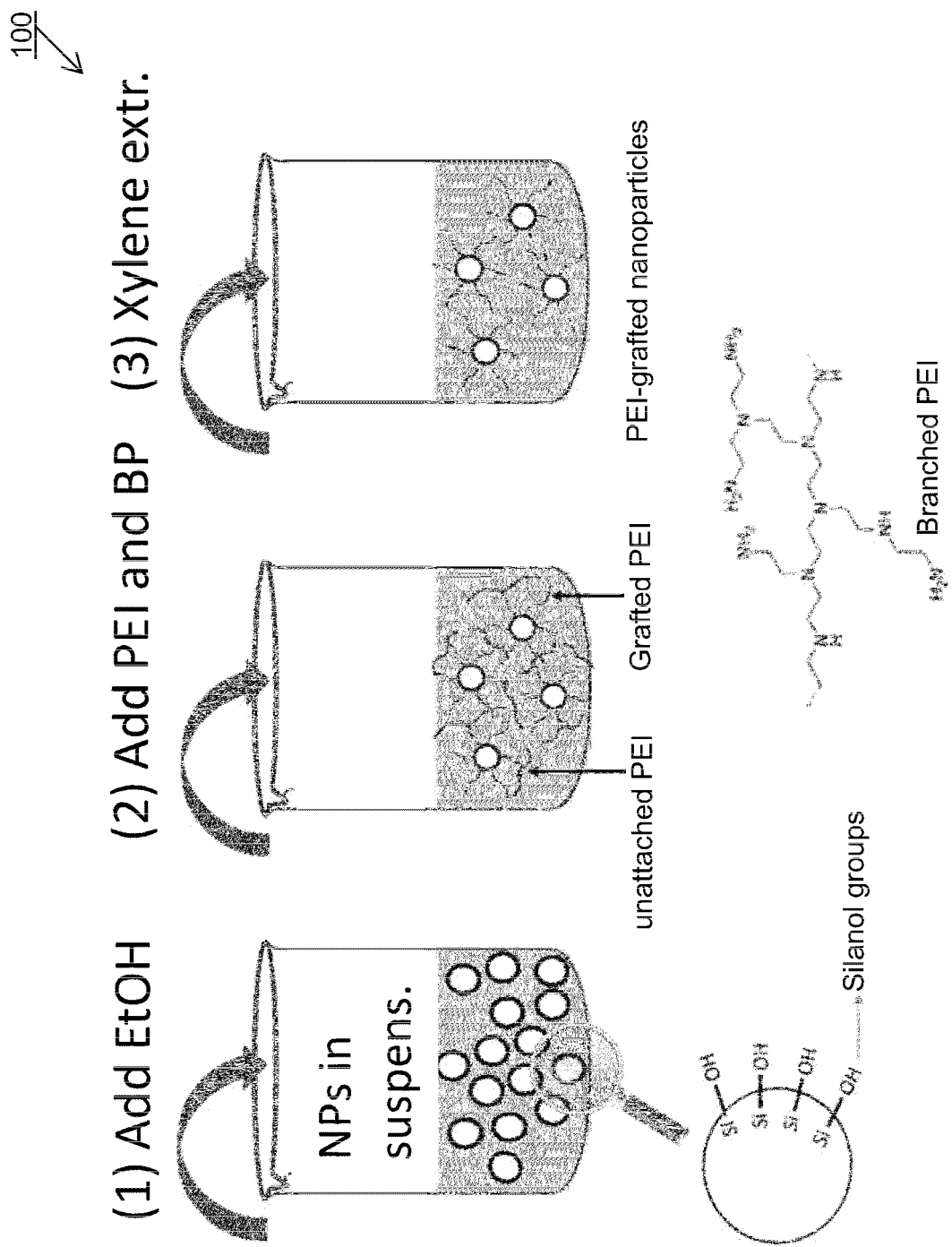
FIG. 1 is schematic overview of a process for formation of nanocomposite particles according to some exemplary embodiments of the invention.

Embodiments of the invention relate to nanocomposite particles and methods of producing and using them Specifically, some embodiments of the invention can be used to directly graft PEI to nanoparticles without an intervening layer. Alternatively or additionally, in some embodiments nanoparticles coated with PEI (whether by direct grafting or another method) exhibit a greater capacity for odor reduction than PEI alone or nanoparticles alone.

The principles and operation of coated nanoparticles and/or ds according to exemplary embodiments of the invention may be better understood with reference to the drawings and accompanying descriptions.

Before explaining at least one embodiment of the invention in detail, it is to be understood that the invention is not limited in its application to the details set forth in the following description or exemplified by the Examples. The invention is capable of other embodiments or of being practiced or carried out in various ways. Also, it is to be understood that the phraseology and terminology employed herein is for the purpose of description and should not be regarded as limiting.

Exemplary Nanocomposite Particles

Some exemplary embodiments of the invention relate to a population of nanocomposite particles including hydrophilic fumed silica nanoparticles and poly (ethylene imine) (PEI) grafted thereto. According to these embodiments there is no intervening layer between the nanoparticles and the PEI. Exemplary nanoparticles suitable for use in these embodiments include AEROSIL 200 and AEROSIL® 300 and AEROSIL 300/30 (EVONIK, Germany).

Some exemplary embodiments of the invention relate to a population of nanocomposite particles including hydrophobic fumed silica nanoparticles and poly (ethylene imine) (PEI) grafted thereto. Exemplary nanoparticles suitable for use in these embodiments include AEROSIL R972 (hydrophobic, 16 nm in size, EVONIK, Germany).

Some exemplary embodiments of the invention relate to a population of nanocomposite particles including methacrylic silica nanoparticles and poly (ethylene imine) (PEI) grafted thereto. Exemplary nanoparticles suitable for use in these embodiments include AEROSIL R711 (12 nm in size, EVONIK, Germany).

Some exemplary embodiments of the invention relate to a population of nanocomposite particles including aluminum oxide (Al2O3) nanoparticles and poly (ethylene imine) (PEI) grafted thereto. Exemplary nanoparticles suitable for use in these embodiments include Aeroxide Alu C (Al2O3, EVONIK, Germany).

Some exemplary embodiments of the invention relate to a population of nanocomposite particles including zinc oxide (ZnO) nanoparticles and poly (ethylene imine) (PEI) grafted thereto. Exemplary nanoparticles suitable for use in these embodiments include AEROSIL R972 (hydrophobic, 16 nm in size, EVONIK, Germany).

Some exemplary embodiments of the invention relate to a population of nanocomposite particles including zeolite nanoparticles and poly (ethylene imine) (PEI) grafted thereto. Exemplary nanoparticles suitable for use in these embodiments include Zeoflair 100, Zeoflair 110, Zeoflair 800, (Each by ZEOCHEM, USA) and ZSM 5 (Zeolyst, USA).

Some exemplary embodiments of the invention relate to a population of nanocomposite particles including titanium dioxide ($TiO_2$) nanoparticles and poly(ethylene imine) (PEI) grafted thereto. Exemplary nanoparticles suitable for use in these embodiments include Aeroxide P25. (EVONIK, Germany).

Some exemplary embodiments of the invention relate to a population of nanocomposite particles including carbon nanotube nanoparticles or Carbon Black and poly(ethylene imine) (PEI) grafted thereto. Exemplary carbon nanotube nanoparticles suitable for use in these embodiments include NC7000 (Nanocyl SA, Belgium) and Tuball SWNT (OCSIAL, Luxemburg).

Exemplary carbon black nanoparticles suitable for use in these embodiments include Ketjenblack EC-300 and EC-600 (Nouryon, The Netherlands)

Some exemplary embodiments of the invention relate to a population of nanocomposite particles including graphene nanoparticles and poly (ethylene imine) (PEI) grafted thereto.
Exemplary nanoparticles suitable for use in these embodiments include reduced graphene oxide or Graphene 300 (Sigma Aldrich; St. Louis MO, USA).

In some exemplary embodiments of the various nanocomposite particles set forth above, there is no intervening layer between said nanoparticles and said PEI. In some exemplary embodiments of the various nanocomposite particles set forth above the nanoparticles have an average size of 5-100 nm prior to PEI grafting. According to various exemplary embodiments of the invention the PEI adds 1 nm to 15 nM max.

In some exemplary embodiments of the various nanocomposite particles set forth above, a molecular weight of the PEI is at least 600 g/mole. Alternatively or additionally, in some embodiments a molecular weight of the PEI does not exceed 100,000 g/mole.

Exemplary Production Method

Figure 2:
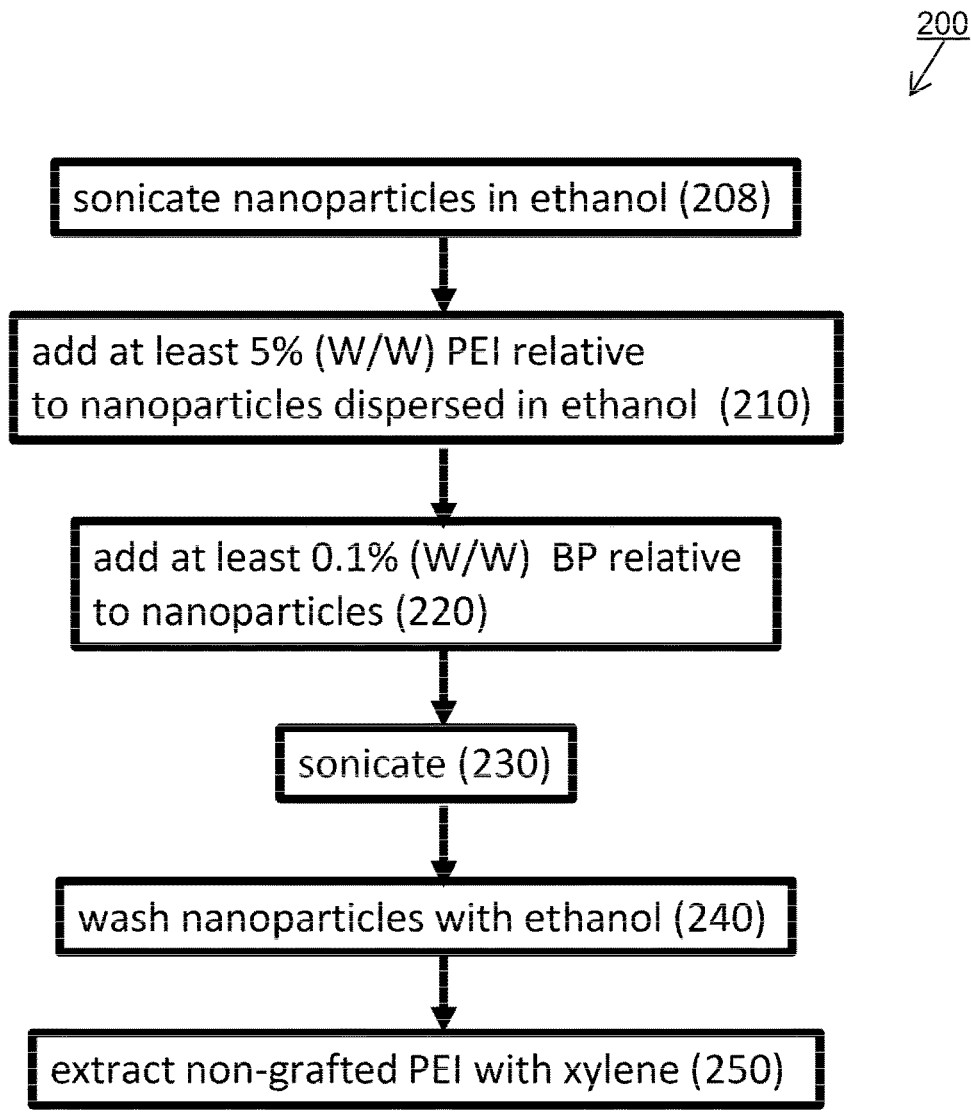
FIG. 2 is a simplified flow diagram of a method for producing nanocomposite particles according to some exemplary embodiments of the invention.

FIG. 2 is a simplified flow diagram of a method, indicated generally as 200, for producing nanocomposite particles according to some exemplary embodiments of the invention.

Depicted exemplary method 200 includes adding 210 at least 5% poly(ethylene imine) (PEI) relative to nanoparticles dispersed in ethanol on a W/W basis and adding 220 at least 0.1% benzoyl peroxide (BP) relative to said nanoparticles on a W/W basis and sonicating 230. In some exemplary embodiments of the invention, sonication 230 contributes to grafting of PEI to particles. Alternatively or additionally, in some embodiments BP donates free radicals which contribute to initiation of the grafting reaction. According to additional exemplary embodiments of the invention nanoparticles are dispersed in other organic solvents instead of ethanol. According to various exemplary embodiments of the invention suitable solvents include but are not limited to toluene, xylene, methanol, isopropyl alcohol and propanol.

In some exemplary embodiments of the invention, the initial dispersion of 210 is achieved by sonicating 208 nanoparticles in an organic solvent (e.g. ethanol). In some embodiments the sonication contributes to dispersion.

In some exemplary embodiments of the invention, the nanoparticles include fumed silica (hydrophobic and/or hydrophilic). Alternatively or additionally, in some embodiments the nanoparticles include methacrylic silica. Alternatively or additionally, in some embodiments the nanoparticles include aluminum oxide (Al2O3). Alternatively or additionally, in some embodiments the nanoparticles include ZnO (hydrophobic and/or hydrophilic). Alternatively or additionally, in some embodiments the nanoparticles include zeolites. Alternatively or additionally, in some embodiments the nanoparticles include $TiO_2$. Alternatively or additionally, in some embodiments the nanoparticles include carbon nanotubes. Alternatively or additionally, in some embodiments the nanoparticles include graphene. Alternatively or additionally, in some embodiments the nanoparticles include carbon black.

In some exemplary embodiments of the invention, the method includes adding at least 30% or at least 100% PEI relative to nanoparticles. According to various exemplary embodiments of the invention the amount of PEI added ranges from 0.1% to 500% as described hereinabove.

In some exemplary embodiments of the invention, the method includes adding at least 1% BP or at least 3% BP relative to nanoparticles. According to various exemplary embodiments of the invention the amount of BP added ranges from 0.1% to 3% as described hereinabove.

In the depicted embodiment, method 200 includes washing 240 the nanoparticles with ethanol. According to various exemplary embodiments of the invention ethanol wash 240 is accomplished with vacuum filtration and/or centrifugation and/or evaporation. Ethanol wash 240 contributes to a reduction in BP and/or unbound PEI. Alternatively or additionally, in some embodiments method 200 includes extracting 250 non-grafted PEI with xylene. According to various exemplary embodiments of the invention xylene extraction 250 is done for 2 to 12 hrs.; 4 to 10 hrs., 5 to 8 hrs.; or 6.5 to 7.5 hrs. In some embodiments hot xylene is used. Alternatively or additionally, in some embodiments method 200 includes cooling said ethanol to 4° C. during sonication 230 and/or 208. Alternatively or additionally, in some embodiments method 200 includes incubating at room temperature overnight after sonication 230. In some embodiments this incubation contributes to an increase in the amount of PEI grafted.

Exemplary Method of Use

Figure 3:
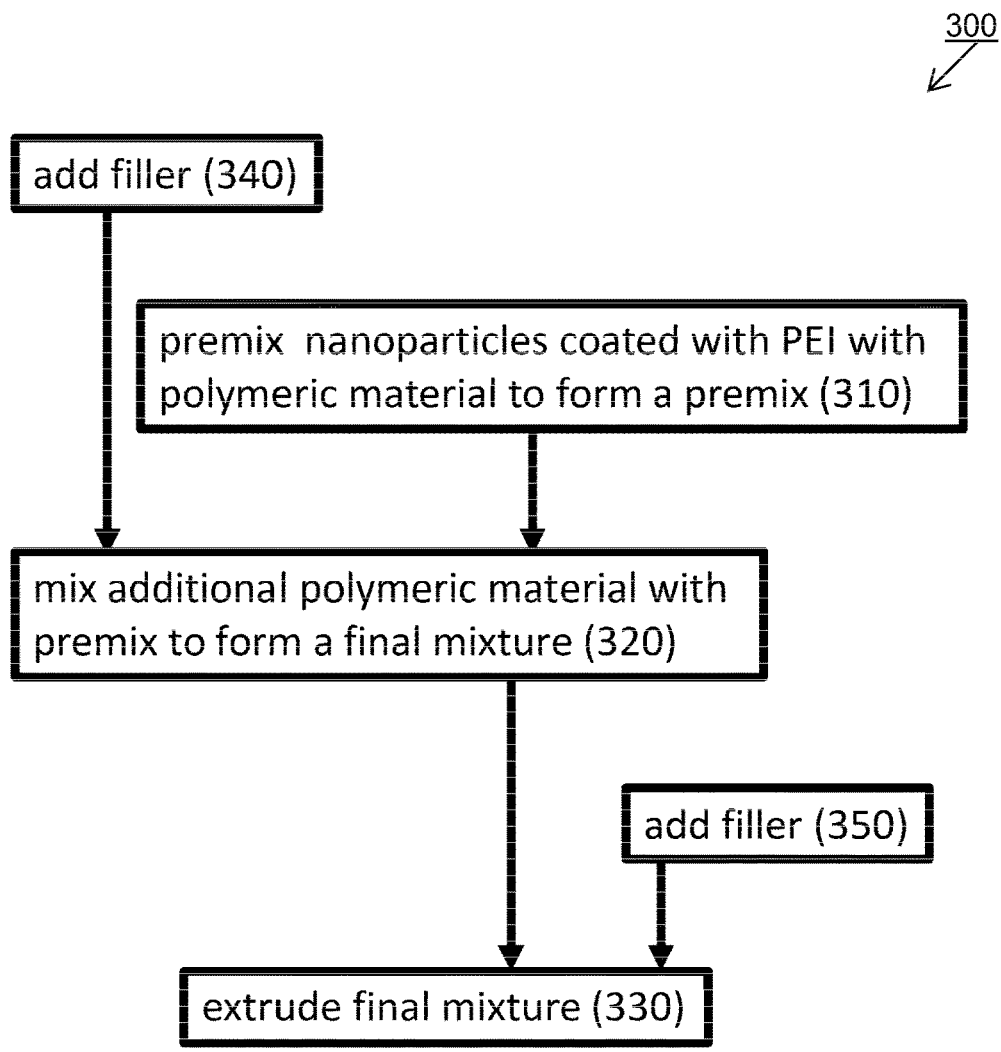
FIG. 3 is a simplified flow diagram of a method for incorporating nanocomposite particles into polymeric material according to some exemplary embodiments of the invention.

FIG. 3 is a simplified flow diagram of a method, indicated generally as 300, for incorporating nanocomposite particles into polymeric material according to some exemplary embodiments of the invention.

Depicted exemplary method 300 includes premixing 310 nanoparticles coated with PEI with polymeric material to form a premix and mixing 320 additional polymeric material with the premix to form a final mixture. In the depicted embodiment, method 300 includes extruding 330 the final mixture. In some exemplary embodiments of the invention, mixing 320 and/or premixing 310 include dry blending. According to various exemplary embodiments of the invention extrusion 330 is extrusion to a desired concentration or extrusion to concentrate followed by dilution.

In some embodiments of method 300, the polymeric material and/or additional polymeric material are being recycled. Alternatively or additionally, in some embodiments the nanoparticles coated with PEI are those described hereinabove and/or resulting from method 200 described hereinabove.

In the depicted embodiment, method 300 includes adding filler 340 during mixing 320. Alternatively or additionally, in some embodiments method 300 includes adding filler 350 during extruding 330. In some embodiments the filer includes non-polymeric material (e.g. ceramic or mineral).

In some exemplary embodiments of the invention, the polymeric material at 310 and the additional polymeric material 320 each independently include at least one material selected from the group consisting of polyvinyl chloride (PVC), Polyethylene (PE, LDPE, HDPE, PEX), polypropylene (PP), polycarbonate (PC), polyamide (PA), polyacrylate, polymethacrylate (PAM), polystyrene (PS), high-impact polystyrene (HIPS), Ethylene vinyl alcohol (EVOH), Ethylene-vinyl acetate (EVA), Isoprene, styrene-isoprene-styrene (SIS) block copolymer, butadiene and Acrylonitrile butadiene styrene (ABS).

In some exemplary embodiments of the invention, the final mixture produced at 310 includes at least 0.01% (W/W) nanoparticles coated with PEI. Alternatively or additionally, in some embodiments the final mixture produced at 310 includes at 25% (W/W) or less nanoparticles coated with PEI. According to various exemplary embodiments of the invention the final mixture produced at 310 includes at least 0.05%, at least 0.1%, at least 0.25%, at least 0.5%, at least 0.75%, at least 1%, at least 2%, at least 4%, at least 6%, at least 8%, at least 10% or intermediate or higher percentages. Alternatively or additionally, according to various exemplary embodiments of the invention the final mixture produced at 310 includes less than 10%, less than 8%, less than 10%, less than 8%, less than 6%, less than 4%, less than 2%, less than 1%, less than 0.75%, less than 0.5%, less than 0.4%, less than 0.3%, less than 0.2%, less than 0.1% or intermediate or lower percentages.

According to various exemplary embodiments of the invention the extruded final mixture produced at 330 is used in one or more industrial processes including but not limited to injection molding, blow molding, woven mats, rotational molding, additive manufacturing and vacuum molding.

Other exemplary embodiments of the invention, relate to any product produced by method 300 or variants thereof.

Additional Exemplary Method of Use

Figure 4:
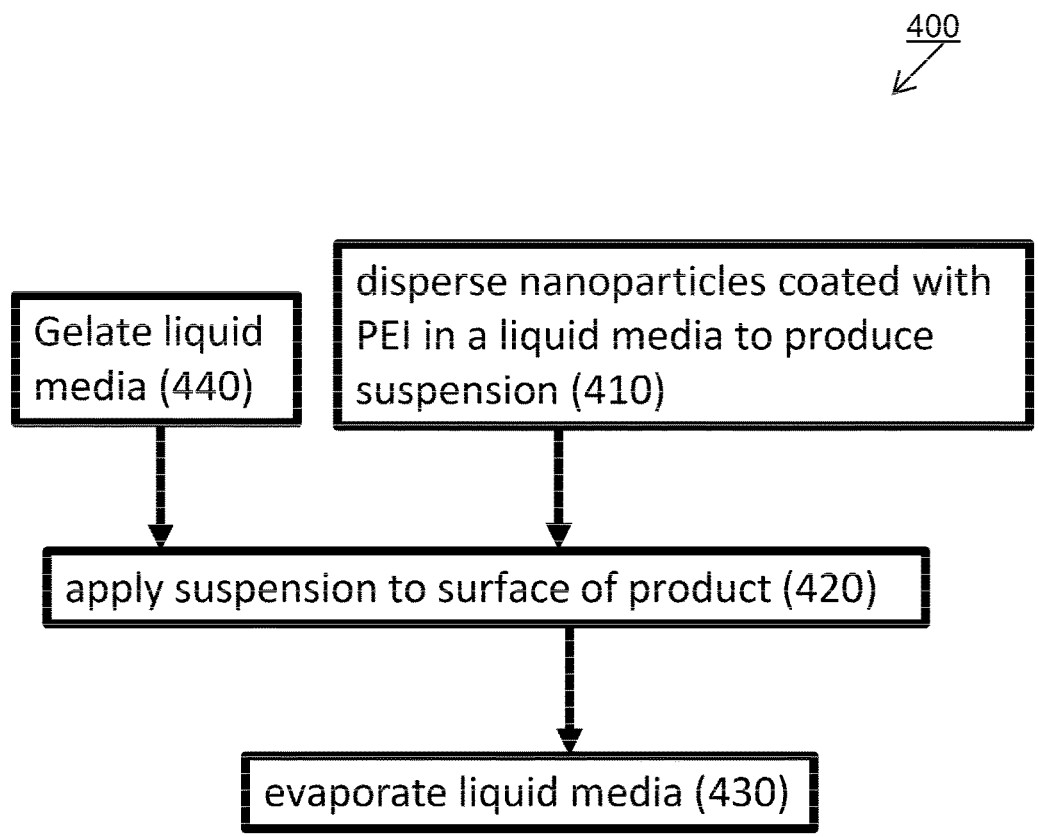
FIG. 4 is a simplified flow diagram of a method for applying nanocomposite particles to the surface of a product according to some exemplary embodiments of the invention.

FIG. 4 is a simplified flow diagram of a method, indicated generally as 400, for applying nanocomposite particles to the surface of a product according to some exemplary embodiments of the invention.

Depicted exemplary method 400 includes dispersing 410 nanoparticles coated with PEI in a liquid media to produce a suspension. In some embodiments, the nanoparticles coated with PEI are those described hereinabove and/or resulting from method 200 described hereinabove.

In the depicted embodiment, method 400 includes applying 420 the suspension to a surface of a product and evaporating 430 the liquid media. Alternatively or additionally, in some embodiments method 400 includes gelation 440 of the liquid media. In some exemplary embodiments of the invention, gelation includes crosslinking of polymers and/or hydrogels. In some exemplary embodiments of the invention, the liquid media includes water. Alternatively or additionally, in some embodiments the liquid media includes an organic solvent. In some exemplary embodiments of the invention, the organic solvent includes ethanol.

According to various exemplary embodiments of the invention the nanoparticles coated with PEI include at least one member of the group consisting of silica nanoparticles, methacrylic silica nanoparticles, aluminum oxide ($Al_2O_3$) nanoparticles, ZnO nanoparticles, Zeolite nanoparticles, $TiO_2$, Carbon nanotube nanoparticles and graphene nanoparticles. According to various exemplary embodiments of the invention the nanoparticles are hydrophilic and/or hydrophobic nanoparticles.

In some embodiments of method 400, the nanoparticles coated with PEI are present in the liquid media at a concentration of at least 0.01% W/V. According to various exemplary embodiments of the invention nanoparticles coated with PEI are present in the liquid media at: at least 0.05%, at least 0.1%, at least 0.25%, at least 0.5%, at least 0.75%, at least 1%, at least 2%, at least 4%, at least 6%, at least 8%, at least 10% or intermediate or higher percentages. Alternatively or additionally, according to various exemplary embodiments of the invention According to various exemplary embodiments of the invention nanoparticles coated with PEI are present in the liquid media at: less than 10%, less than 8%, less than 10%, less than 8%, less than 6%, less than 4%, less than 2%, less than 1%, less than 0.75%, less than 0.5%, less than 0.4%, less than 0.3%, less than 0.2%, less than 0.1% or intermediate or lower percentages.

Alternatively or additionally, in some embodiments of method 400, applying 420 includes at least one action selected from the group consisting of spraying, brushing, daubing, rolling, smear coating and dipping.

According to various exemplary embodiments of the invention product at 420 includes at least one material selected from the group consisting of polyvinyl chloride (PVC), Polyethylene (PE, LDPE, HDPE, PEX), polypropylene (PP), polycarbonate (PC), polyamide (PA), polyacrylate, polymethacrylate (PAM), polystyrene (PS), high-impact polystyrene (HIPS) Ethylene vinyl alcohol (EVOH), Ethylene-vinyl acetate (EVA), Isoprene, styrene-isoprene-styrene (SIS) block copolymer, butadiene and Acrylonitrile butadiene styrene (ABS).

It is expected that during the life of this patent many ne polymeric materials and/or nanoparticle types will be developed and the scope of the invention includes all such new technologies a priori.

As used herein the term "about" refers to +10%.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

Specifically, a variety of numerical indicators have been utilized. It should be understood that these numerical indicators could vary even further based upon a variety of engineering principles, materials, intended use and designs incorporated into the various embodiments of the invention. Additionally, components and/or actions ascribed to exemplary embodiments of the invention and depicted as a single unit may be divided into subunits. Conversely, components and/or actions ascribed to exemplary embodiments of the invention and depicted as sub-units/individual actions may be combined into a single unit/action with the described/depicted function.

Alternatively, or additionally, features used to describe a method can be used to characterize an apparatus and features used to describe an apparatus can be used to characterize a method.

It should be further understood that the individual features described hereinabove can be combined in all possible combinations and sub-combinations to produce additional embodiments of the invention. The examples given above are exemplary in nature and are not intended to limit the scope of the invention which is defined solely by the following claims.

Each recitation of an embodiment of the invention that includes a specific feature, part, component, module or process is an explicit statement that additional embodiments of the invention not including the recited feature, part, component, module or process exist.

Alternatively or additionally, various exemplary embodiments of the invention exclude any specific feature, part, component, module, process or element which is not specifically disclosed herein.

Specifically, the invention has been described in the context of specific nanoparticle types and specific industrial processes but might also be used in the context of other nanoparticle types and/or other industrial processes.

All publications, references, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The terms "include", and "have" and their conjugates as used herein mean "including but not necessarily limited to".

Additional objects, advantages, and novel features of various embodiments of the invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

EXAMPLES

Reference is now made to the following examples, which together with the above descriptions, illustrate the invention in a non-limiting fashion.

The following materials and methods are used in performance of experiments described in examples hereinbelow:

Materials

PEI: Commercial polyethyleneimine polymers 600 (Alfa Aesar, Japan), 800 (D-BASF, Germany), 10K (Alfa Aesar, United States) and 25K (D-BASF, Germany) were used as received without further purification.
BP: Recrystallized benzoyl peroxide was used as initiator (Alfa Aesar, Great Britain).
Silica nanoparticles: AEROSIL 200 (hydrophilic, 12 nm); AEROSIL R972 (hydrophobic, 16 nm in size); AEROSIL R711 (methacrylic silica 12 nm in size) all from EVONIK, Germany.
Ethanol: 99.9% (Romical, Israel) was used as solvent.
Xylene: Xylene (Carlo Erba Reagents, France) was used to extract the non-grafted PEI fraction.

Methods

TGA: The thermal stability of PEI/Si nanocomposites was determined by thermogravimetric analysis (TGA), using a TA Instruments Q5000 Thermal Gravimetric Analyzer (TA Instruments, USA). The temperature range was 25-600° C. at a heating rate of 10° C./min, monitoring their weight loss as function of temperature. The analysis was conducted under a nitrogen atmosphere at a flow rate of 25 mL/min.
FTIR: The Fourier Transform Infrared (FTIR) spectra of samples were obtained in the range from 650 to 4000 cm-1 to get information on the chemical composition of the grafted SiO2 nanoparticles onto its surface by the polymer PEI using a Thermo 6700 FTIR instrument equipped with a Smart iTR diamond ATR device.
HRSEM: The morphology of PEI-grafted nanoparticles of silica before extraction was studied by High-Resolution Scanning Electron Microscopy (HRSEM). The samples were sputtered with carbon prior observation and examined using a HRSEM (Carl Zeiss Ultra Plus) at an accelerating voltage of 1 keV.

Example 1

Preparation of Nanocomposites

PEI/Si nanocomposites were synthesized as shown schematically in FIG. 1. At (1) a measured amount of nanoparticles (e.g. fumed silica or alumina) was added to 20 mL ethanol. The mixture was by sonicated (5 min. for laboratory scale) to disperse the nanoparticles. At (2) poly(ethylene imine) (PEI) with different molecular weights (600, 800, 10,000 and 25,000 g/mol) at different weight ratio NPs:PEI (3:1; 1:1 and 1:3) and benzoyl peroxide initiator at different concentrations (0.5%; 1% and 2%) were added to the dispersions followed by sonication at 4° C., as listed Table 1.

TABLE 1

Preparation of nanocomposites based on Aerosil 200 and benzoyl peroxide (BP):

| Silica:PEI | BP:Silica | | |
|---|---|---|---|
| | 0.5% | 1.0% | 2.0% |
| 3:1 | SCXX*-07 | SCXX*-01 | SCXX*-04 |
| 1:1 | SCXX*-08 | SCXX*-02 | SCXX*-05 |
| 1:3 | SCXX*-09 | SCXX*-03 | SCXX*-06 |

*XX referring to the PEI MW (600, 800, 10 for 10,000 and 25 for 25,000 g/mol)

The system was left without stirring at room temperature overnight to complete the reaction. The resulting gel-like nanocomposites were filtered and washed several times with an excess of ethanol using a Millipore vacuum filter apparatus equipped with a 70 nm pore size membrane. The filter cake solids were then dried in a vacuum oven overnight resulting in a fine white powder.

Two types of PEI fractions are present in the final solids as indicated in (2) of FIG. 1: unattached PEI (which is not grafted to nanoparticles) and grafted PEI.

In order to further study the grafting efficiency, an extraction procedure was performed. An aliquot of filter cake solids was immersed in hot xylene for 7 hours. The non-grafted PEI dissolved in the xylene leaving the PEI-grafted nanoparticles in the bottom of the reactor. The grafted nanoparticles were then characterized using thermogravimetric analysis (TGA) and Fourier Transform Infrared (FTIR) spectra.

The influence of different initiator concentrations and weight ratio on the resulted grafted PEI fraction was studied. The nanocomposite exhibiting the highest PEI-grafted fraction onto the silica surface in accordance with a fair cost-effectiveness was further studied through the replacement of the hydrophilic silica by other kind of nanoparticles such as hydrophobic silica and methacrylic silica as well as alumina.

Example 2

FTIR of AEROSIL 200 Based Nanocomposites

Figure 5:
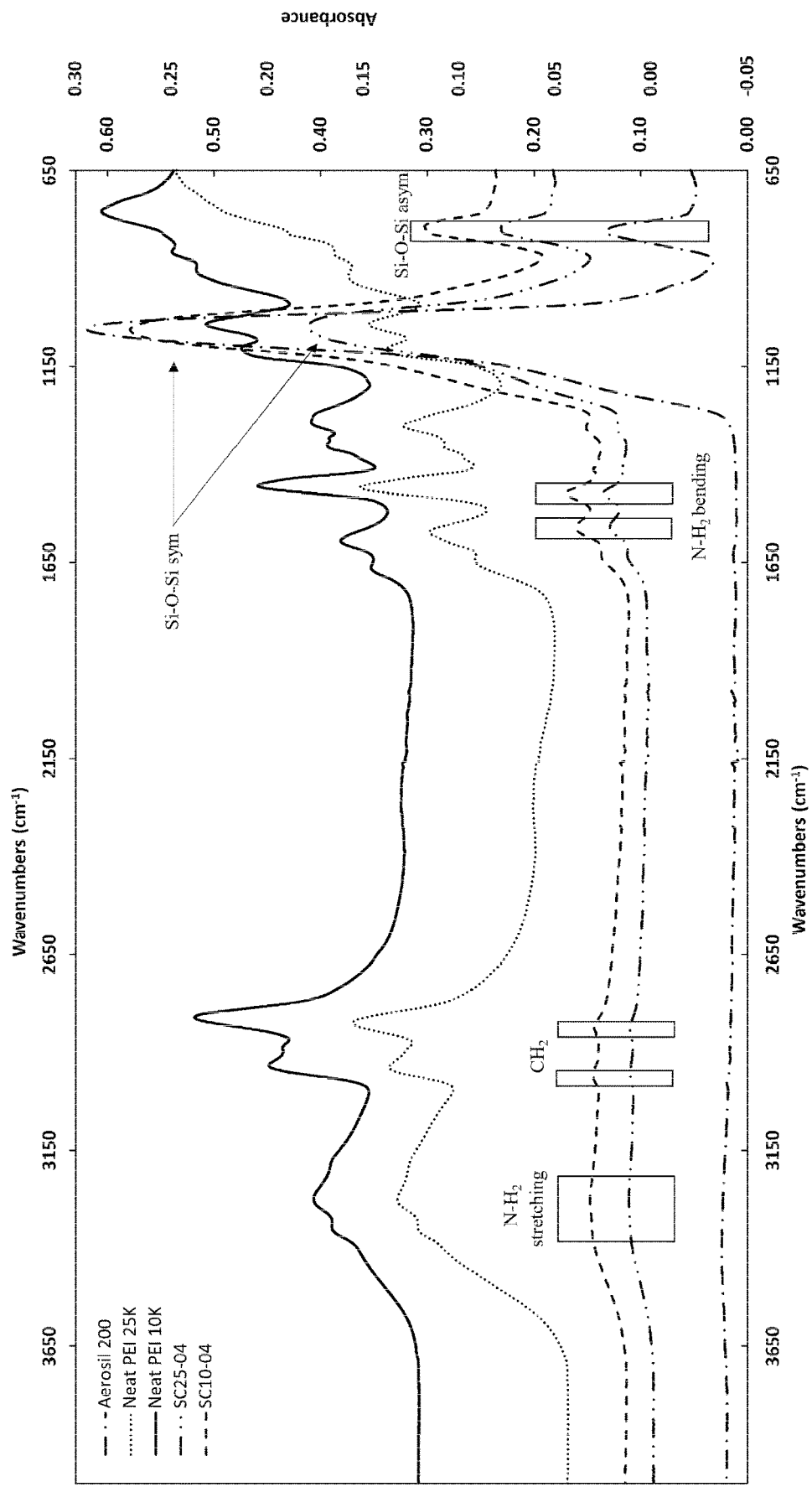
FIG. 5 is a plot of FTIR spectra (absorbance as a function of wavenumber/cm) of pristine silica Aerosil 200 (dashed dotted line), neat PEI 25K (dotted line), neat PEI 10K (solid line), SC25-04 (dashed double dotted line) and SC10-04 (dashed line) before extraction for 3:1 PEI and 2.0% BP.

In order to study the effect of PEI MW on FTIR measurements were conducted with unextracted samples. FIG. 5 depicts the FTIR spectra of Aerosil 200 (dashed dotted line), neat PEI 25K (dotted line), neat PEI 10K (solid line), SC25-04 (dashed double dotted line) and SC10-04 (dashed line) before extraction for 3:1 PEI and 2.0% BP.

FIG. 5 shows that all samples have the same two peaks characteristic of AEROSIL 200 in the range 1050-780 cm-1.

Samples with grafted PEI display two additional peaks around 1475 cm-1 and 1561 cm-1 and an absorption band at ~3280 cm-1 as well as two peaks around 2840 and 2960 cm-1.

These additional peaks confirm thus that PEI was successfully grafted onto the silica surface.

Example 3

Effect of Increased PEI MW on FTIR

Figure 6A:
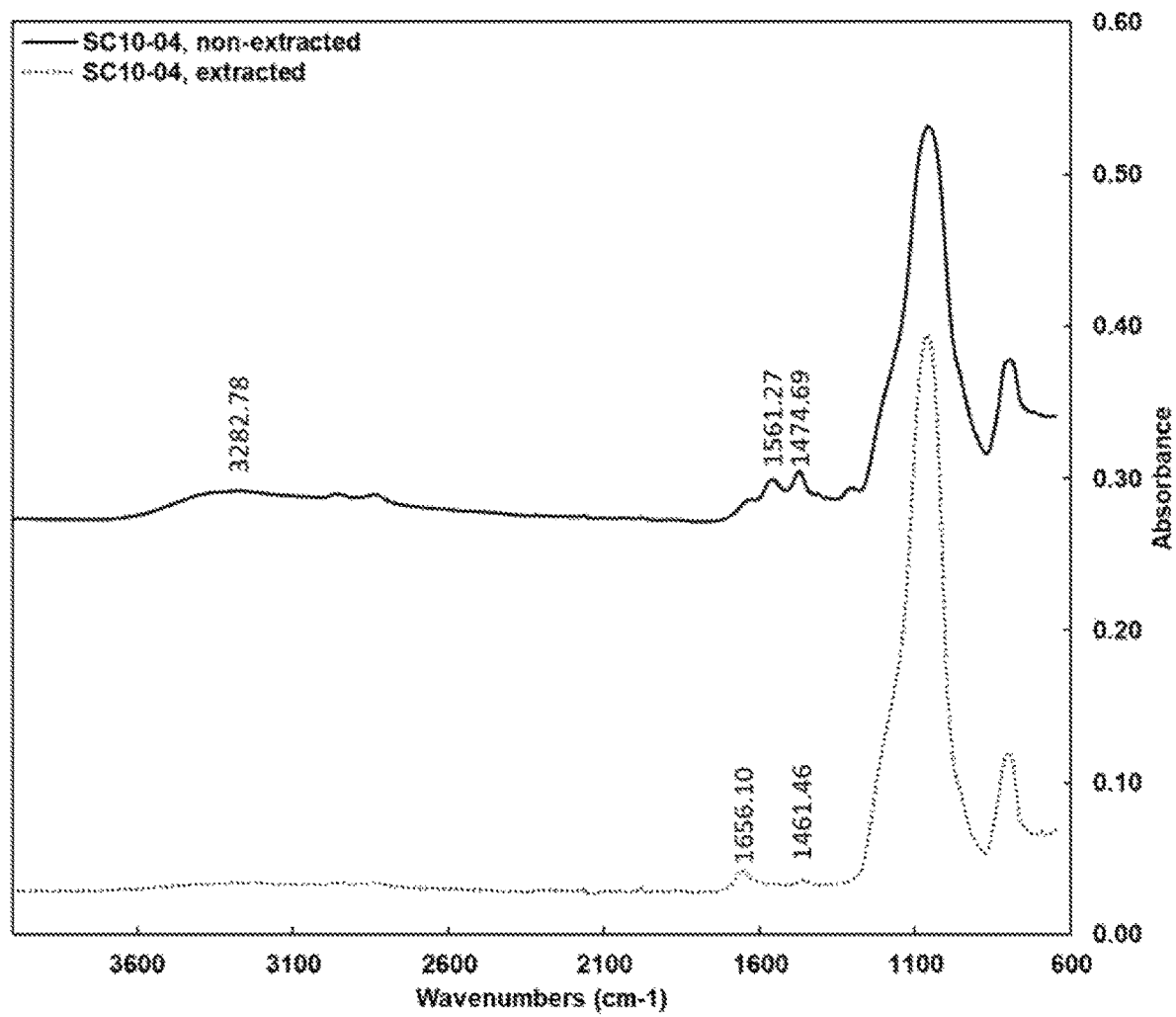
FIG. 6A is a plot of FTIR spectra (absorbance as a function of wavenumber/cm) for nanocomposite particles according to an exemplary embodiment of the invention before (upper line) and after (lower line) after extraction with xylene.
Figure 6B:
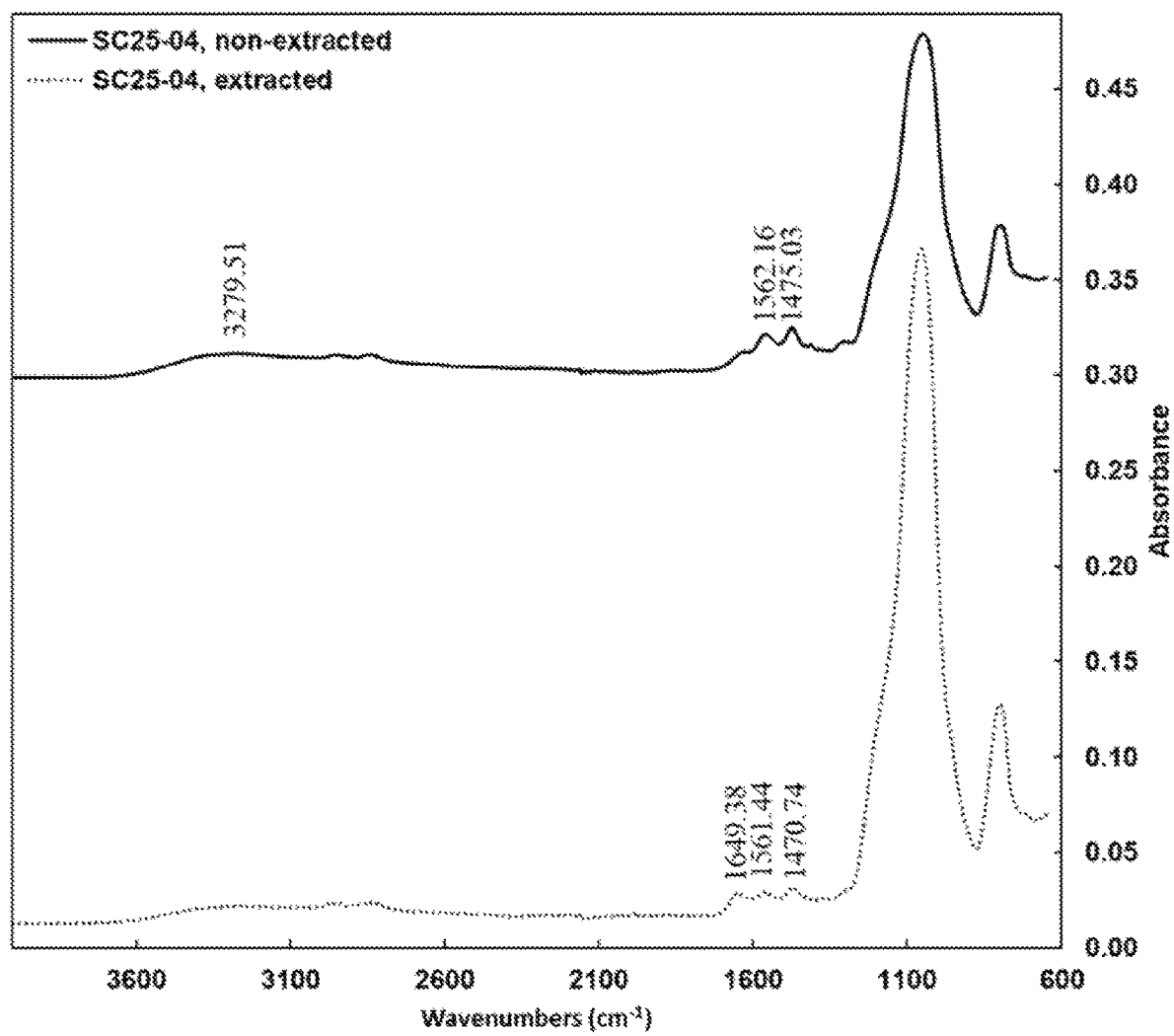
FIG. 6B is a plot of FTIR spectra (absorbance as a function of wavenumber/cm) for nanocomposite particles according to an exemplary embodiment of the invention before (upper line) and after (lower line) after extraction with xylene.

In order to examine the effect of increasing the MW of PEI from 10,000 to 25000 FTIR spectra of PEI/Si nanocomposites SC10-04 and SC25-04 were compared FIG. 6A and FIG. 6B illustrate the FTIR spectra of PEI/Si nanocomposites SC10-04 (FIG. 6a) and SC25-04 (FIG. 6b) before (upper line) and after (lower line) extraction with hot xylene.

After xylene extraction, a new peak around 1650 $cm^{-1}$ appears in both of samples suggesting that primary amines are converted into secondary amines.

After xylene extraction, the peak at 1561 $cm^{-1}$ has completely disappeared or greatly decreased for PEI 10K and PEI 25K, respectively. It is believed that a reduction in the amount of organics material contributes to a reduction in peak intensity.

After xylene extraction, the peak due to bending vibration of N—H2 (~1561 $cm^{-1}$) displays an important decrease in intensity. It is believed that the removed organic compound had such chemical bonds, i.e. the unattached PEI.

These changes in the spectra are characteristic of linkages between the oxygen atoms from silanol groups of silica and the nitrogen atoms in PEI resulting from grating of PEI to the nanoparticles. Therefore, these changes in the spectra confirm the grafting of PEI to the particles surfaces.

Example 4

Effect of Xylene Extraction on TGA and DTG

In order to learn the amount of organic compounds (the % wt disappeared is the organic, while the remaining are inorganic; TGA) and/or the peak of the 1st derivative (DTG) is related to the thermal stability of the composites xylene extractions were performed prior to TGA and DTG measurements.

Usually when the organic compound is grafted, the thermal stability changes.

FIG. 7a, FIG. 7B, FIG. 7C and FIG. 7D depict the TGA and DTG (first derivative) thermograms of PEI/Si nanocomposite for two different molecular weights of PEI, SC800-04 (FIGS. 7A and 7B) and SC25-05 (FIGS. 7C and 7D), before (solid line) and after (dotted line) xylene extraction.

All samples have the same profile regardless of MW of PEI, BP concentration or weight ratio of PEI:SI.

Figure 7A:
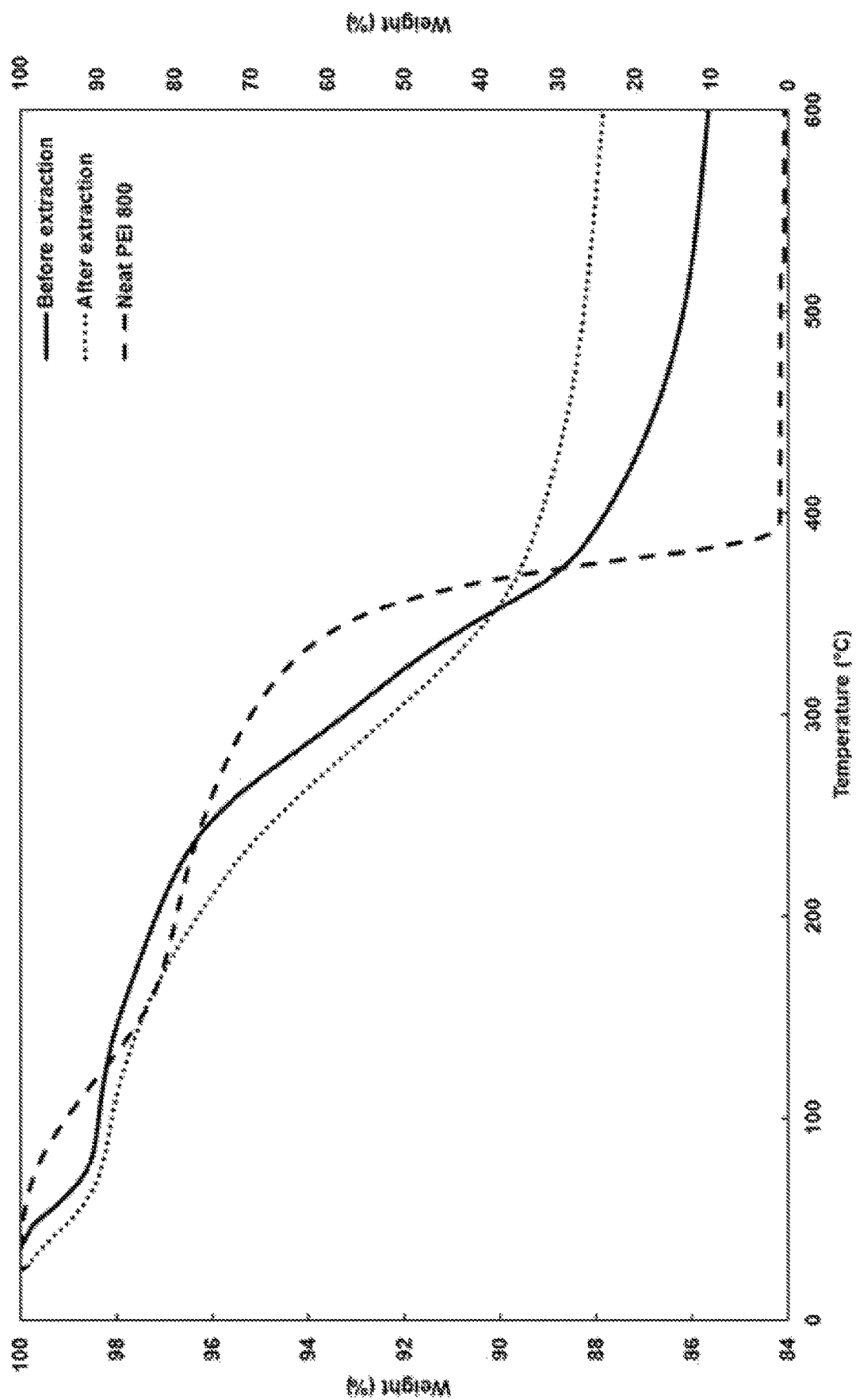
FIG. 7A is a TGA thermogram weight % as a function of temperature in ° C. of nanocomposite particles according to an exemplary embodiment of the invention (SC800-04) before (solid line) and after (dotted line) xylene extraction with neat PEI (dashed line) for reference.
Figure 7B:
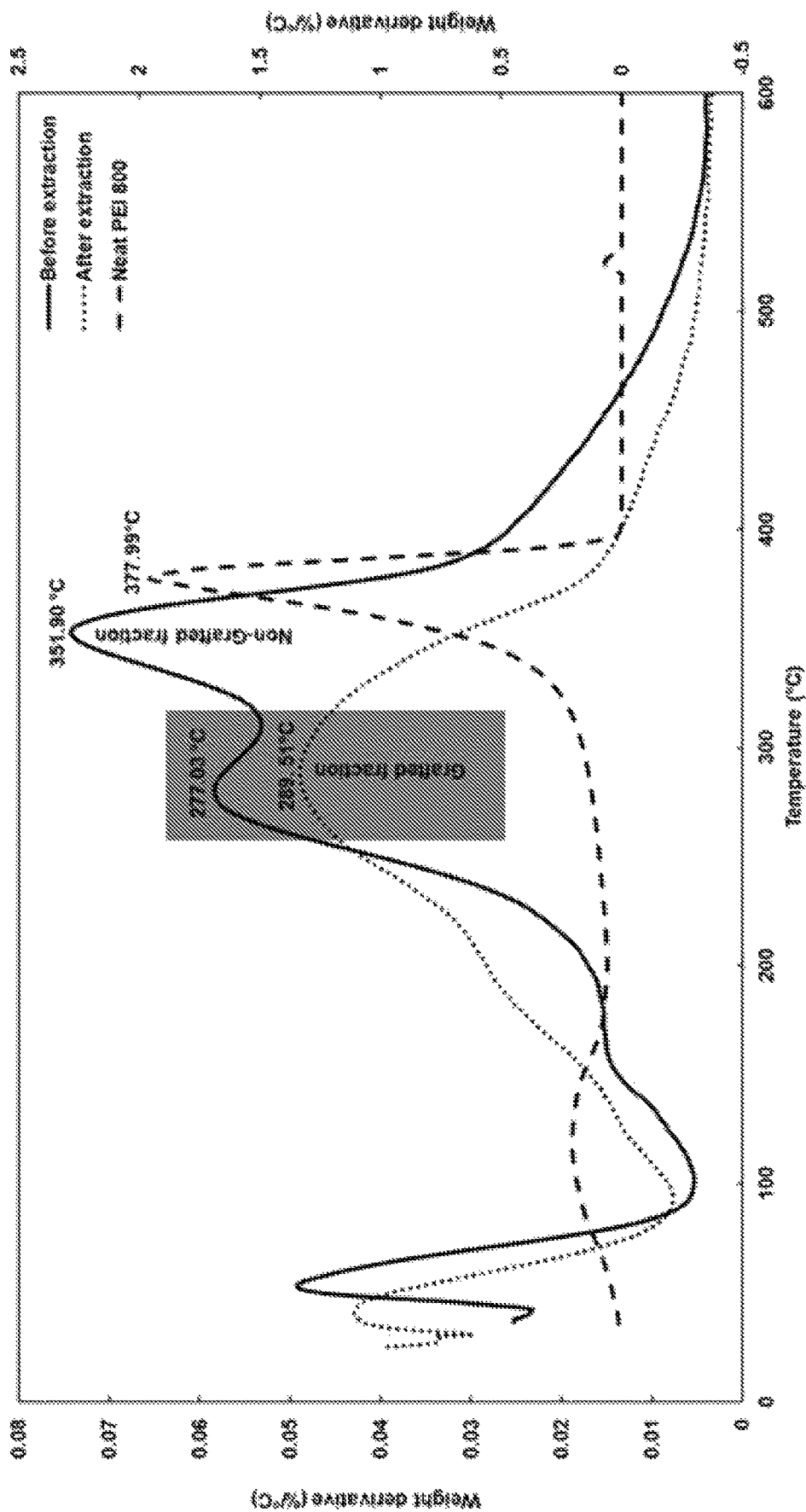
FIG. 7B is a DTG thermogram [Weight derivative (%/° C.)] as a function of temperature in ° C. of nanocomposite particles according to an exemplary embodiment of the invention (SC800-04) before (solid line) and after (dotted line) xylene extraction with neat PEI (dashed line) for reference.
Figure 7C:
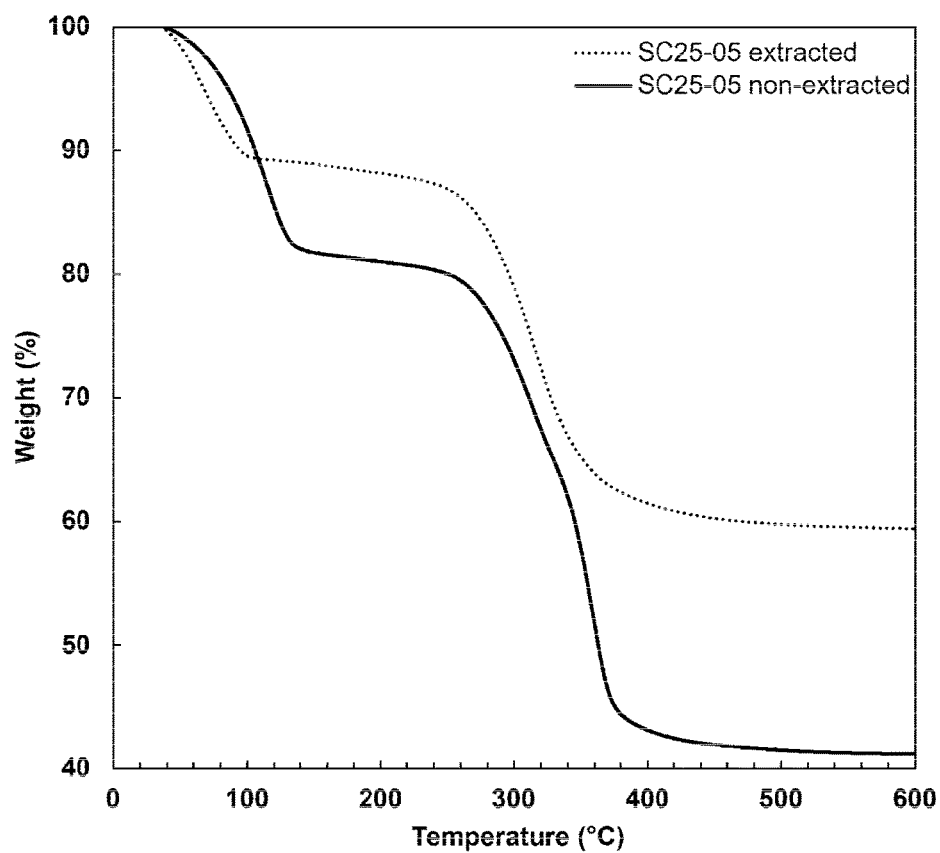
FIG. 7C is a TGA thermogram Weight % as a function of temperature in ° C. of nanocomposite particles according to an exemplary embodiment of the invention before (blue line) and after (orange line) xylene extraction.
Figure 7D:
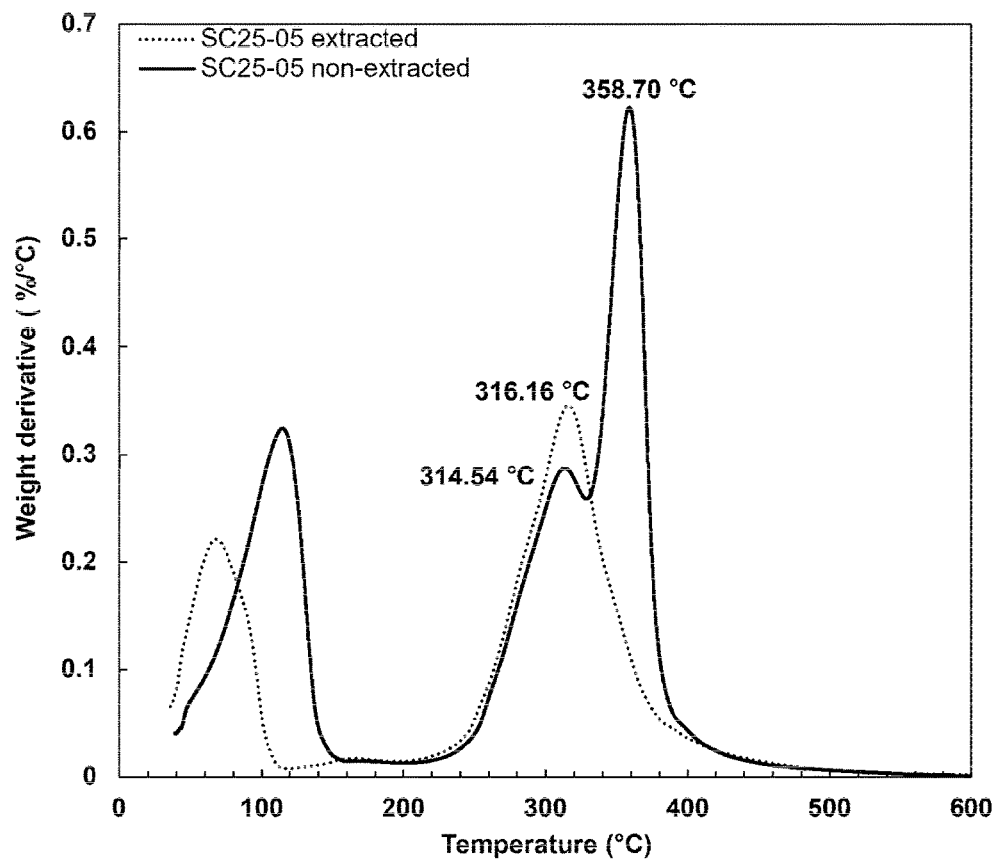
FIG. 7D is a DTG thermogram [Weight derivative (%/° C.)] as a function of temperature in ° C. of nanocomposite particles according to an exemplary embodiment of the invention before (blue line) and after (orange line) xylene extraction.

Before xylene extraction, the TGA curve (FIG. 7A and FIG. 7C) highlights two weight losses confirmed by the presence of two distinct peaks in the DTG curve (FIG. 7B and FIG. 7D).

After extraction, only one transition remains and the temperature of corresponding peak (289° C. and 316° C. for SC800-04 and SC25-05, respectively) is located close to the first peak seen in the unextracted sample.

These results suggest that the first peak (277° C. and 314° C. for SC800-04 and SC25-05, respectively) in unextracted samples is due to attached PEI onto the silica surface and the second peak (at 352° C. or 358° C.) reflects the ungrafted PEI fraction.

Note that in all unextracted samples, the decomposition temperature of attached fraction is about 275° C., except for SC25-05 where this is located at a higher temperature.

For SC800-04, a 12° C. (277° C.-289° C.) temperature difference is observed. This may be due to the effect of chain attachment to the silica surface on the thermal oxidation resistance, and this temperature change can be seen in each sample.

These results suggest that the unextracted nanoparticles underwent two decomposition stages of PEI, the first one corresponding to the attached PEI chains fraction and the second one to the non-grafted PEI fraction whereas the extracted nanoparticles are degraded in one-step with a weight loss corresponding solely to the thermal decomposition of PEI chains grafted onto the silica surface. In addition, these results suggest the transition below 100° C. seen before and after extraction is due to the volatilization of residual ethanol.

It would be expected that the free-PEI fraction degrades in first as a consequence of a lower molecular weight than this containing in the grafted-PEI fraction. One reason that could explain the reversed phenomenon is that the non-grafted PEI is protected by the char barrier effect.

These results establish that extraction by xylene is efficient in dissolving ungrafted PEI and that PEI has been well grafted onto the silica surface, yielding PEI-grafted silica nanoparticles.

Example 5

Influence of Weight Ratio on TGA

In order to determine the influence of weight ratio of SI:PEI different weight ratios were tested with the amount of BP initiator held constant.

Figure 8:
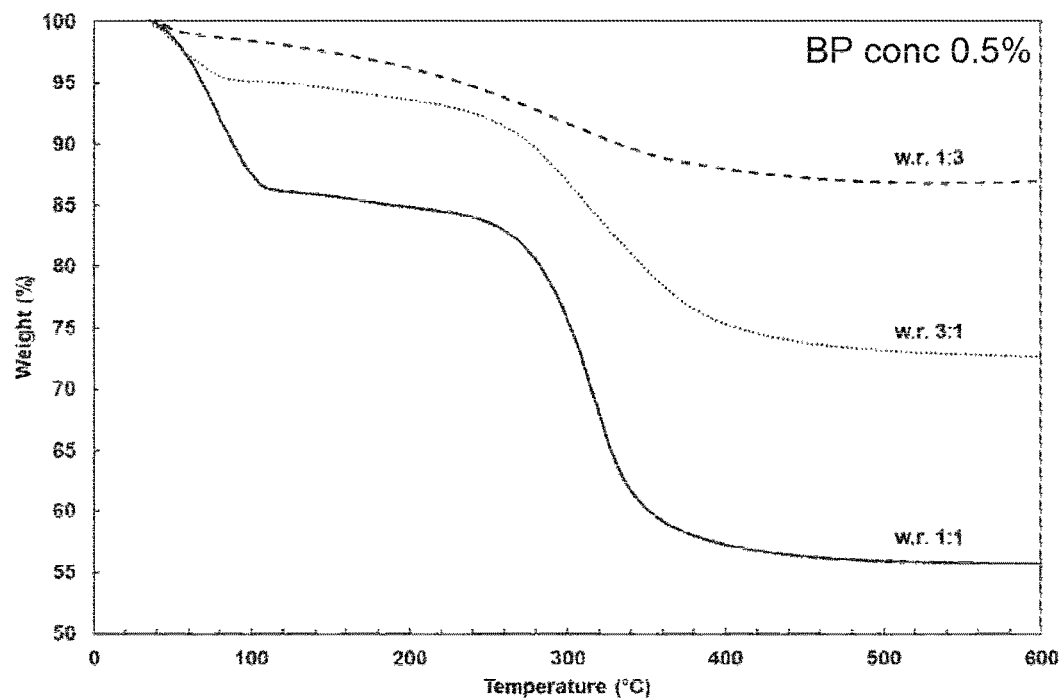
FIG. 8 is a TGA thermogram (Weight % as a function of temperature in ° C.) of nanocomposite particles according to exemplary embodiments of the invention after xylene extraction with a weight ratio 1:3 (dashed line, SC25-Y), 3:1 (dotted line,) and 1:1 (solid line,) for a 0.5% BP concentration and PEI with a MW of 25,000.

FIG. 8 is a TGA thermogram (weight % as a function of temperature) illustrating the influence of weight ratio SI:PEI for 0.5% BP concentration and PEI MW 25000.

The largest PEI grafting fraction occurred at a weight ratio of 1:1 weight ratio (solid line, SC25-08) with a weight loss 29.5%. When the weight ratio decreased (w.r. 3:1, dotted line, SC25-07), i.e. when the PEI amount decreases, a decrease in grafted fraction is observed (~21% grafted). This decrease is expected because a lower PEI quantity is used.

When the weight ratio increases to 1:3 (dashed line, SC25-09), the grafted amount dramatically decreases; three times less PEI was grafted compared to SC25-08 (~11%). This result suggests that a limit of the grafting capacity of the silica surface for PEI was at the 1:1 weight ratio. These results also suggest that the high branching of PEI 25K may contribute to steric hindrance when too much PEI is present.

Example 6

Influence of Initiator Amount on TGA with High MW PEI

In order to determine the effect of initiator amount two different percentages of BP were tried with two SI:PEI weight ratios using PEI with a MW of 25000.

Figure 9A:
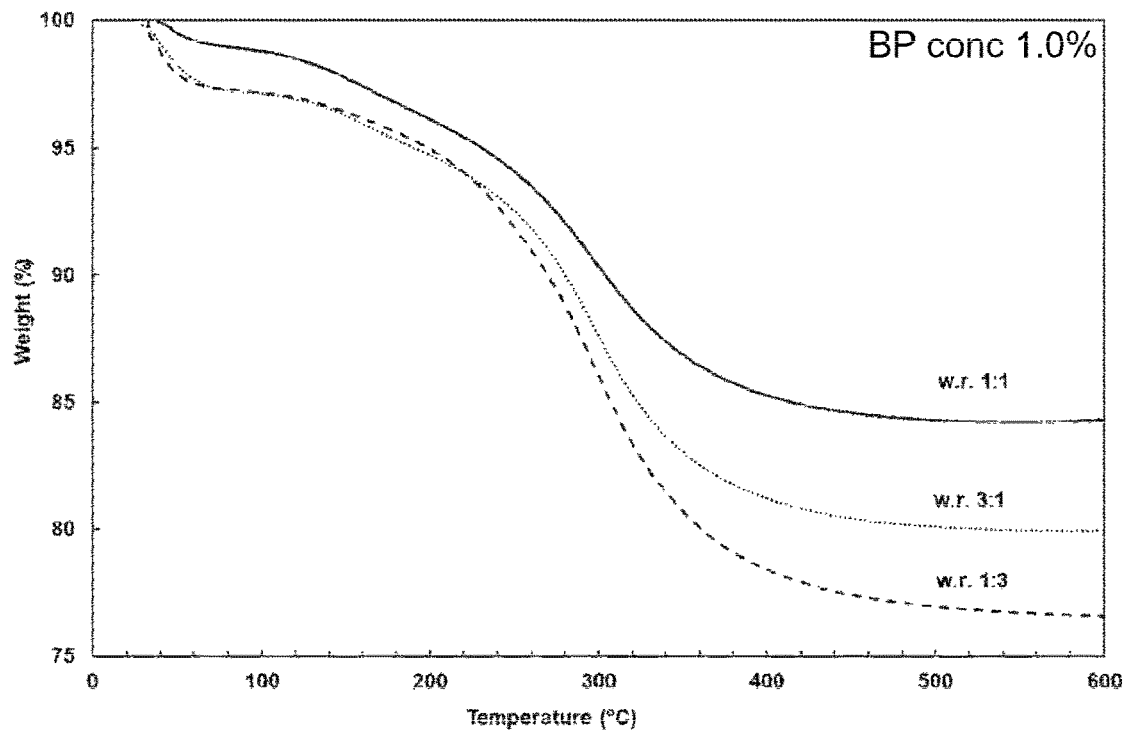
FIG. 9A is a TGA thermogram (Weight % as a function of temperature in ° C.) of nanocomposite particles according to exemplary embodiments of the invention (SC25-Y) after xylene extraction with a weight ratio 3:1 (dotted line), 1:1 (solid line) and 1:3 (dashed line) for 1.0% and BP concentration and PEI with a MW of 25,000.
Figure 9B:
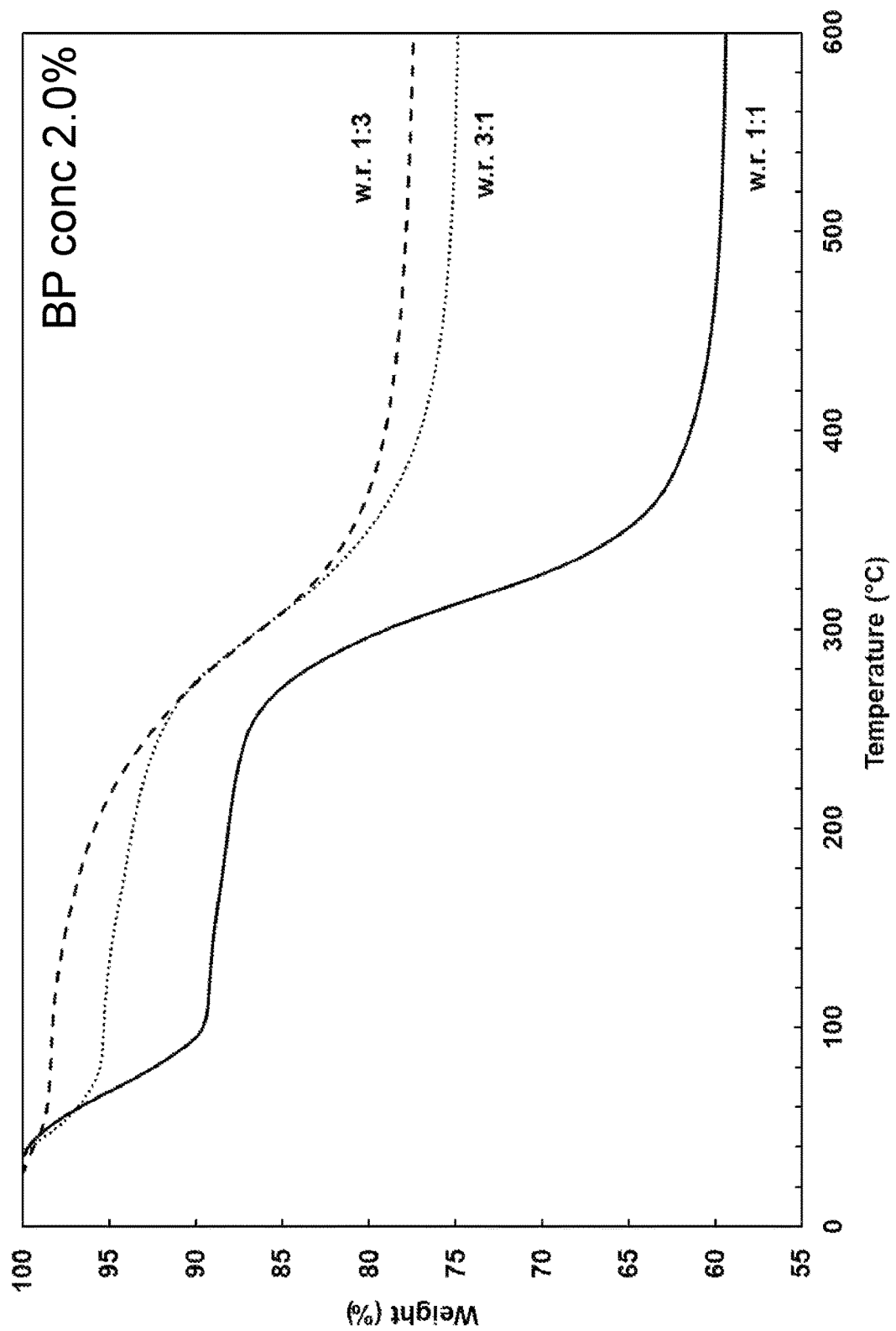
FIG. 9B is a TGA thermogram (Weight % as a function of temperature in ° C.) of nanocomposite particles according to exemplary embodiments of the invention SC25-Y after xylene extraction with a weight ratio 3:1 (dotted line), 1:1 (solid line) and 1:3 (dashed line) for 2.0% BP concentration and PEI with a MW of 25,000.

FIG. 9A and FIG. 9B illustrates the TGA thermograms (weight % as a function of temperature) for 1.0% (FIG. 9a) and 2.0% (FIG. 9b) BP concentration with three different weight ratios, 1:1 (solid line), 3:1 (dotted line and 1:3 (dashed line) line) for samples based on PEI 25K.

FIG. 9b shows that for a 2% BP concentration the highest amount of grafted PEI is obtained for the 1:1 weight ratio as expected from the results of Example 5.

FIG. 9A shows that for a 1.0% BP concentration the highest amount of grafted PEI is obtained for the 3:1 weight ratio.

Figure 9C:
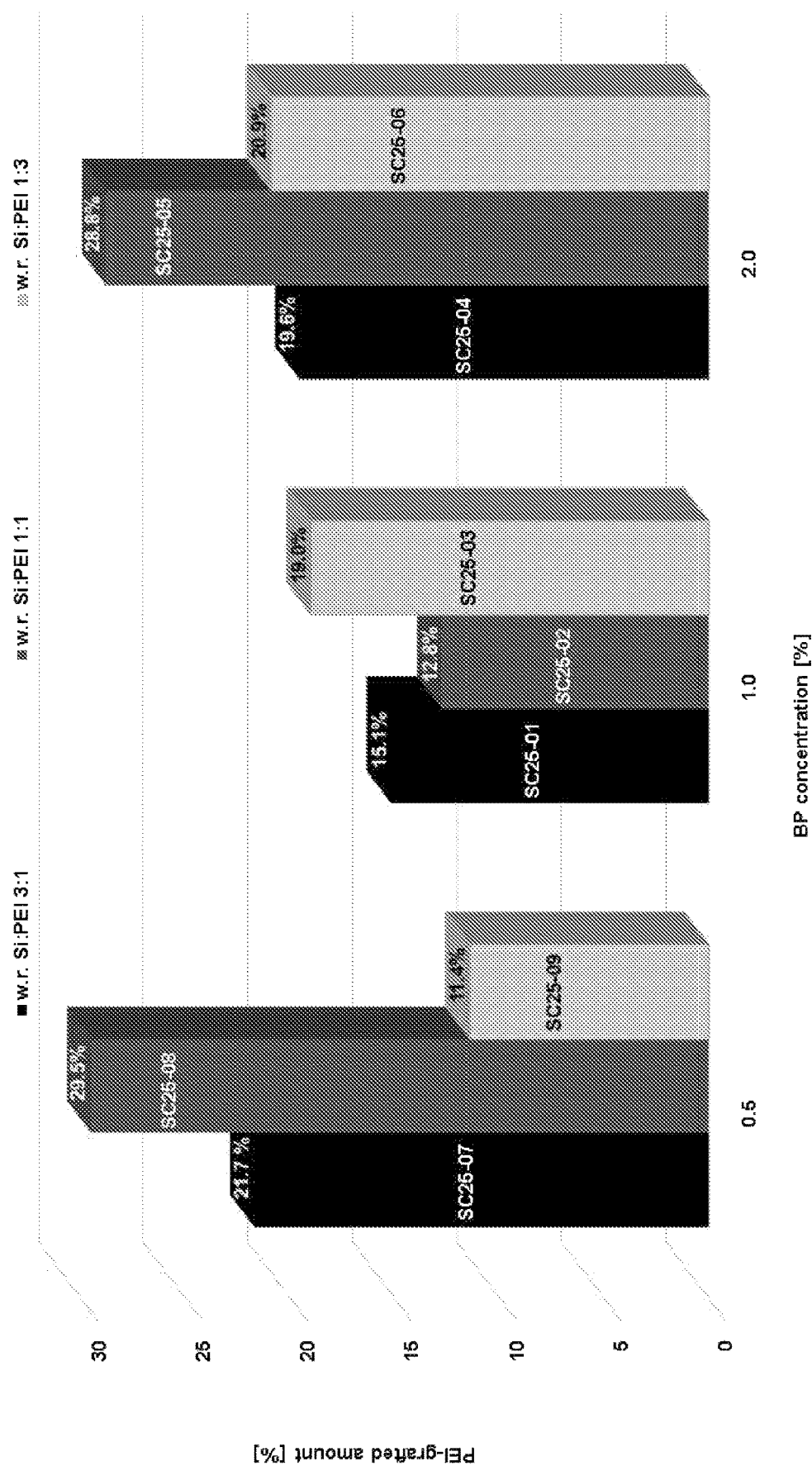
FIG. 9C is a 3D bar graph of grafted PEI fractions for the TGA thermograms of FIG. 8, FIG. 9A and FIG. 9B.

FIG. 9C is a 3D bar graph of grafted PEI fractions for the TGA thermograms of FIG. 8, FIG. 9A and FIG. 9B;

FIG. 9C summarizes the amount of grafted PEI for different compositions (BP, SiO2, PEI). Better concentrations result in higher grafted-PEI content These results suggest that steric hindrance due to the high branching of PEI 25K prevents the possibility of grafting more PEI onto the surface of silica. Based on these results it seems thereby that the maximum amount of grafted PEI 25000 MW is ~30%.

Example 7

Influence of Initiator Amount on TGA with Low MW PEI

In order to determine the effect of initiator amount two different percentages of BP were tried with two SI:PEI weight ratios using PEI with a MW of 600.

Figure 10:
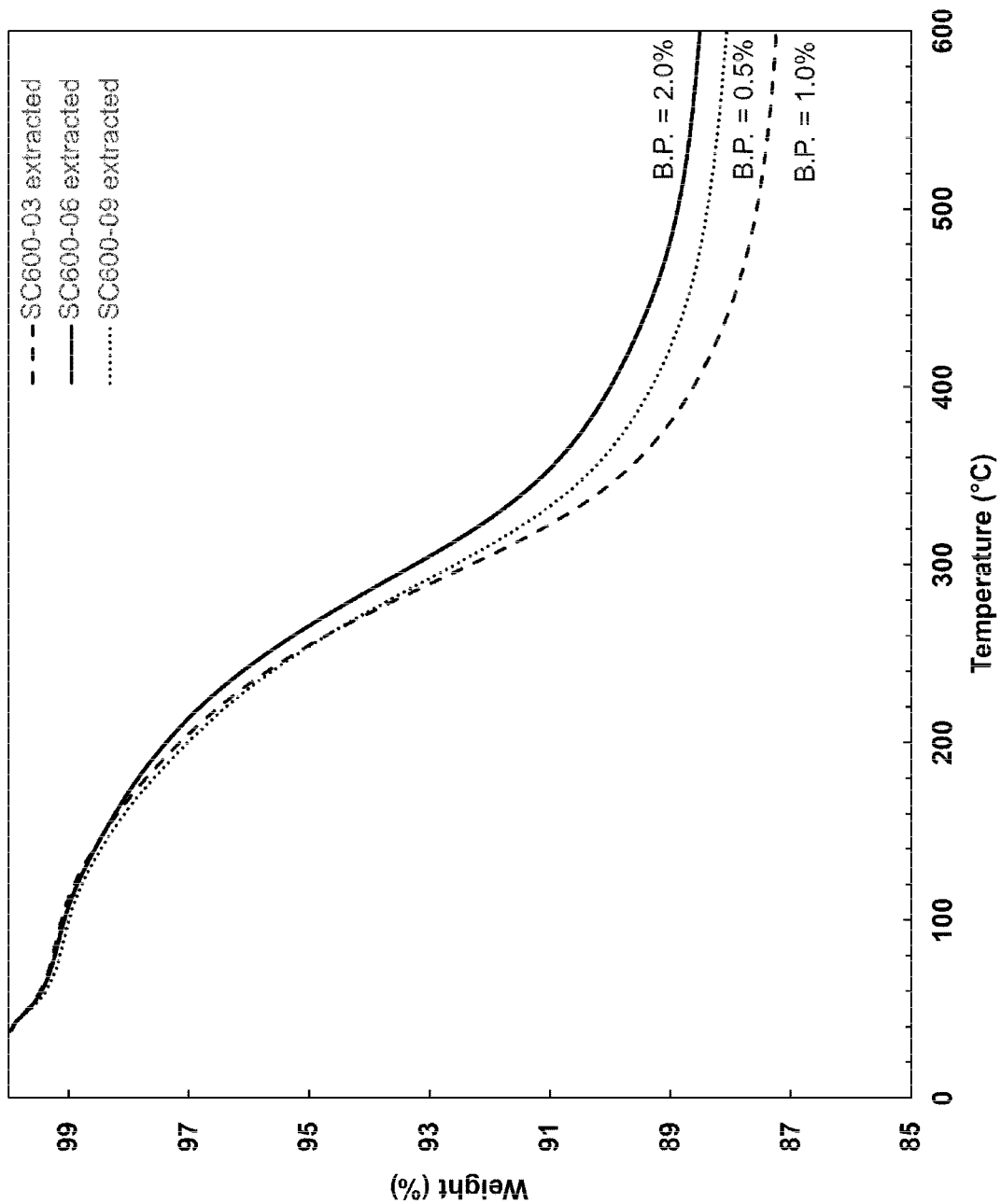
FIG. 10 is a TGA thermogram (Weight % as a function of temperature in ° C.) of nanocomposite particles according to exemplary embodiments of the invention after xylene extraction with 2.0% (top line), 1.0% (middle line) and 0.5% (lower line) BP concentrations for samples based on PEI 600 MW and with weight ratio 1:3.

FIG. 10 illustrates the TGA thermograms (weight % as a function of temperature) for samples based on PEI 600 MW for weight ratio silica:PEI of 1:3, for three different BP concentrations, after xylene extraction.

The amount of PEI grafted to the silica surface for the three samples did not vary much. For 2% BP ~11% was grafted (top line, SC600-06) and 0.5% BP (middle line, SC600-09) and about ~12% was grafted for the 1% BP (lowest line, SC600-03).

These results, together with those of the preceding example, suggest it is possible to control and adjust the amount of grafted PEI.

Example 8

Interplay Between PEI MW and BP Amount

In order to examine further the relative effects of PEI MW and BP initiator concentration, an additional experiment was conducted.

Figure 11A:
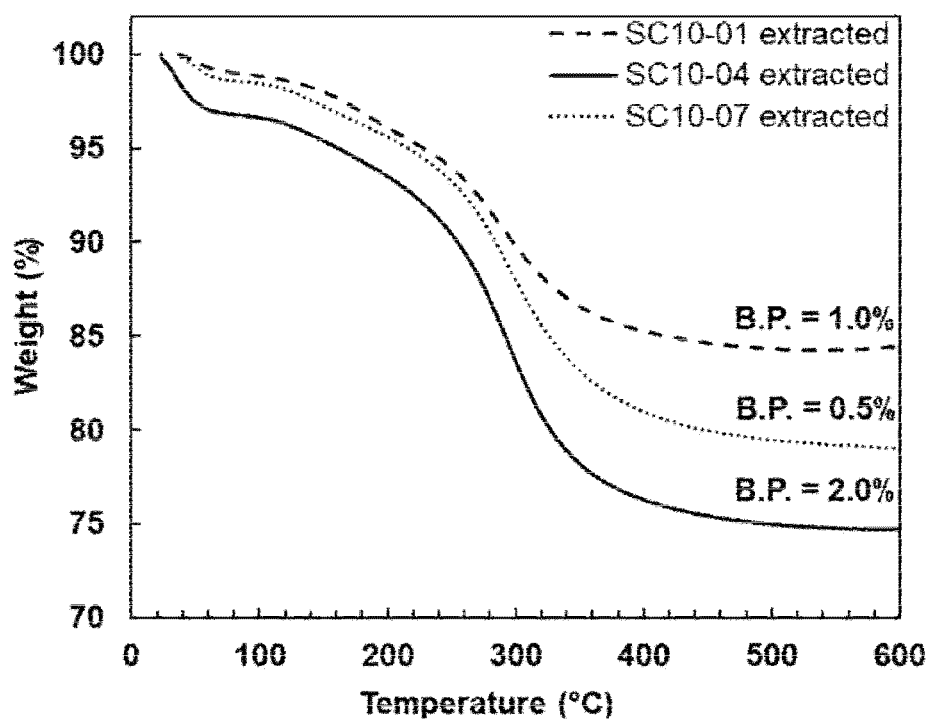
FIG. 11A is a TGA thermogram (Weight % as a function of temperature in ° C.) of nanocomposite particles according to exemplary embodiments of the invention after xylene extraction with 2.0% (lower line), 1.0% (upper line) and 0.5% (middle line) BP concentrations for PEI with MW 10,000 and a weight ratio 3:1.
Figure 11B:
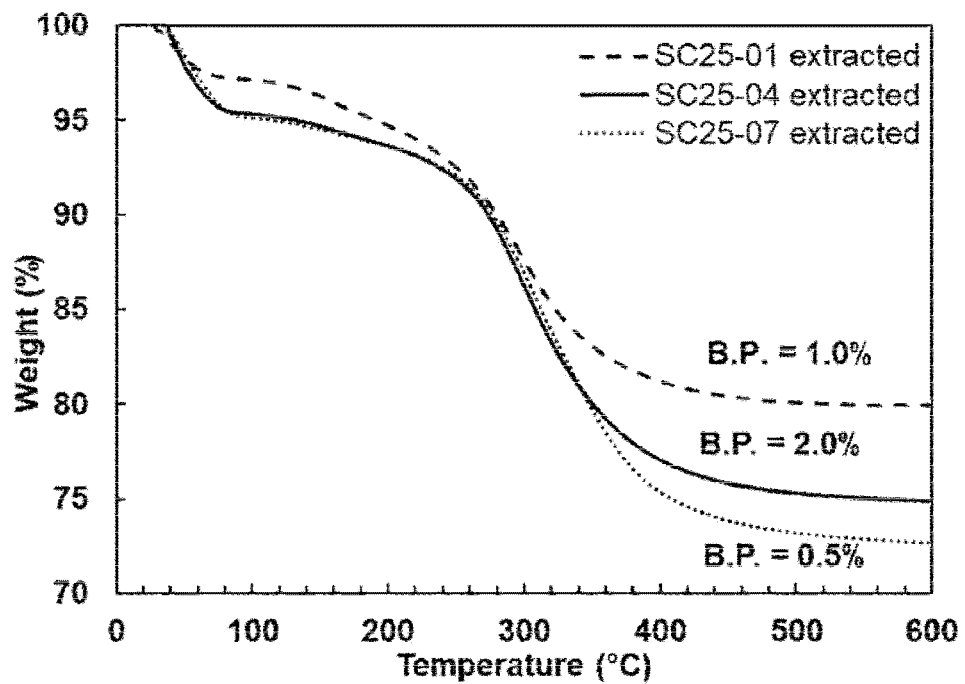
FIG. 11B is a TGA thermogram (Weight % as a function of temperature in ° C.) of nanocomposite particles according to exemplary embodiments of the invention after xylene extraction with 2.0% (blue line), 1.0% (orange line) and 0.5% (green line) BP concentrations for PEI with MW 25000 with a weight ratio 3:1.

FIG. 11A and FIG. 11B illustrate TGA thermograms (weight % as a function of temperature) of nanocomposites based on PEI 10000 MW (FIG. 11A) and PEI 25000 MW (FIG. 11A) with a weight ratio 3:1 for three different BP concentrations, 0.5% (green line), 1.0% (orange line) and 2.0% (blue line), after xylene extraction.

Only one transition is observed for each sample which means that whatever BP initiator concentration was used, the grafting reaction has succeeded.

As shown in FIG. 11A, the nanocomposite made with 2% BP underwent the highest weight loss indicating that 18.81% PEI was grafted. Interestingly, 0.5% BP produced an almost identical grafting percentage (18.58%). 1% BP produced a significantly lower percentage of grafted PEI (11.09%).

FIG. 11B shows that the lowest percentage of grafted PEI (15.17%) was also obtained for 1.0% BP when the MW of the PEI was 25000. However, for PEI with a MW of 25000, the trend is reversed for the 0.5% and 2% BP concentrations. The highest PEI grafting percentage (21.7%) occurred with 0.5% BP. The PEI grafting percentage for 2% BP was 19.57%.

These results suggest that, increasing the BP concentration does not contribute significantly to PEI grating percentage. PEI 25,000 MW consistently exhibited a higher PEI-grafting percentage fraction than the PEI 10,000 MW. This may be due to higher branching in PEI 25,000 MW making a larger number of nitrogen atoms available for binding to oxygen atoms of Silica.

Based on the cumulative results of examples 2 through 8, SC25-07 (Aeorosil 200 nanoparticles; 25,000 MW PEI; 0.5% BP; Silica; PEO (3:1)) was selected for further study. This SI/PEI nanocomposite exhibits the highest percentage of grafted PEI (22%) for both the lowest BP concentration and weight ratio. These factors make it a cost effective choice for industrial use.

Example 9

Influence of Initiator % at a 1:1 Weight Ratio

In order to determine the effect of BP initiator percentage at a 1:1 weight ratio another experiment was conducted.

Figure 12:
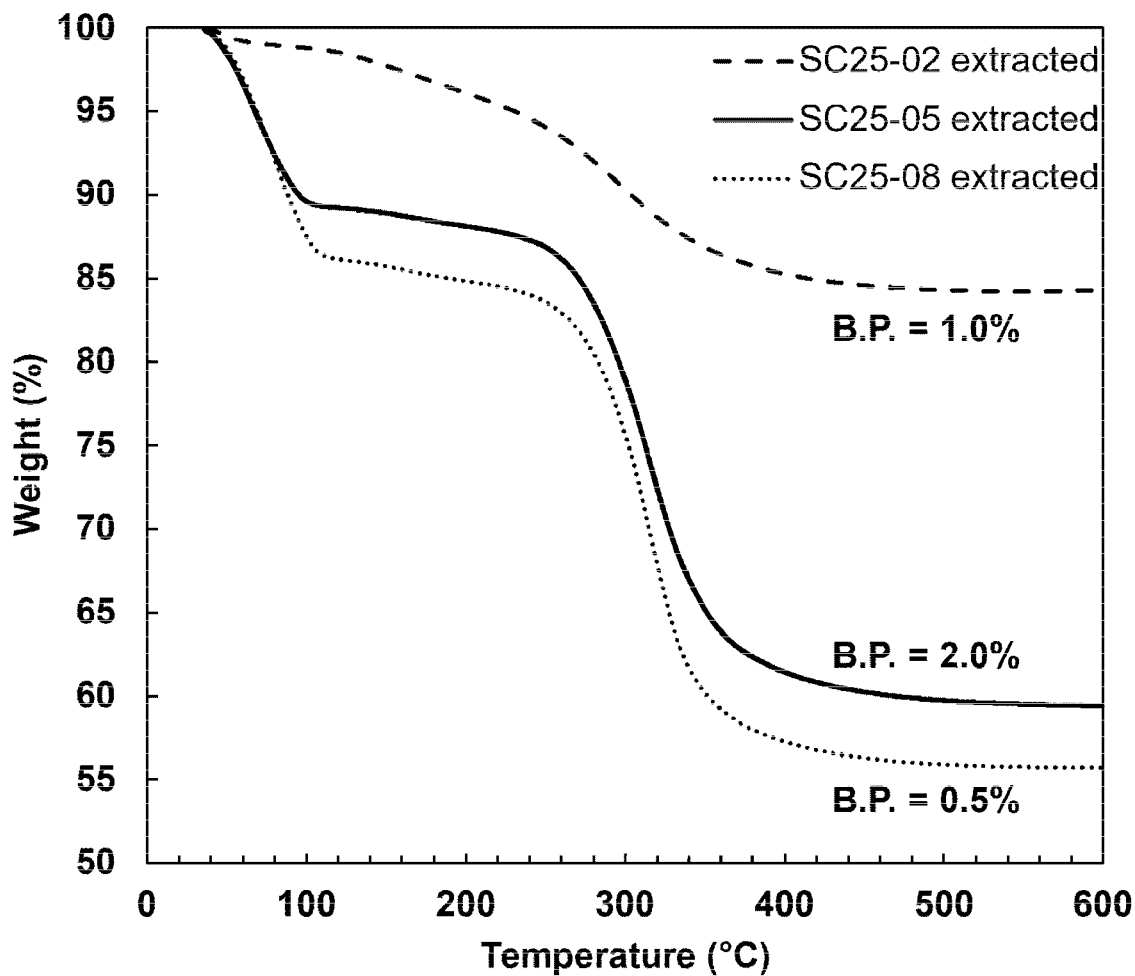
FIG. 12 is a TGA thermogram (Weight % as a function of temperature in ° C.) of nanocomposite particles according to exemplary embodiments of the invention after xylene extraction with 2.0% (middle line), 1.0% (upper line) and 0.5% (lower line) BP concentrations for a weight ratio 1:1.

FIG. 12 is a TGA thermogram (weight % as a function of temperature) for Si/PEI nanocomposites based on PEI 25,000 MW with a weight ratio 1:1 for 0.5% BP (lowest line, SC25-08), 1.0% BP (top line, SC25-02) and 2.0% BP (middle line, SC25-05) concentration. The same trend seen in FIG. 11B is observed.

The highest percentage of grafted PEI occurred at 0.5% BP concentration (29.5%) and the lowest percentage of grafted PEI occurred at 1.0% BP concentration (12.8%). Interestingly, for the 2.0% BP concentration, percentage of grafted PEI is to the 0.5% BP sample (~29%).

These results confirm 0.5% BP is sufficient to achieve a high PEI grafting percentage.

Example 10

Multivariate Experiment

In order to confirm the results of Example 9 under different conditions, an additional experiment was performed.

FIG. 10A, FIG. 10B, FIG. 10C and FIG. 10D illustrate the influence of PEI molecular weight in the TGA thermograms for different BP concentrations and weight ratios.

The data show that regardless of other parameters, the highest branching PEI (i.e. highest MW) exhibits the highest percentage of grafted PEI. Conversely a low percentage of grafted PEI occurs with low MW PEI (i.e. 600 and 800) regardless of peroxide concentration and/or weight ratio Silica:PEI.

Figure 13A:
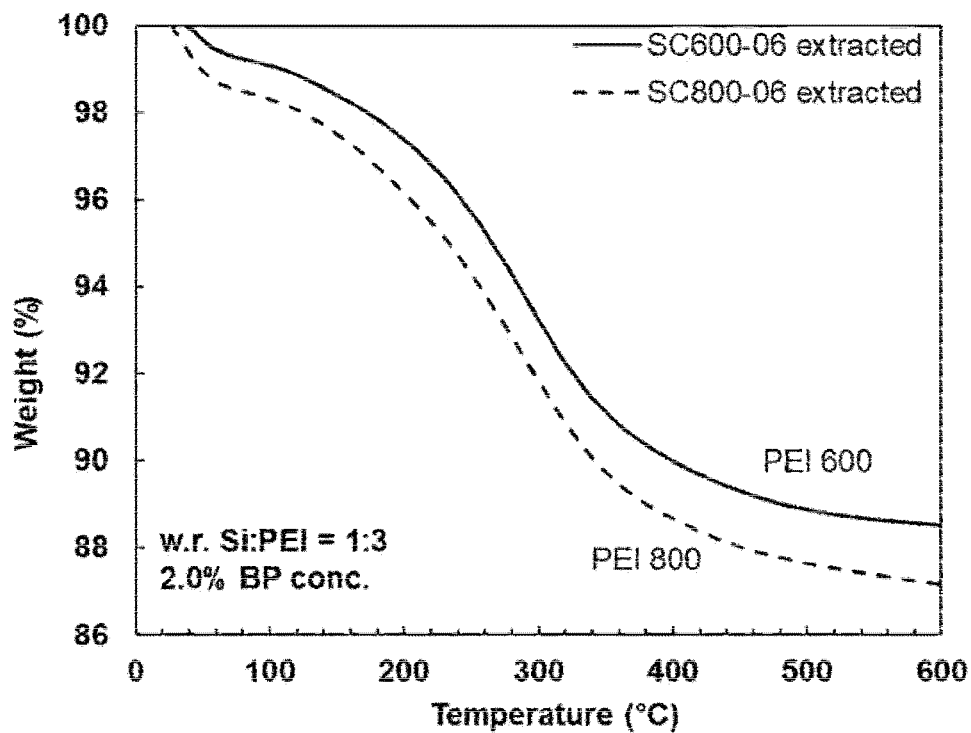
FIG. 13A is a TGA thermogram (Weight % as a function of temperature in ° C.) of nanocomposite particles according to exemplary embodiments of the invention after xylene extraction SC600-6 and SC800-06 for PEI 600 MW (upper line), PEI 800 MW (lower line)

As shown in FIG. 13A, the sample SC600-06 and SC800-06 exhibits a low percentage of grafted PEI, ~10.7% and ~11.3%, respectively. That is despite the weight ratio of 1:3 which should assure an excess of PEI. It is possible steric hindrance occurs also with low MW PEI.

Figure 13B:
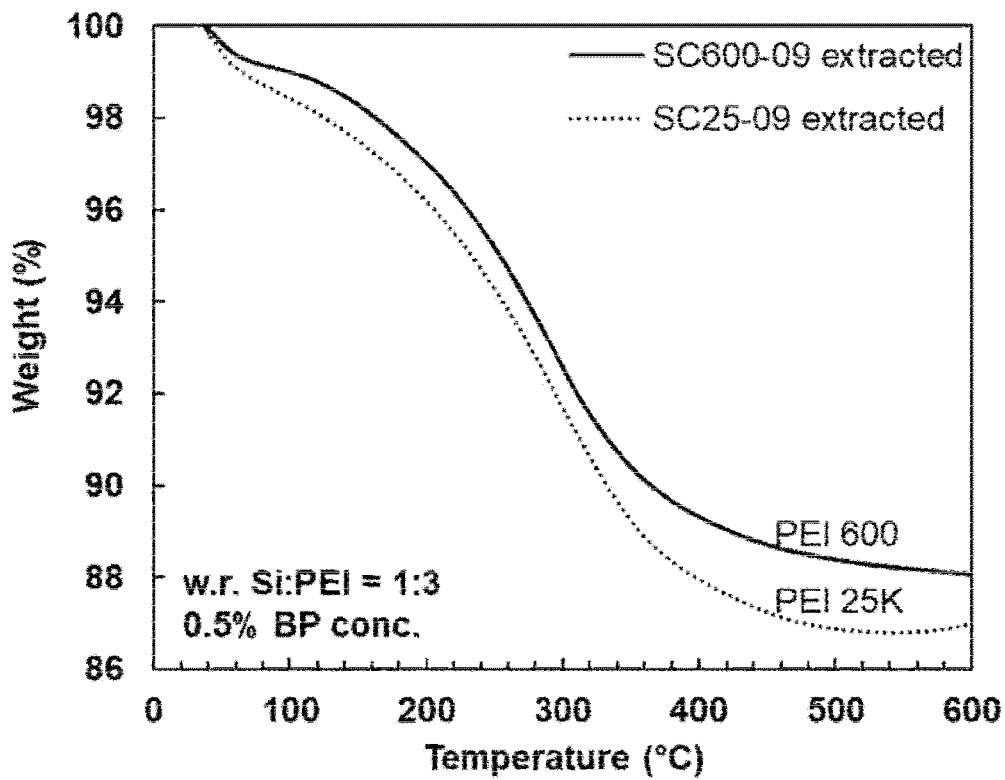
FIG. 13B is a TGA thermogram (Weight % as a function of temperature in ° C.) of nanocomposite particles according to exemplary embodiments of the invention after xylene extraction b) SC600-09 and SC25-09, for PEI 600 MW (upper line), and PEI 25,000 MW (blue line)

FIG. 13B shows a similar trend. The sample SC25-09, despite the PEI MW of 25,000, also shows a low percentage of grafted PEI (11.4%) at the weight ratio of 1:3.

However, for a weight ratio Si:PEI of 1:1, a significant increase in the percentage of grafted PEI occurs when the MW increases.

Figure 13C:
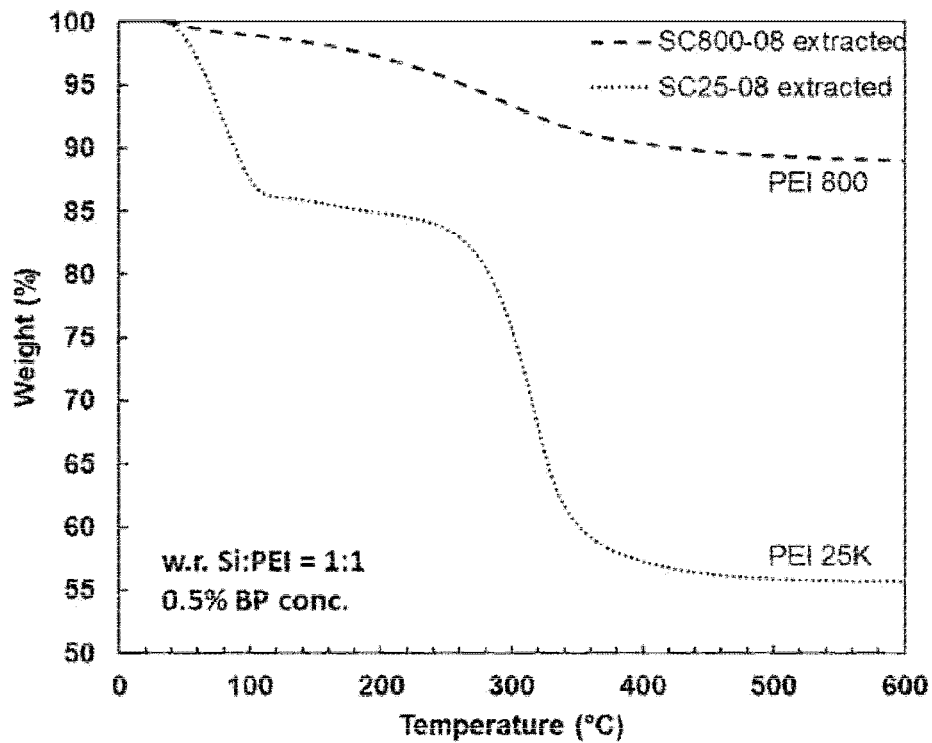
FIG. 13C is a TGA thermogram (Weight % as a function of temperature in ° C.) of nanocomposite particles according to exemplary embodiments of the invention after xylene extraction SC800-08 and SC25-08 for PEI 800 MW (upper line) and PEI 25000 MW (lower line)

FIG. 13C shows that at a weight ratio of 1:1 about three times as much PEI was grafted with PEI 25,000 MW compared with PEI 800 MW.

Figure 13D:
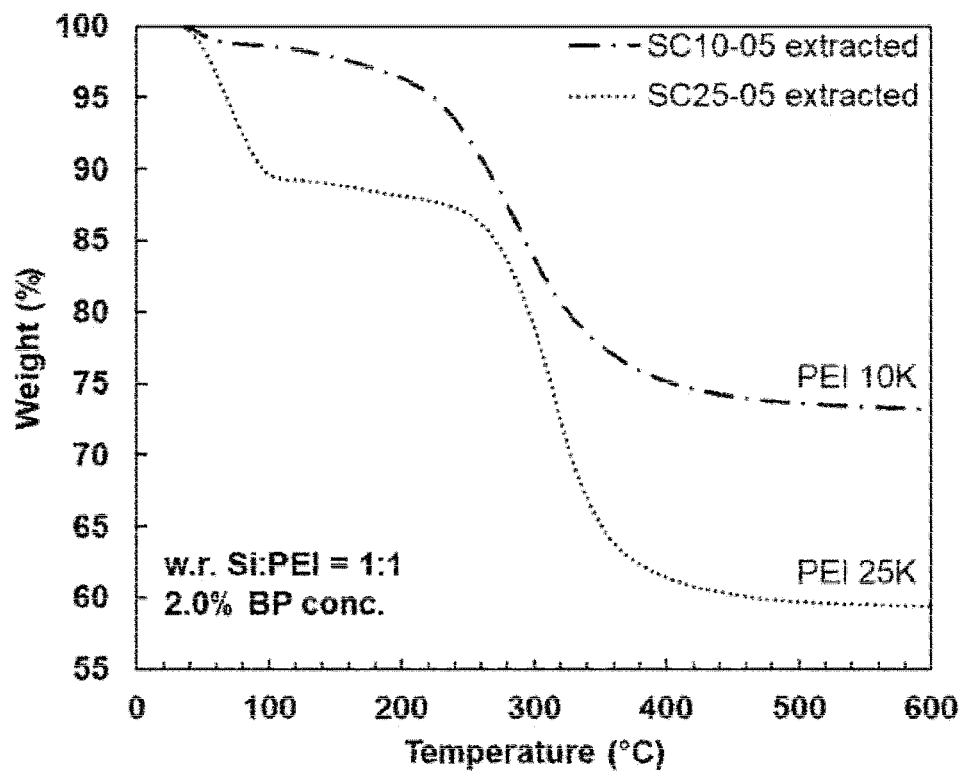
FIG. 13D is a TGA thermogram (Weight % as a function of temperature in ° C.) of nanocomposite particles according to exemplary embodiments of the invention after xylene extraction SC10-05 and SC25-05 for PEI 10,000 MW (upper line) and PEI 25,000 MW (lower line)

FIG. 13D shows a distinct raise in the grafted fraction when MW goes up from 10K to 25K, ~5% difference at a weight ratio of 1:1.

In summary, these results suggest that the way to achieve a high PEI grafting percentage is to use a high MW PEI at a low SI:PEI weight ratio.

Example 11

Alternate Nanoparticle Cores

In order to investigate the possibility of grafting PEI to other substrates, an additional experiment was conducted using different nanoparticles.

As indicated at the end of Example 8, SC25-07 was selected for further studies.

Figure 14A:
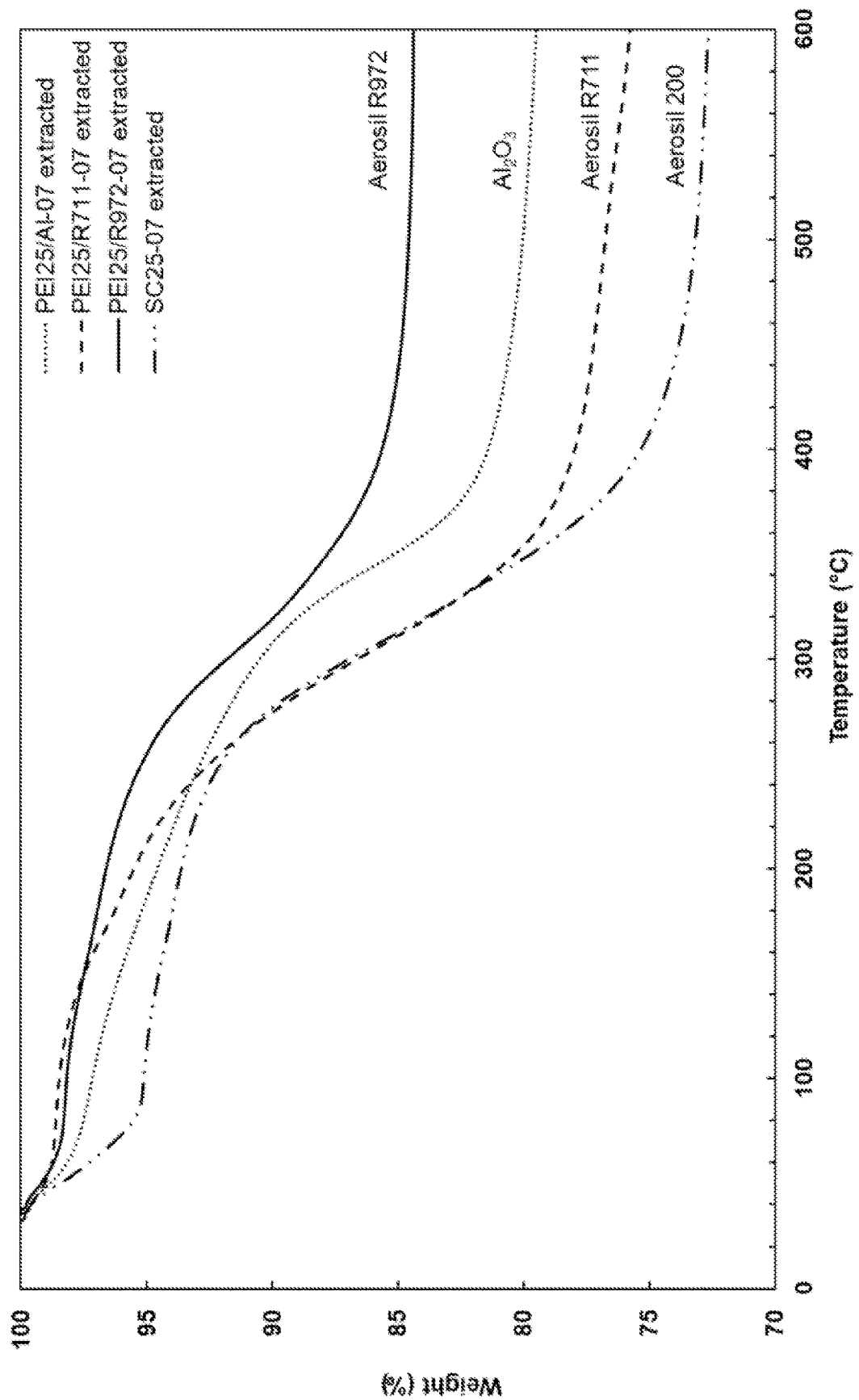
FIG. 14A is a TGA thermograms (Weight % as a function of temperature in ° C.) of nanocomposite particles according to exemplary embodiments of the invention after xylene extraction with weight ratio 3:1 and 0.5% BP concentration for AEROSIL 200 (third line from top), AEROSIL R972 (top line), AEROSIL R711 (lowest line), and Aeroxide Alu C (second line line)
Figure 14B:
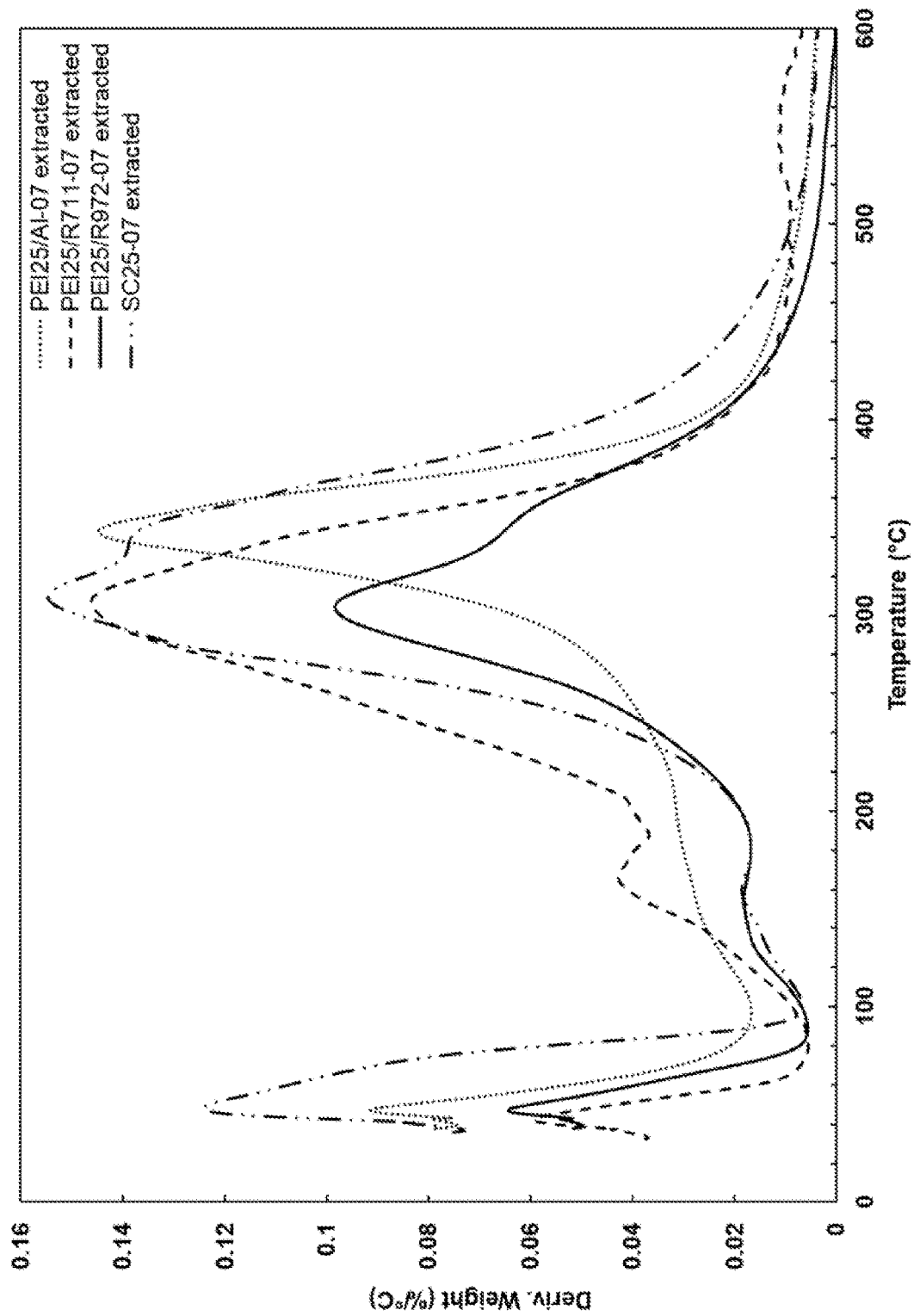
FIG. 14B is a DTG thermograms (Deriv. Weight (%/° C.) as a function of temperature in ° C.) of nanocomposite particles according to exemplary embodiments of the invention after xylene extraction with weight ratio 3:1 and 0.5% BP concentration for AEROSIL 200 (yellow line), AEROSIL R972 (grey line), AEROSIL R711 (orange line), and Aeroxide Alu C (blue line)

As shown in FIGS. 14A and 14B and Table 2, the AEROSIL 200 hydrophilic nanoparticles (second line from bottom), were replaced by three other different types of nanoparticles: hydrophobic fumed silica (AEROSIL R972, top line), methacrylic fumed silica (AEROSIL R711, lowest line), and alumina oxide (Aeroxide Alu C, second line from top). All other parameters remained as in SC25-07. FIGS. 14A and 14B show that the process works well for different materials with different surface chemistries. These results support the concept that the proposed grafting of PEI is widely applicable to different nanoparticle types.

TABLE 2

Preparation of nanocomposites based on benzoyl peroxide (BP) and different NPS type;

| | BP:Silica | | |
|---|---|---|---|
| Silica:PEI | 0.5% | 0.5% | 0.5% |
| 3:1 | PEIXX*/Al-07 | PEIXX*/R972-07 | PEIXX*/R711-07 |
| NPs Type | Aeroxide Alu C | Aerosil R972 | Aerosil R711 |

*XX reffering to the PEI MW (600, 800, 10 for 10,000 ad 25 for 25,000 g/mol)

Figure 15A:
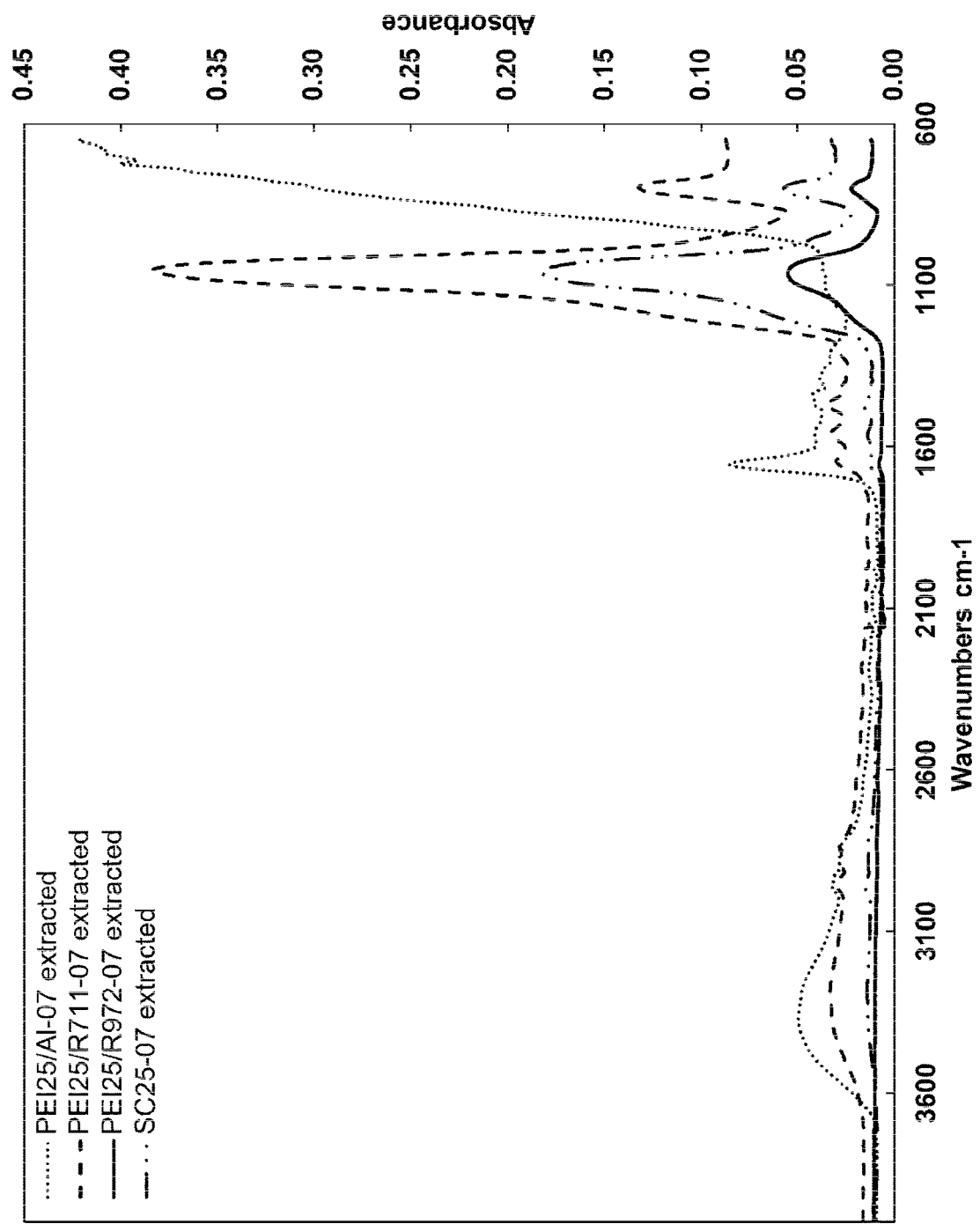
FIG. 15A is FTIR spectra (absorbance as a function of wavenumbers/cm) of nanocomposite particles according to exemplary embodiments of the invention after xylene extraction with weight ratio 3:1 and 0.5% BP concentration for AEROSIL 200 (yellow line), AEROSIL R972 (grey line), AEROSIL R711 (orange line), and Aeroxide Alu C (blue line)

FIG. 15A is an FTIR spectra (absorbance as a function of wavenumbers/cn) of PEI/Si nanocomposites for the three types of nanoparticles in FIGS. 14A and 14B: hydrophobic fumed silica (AEROSIL R972, grey line), methacrylic fumed silica (AEROSIL R711, orange line), and alumina oxide (Aeroxide Alu C, blue line).

Figure 15B:
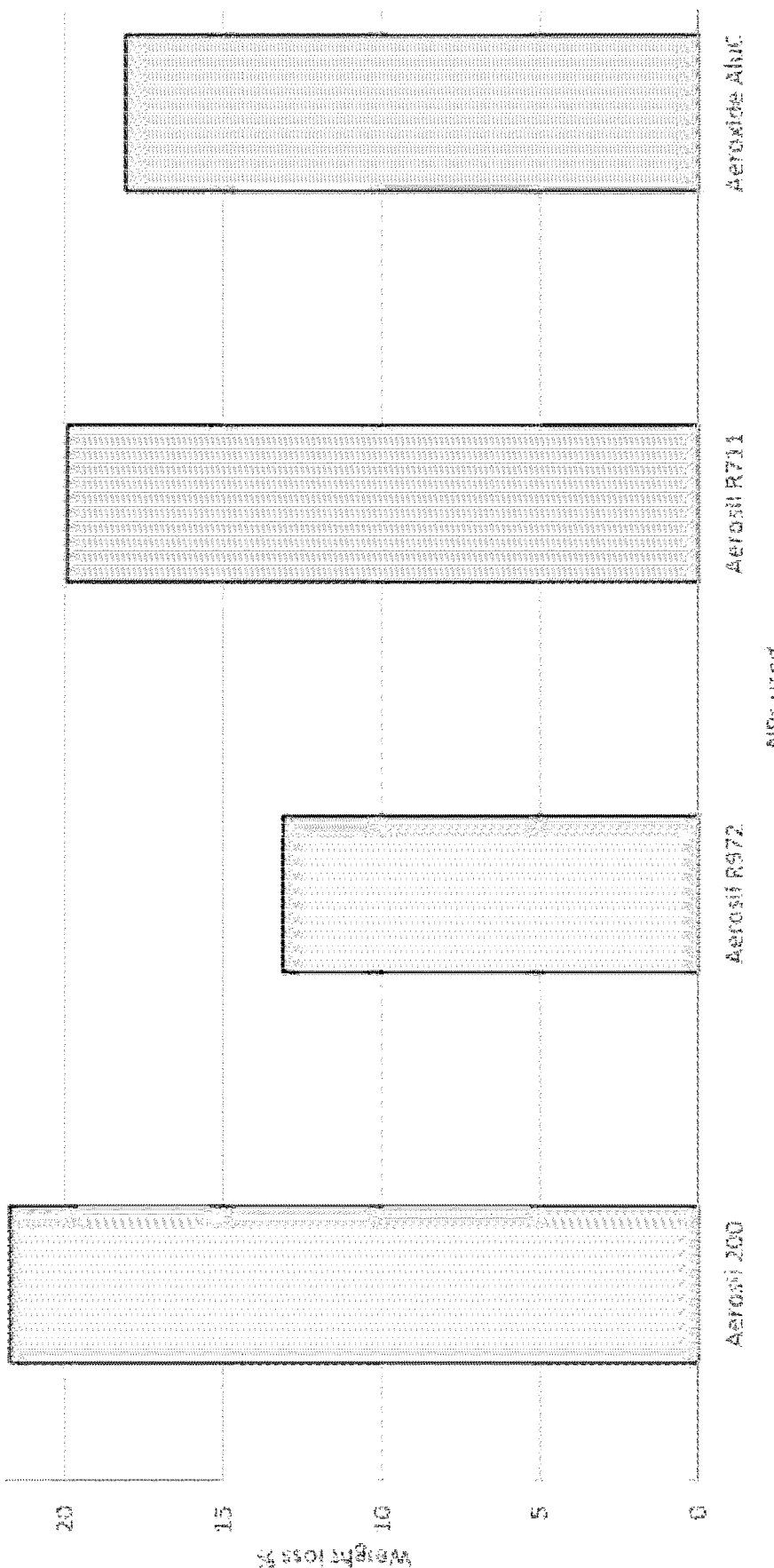
FIG. 15B is a bar graph illustrating weight loss % for PEI nanocomposite particles according to various exemplary embodiments of the invention based on particle types AEROSIL 200, AEROSIL R972, AEROSIL R711, and Aeroxide Alu C.

FIG. 15B is a bar graph illustrating weight loss % for PEI nanocomposite particles according to various exemplary embodiments of the invention based on different particle types;

This example illustrates that depending on the final application the specific nanoparticles relevant with a certain amount of PEI may vary. This allows custom tailoring of a specific formulation for each application. Also, it allows the user to choose the most valuable particles.

Example 12

SEM Characterization

In order to study the morphology of the grafted PEI compared to the reference systems and the dispersion and the connection of the PEI to the nanoparticles SEM (scanning electron microscopy) characterization was undertaken.

FIG. 16 (16A; 163B, 16C, and 163D) is a series of SEM micrographs.

Figure 16A:
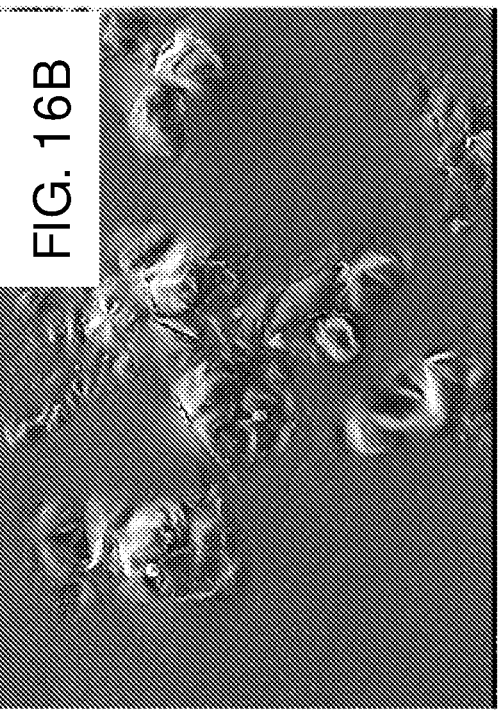
FIG. 16A is a high resolution scanning electron micrograph (HRSEM) of nanoparticles of silica with nothing grafted to them (magnification 50,000)

FIG. 16A shows AEROSIL 200 silica nanoparticles with no PEI.

Figure 16B:
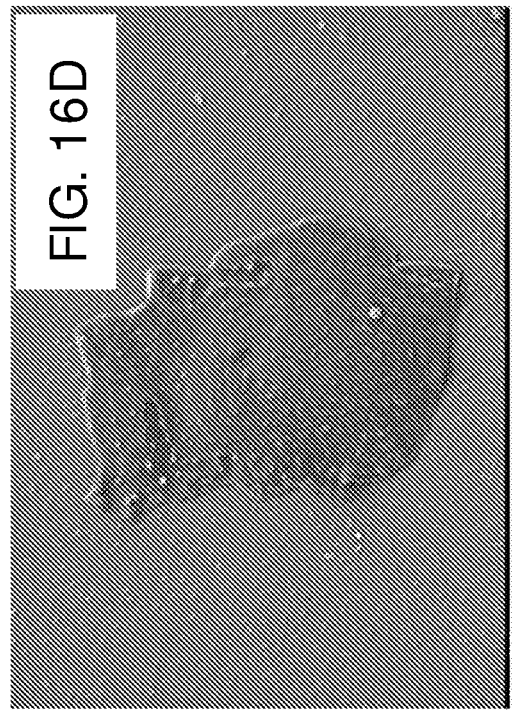
FIG. 16B is a high resolution scanning electron micrograph (HRSEM) of PEI 25,000 MW (magnification 5,000)

FIG. 16B shows PEI 25,000 MW with no nanoparticles.

Figure 16C:
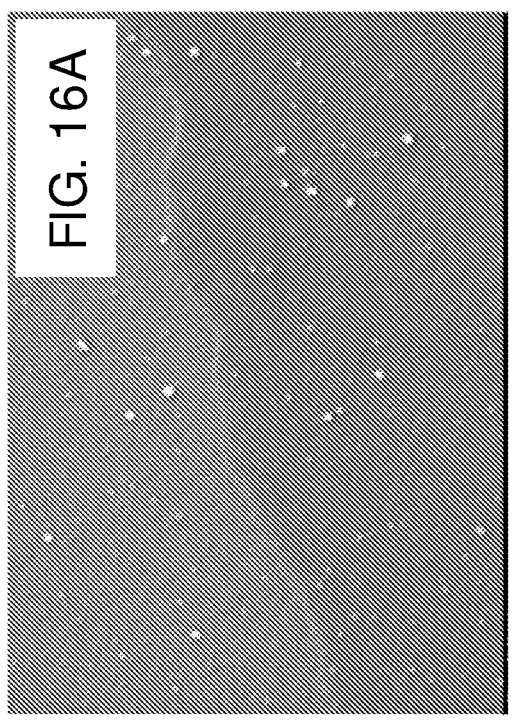
FIG. 16C is a mixture of silica nanoparticles and PEI 25,000 MW (magnification 50,000)

FIG. 16C shows a mixture of AEROSIL 200 silica nanoparticles and PEI 25,000 MW without BP initiator.

Figure 16D:
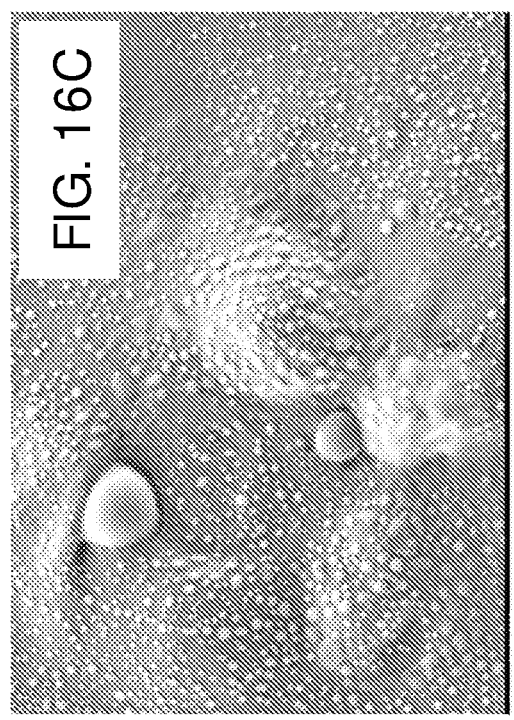
FIG. 16D is nanocomposite particles according to an exemplary embodiment of the invention (sample SC25-07 before xylene extraction) (magnification 50,000)

FIG. 16D shows sample SC25-07 before xylene extraction.

As seen in FIG. 16a, AEROSIL 200 silica nanoparticles are uniform in size with a spherical shape. This is consistent with the characteristics provided by the manufacturer. In addition few aggregations were observed, since the sample underwent sonication prior to deposition.

As seen in FIG. 16B, PEI 25,000 WM exhibits roughness which is still observable after nanoparticles are physically added (FIG. 16C). In FIG. 16C, Silica appears to be located at the surface of PEI and results in its aggregation. The mixture of FIG. 13B does not contain an initiator so no grafting occurs.

FIG. 16D shows that after the grafting reaction the roughness of PEI 25,000K MW is decreased to give way to a relatively smooth surface. This result suggests that the grafted PEI is well dispersed within the free PEI, acting like a surfactant.

Figure 17A:
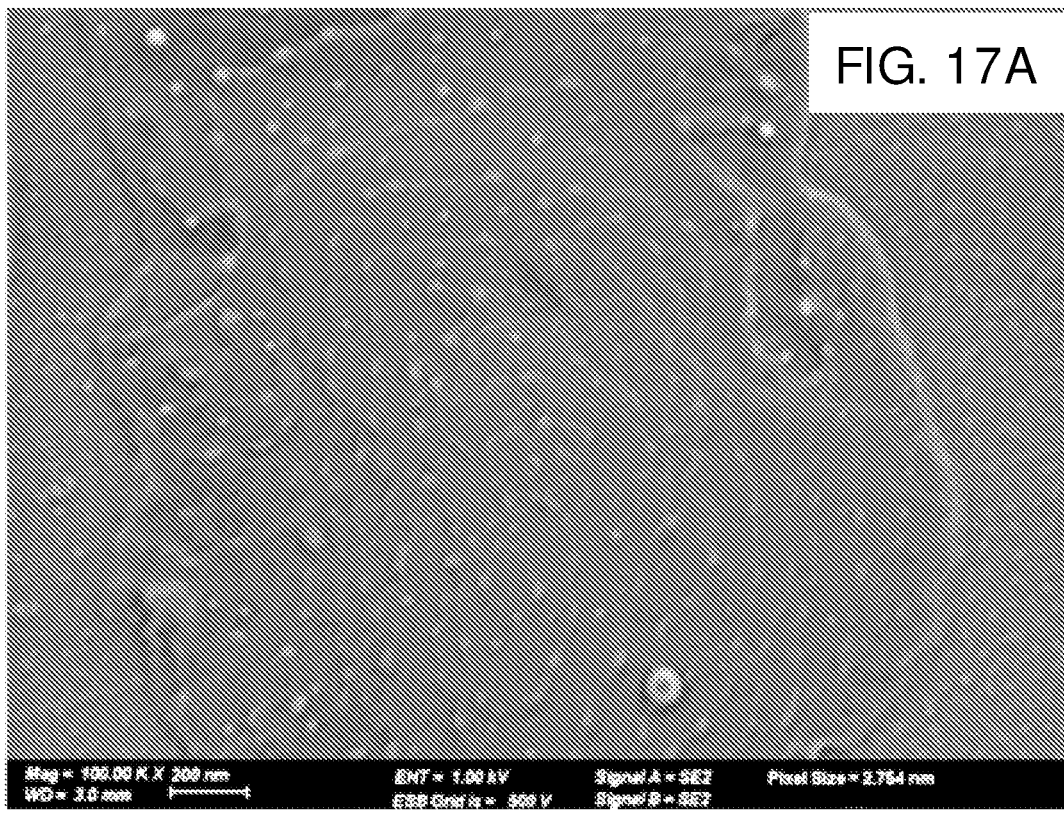
FIG. 17A is an HRSEM picture of nanocomposite particles according to an exemplary embodiment of the invention (sample SC25-07 before xylene extraction) (magnification 100,000)
Figure 17B:
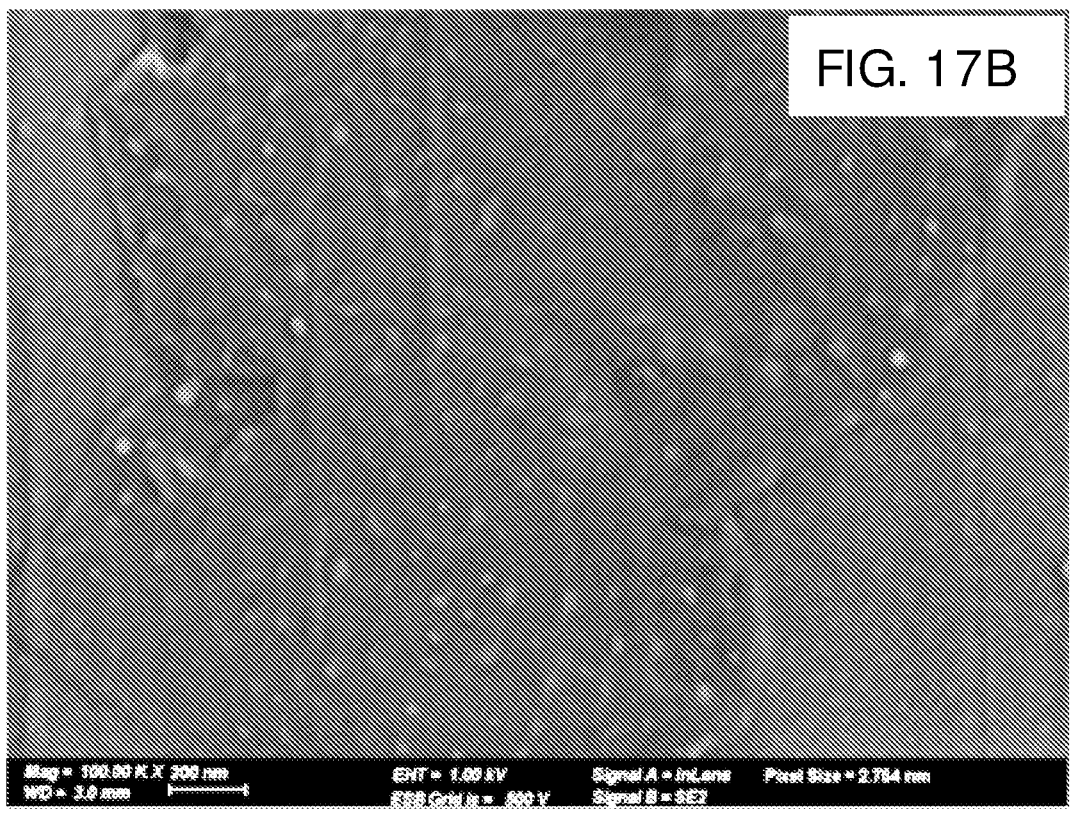
FIG. 17B is an HRSEM picture of nanocomposite particles according to an exemplary embodiment of the invention (sample SC25-07 before xylene extraction) (magnification 100,000)

FIG. 17A and FIG. 17B are SEM micrographs of SC25-07 nanocomposite particles as in FIG. 16D at a higher magnification. The good dispersion of nanoparticles in the free PEI further supports the added value of grafted-NP rather than physically dispersing it, without chemical bond. These images further support the formation of new chemical bonds. The hydroxyl groups present at the silica surface have successfully reacted with the amino groups of PEI. It is known that at acid and neutral pH, amino groups of PEI are protonated. A solution of SC25-07 in toluene has a pH of 7. The extended form of chains observed in FIGS. 17A and 17B may be due to electrostatic repulsion between the different groups of PEI.

Some agglomerations can also be seen. These agglomerations may be the result of non-grafted PEI chains and/or aggregates of nanoparticles.

This example illustrates that overall, the grafting is important to finely disperse the nanoparticles within the matrix. When the nanoparticles are dispersed their surface increases thus increasing the adsorbing area. In some embodiments the increased adsorbing area contributes to an increase in rate of adsorption of VOCs faster and/or to an increase in the amount of VOCs adsorbed.

Example 13

PEI Grafted to Nanoparticles Reduces Emissions from Polymeric Materials

In order to evaluate the potential of PEI nanocomposite particles according to exemplary embodiments of the invention in reducing emissions from polymeric materials they were compared to a commercial odor reduction additive.

Figure 18:
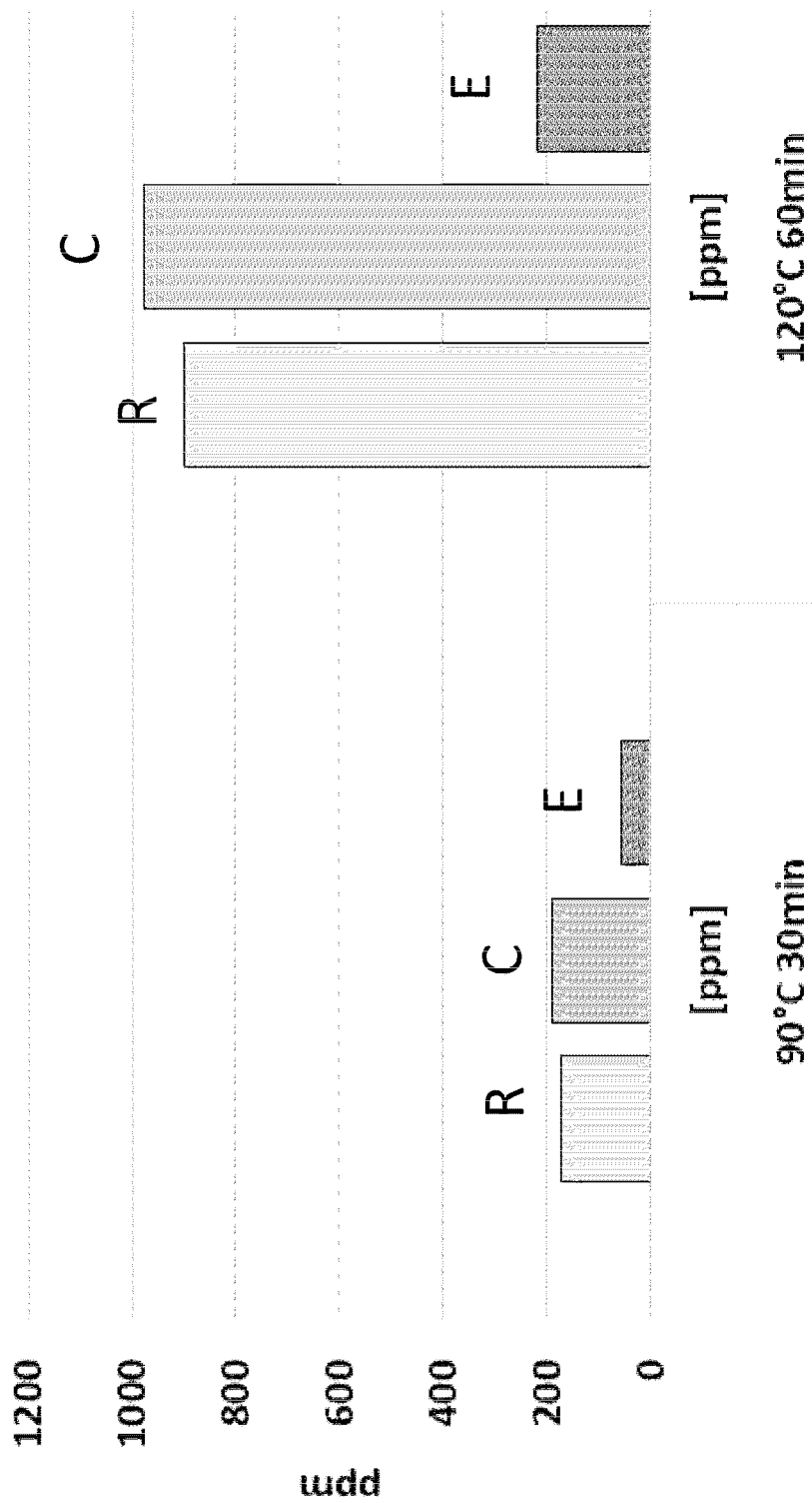
FIG. 18 is a bar graph illustrating total emissions in PPM as measured by GCMS after 30 minutes at 90° C. and after 60 minutes at 120° C. for recycled PVC with foaming agent where R indicates untreated reference sample, C indicates sample with 0.5% of a commercial odor reduction additive and E indicates sample with 0.5% PEI nanocomposite particles according to an exemplary embodiment of the invention.

FIG. 18 is a bar graph illustrating total emissions in PPM as measured by GCMS. Measurements were taken after 30 minutes at 90° C. and after 60 minutes at 120° C. The test material was recycled PVC with foaming agent added.

In FIG. 18:

R indicates untreated reference sample containing test material only (poly (vinyl chloride) (PVC) with azo foaming agent)

C indicates a positive control sample with 0.5% of a commercial odor reduction additive plus test material; and and E indicates an experimental sample with 0.5% PEI nanocomposite particles according to an exemplary embodiment of the invention.

This example illustrates that PEI nanocomposite particles according to an exemplary embodiment are more effective than the commercially available product at reducing emissions from PVC under the indicated assay conditions.

Example 14

PEI Grafted to Nanoparticles Reduces Odors

In order to confirm the results of the previous example an additional experiment was conducted using G1 polymer (Plastofil, Israel). 30% recycled material was mixed with 70% G1 pellets with or without an odor reducing additive and extruded. A 5 member panel of human volunteers smelled each sample and rated it on a scale of 0 (no perceptible odor) to 5 (very strong odor). Odor reducing additives were 2% of a commercial odor reduction additive, 0.25% ungrafted PEI and 0.25% PEI nanocomposite particles according to an exemplary embodiment of the invention (0.25% SC-07 25).

Figure 19:
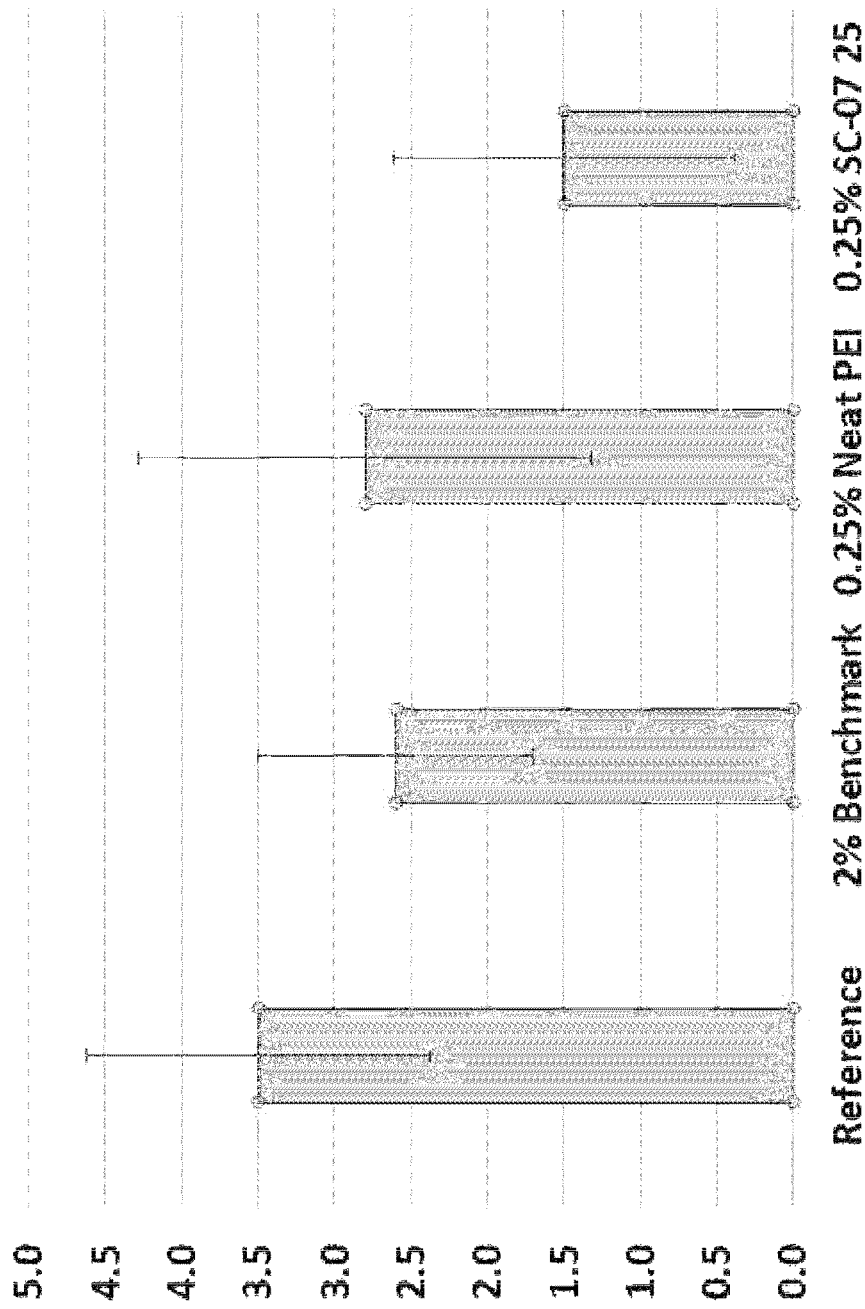
FIG. 19 is a bar graph illustrating odor in arbitrary units as perceived by a panel of 5 Human testers for Plastofil G1 panels (Reference), the same panels with 2.0% of a commercial odor reduction additive (Benchmark), the same panels with ungrafted PEI (0.25% Neat PEI), and the same panels with PEI nanocomposite particles according to an exemplary embodiment of the invention (0.25% SC-07 25)

FIG. 19 shows that 0.25% PEI nanocomposite particles according to an exemplary embodiment of the invention reduced odors more than 2% of the commercial odor reduction product and more than PEI alone.

This example illustrates that grafting PEI to a nanoparticulate substrate increasers its effectiveness in reducing odors emanating from polymeric materials.

Example 15

Graphical Summaries

In order to make the data presented in examples 22 through 10 more comprehensible they are summarized graphically.

Figure 20:
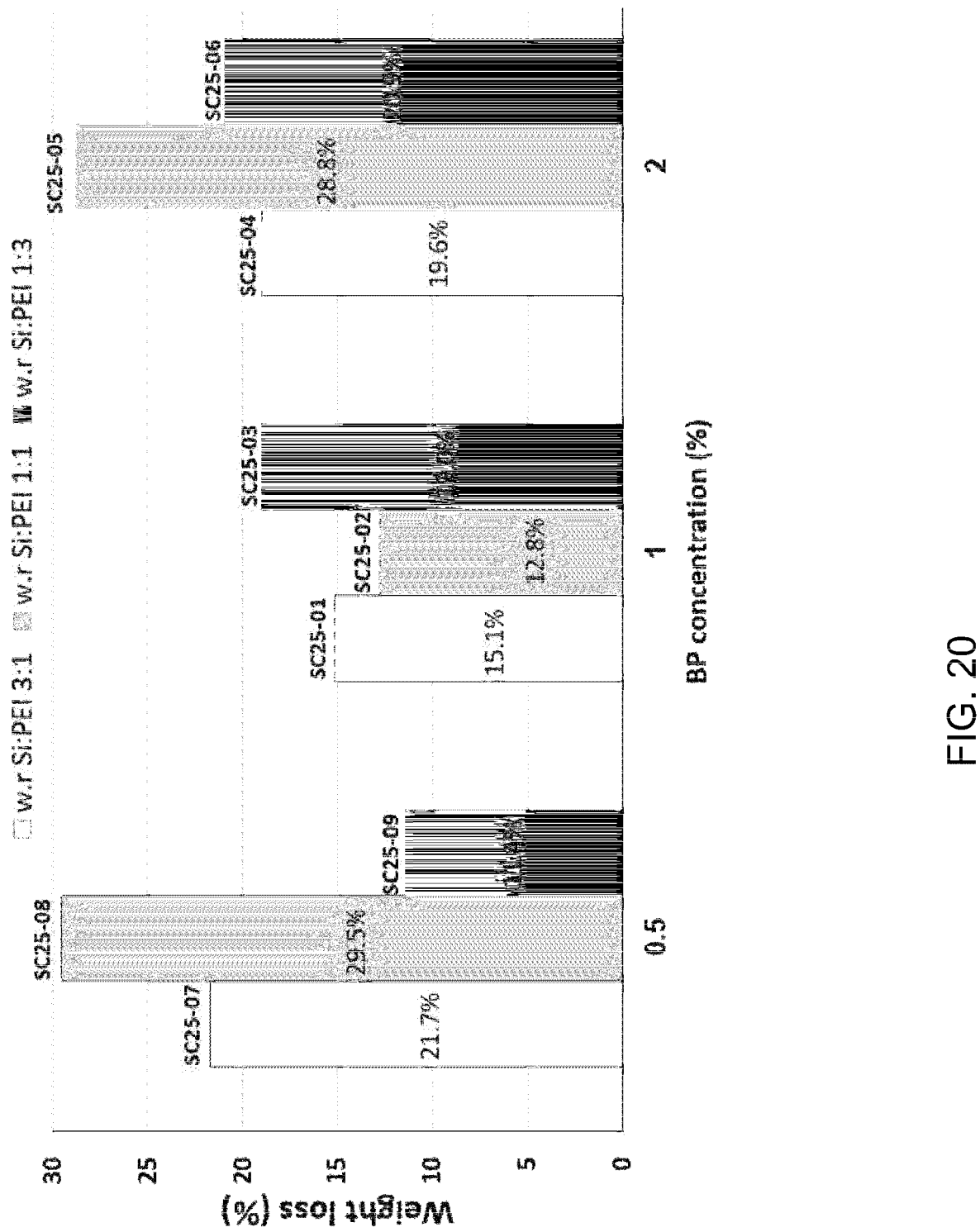
FIG. 20 is a bar graph illustrating weight loss % as a function of PB concentration (%) for PEI 25,000 MW nanocomposite particles with different SI:PEI weight ratios according to various exemplary embodiments of the invention.
Figure 21:
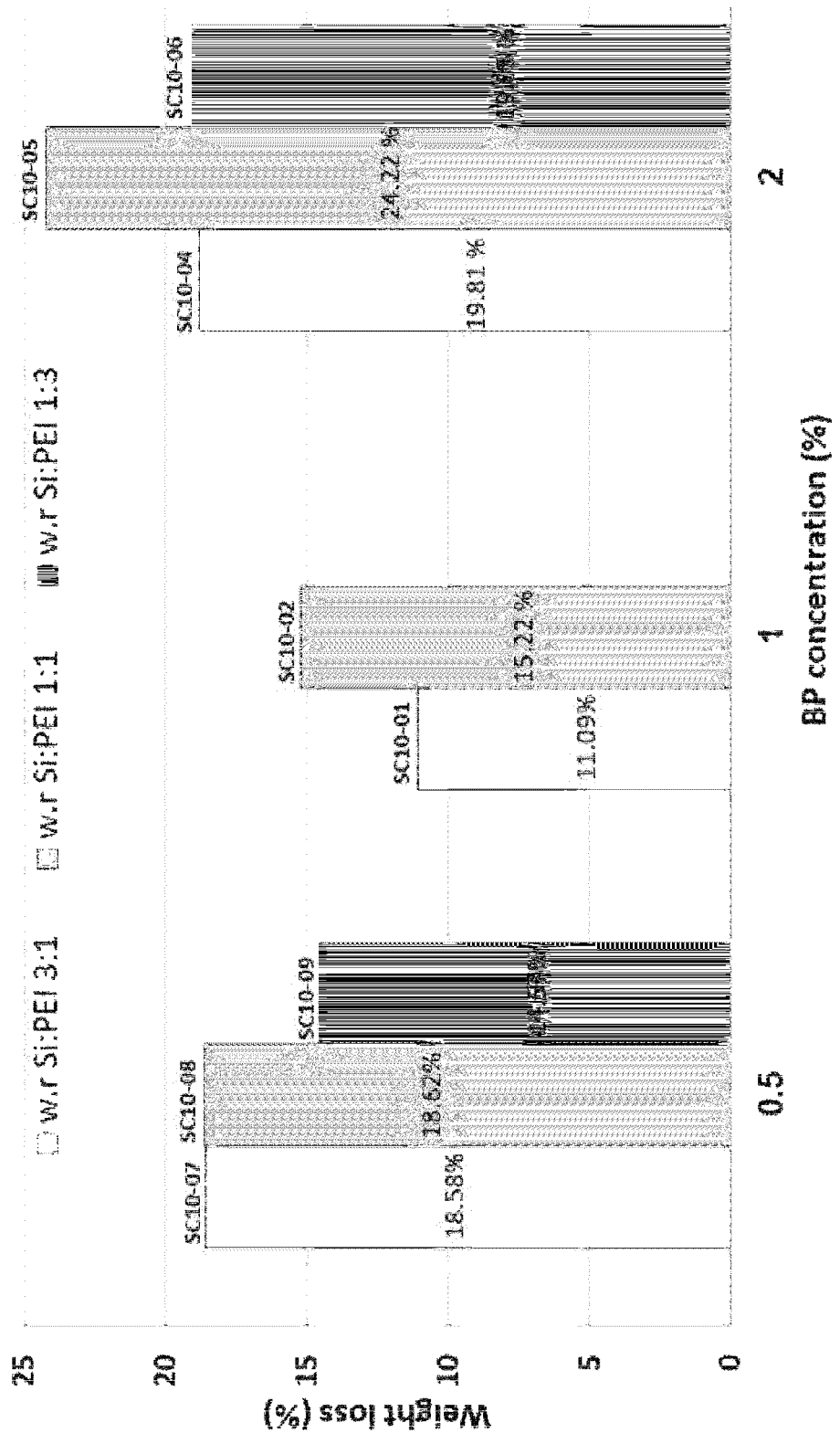
FIG. 21 is a bar graph illustrating weight loss % as a function of PB concentration (%) for PEI 10,000 MW nanocomposite particles with different SI:PEI weight ratios according to various exemplary embodiments of the invention.
Figure 22:
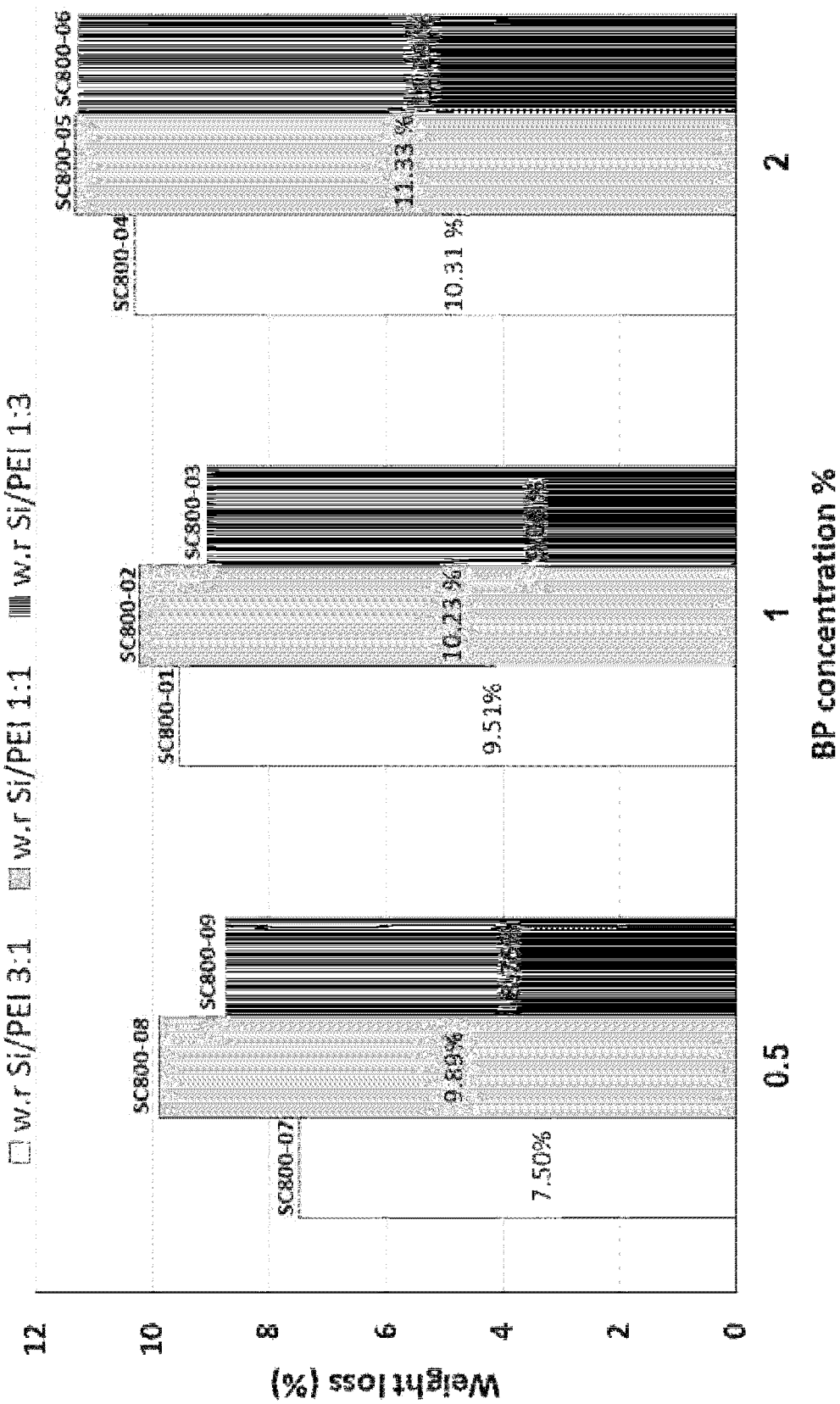
FIG. 22 is a bar graph illustrating weight loss % as a function of PB concentration (%) for PEI 800 MW nanocomposite particles with different SI:PEI weight ratios according to various exemplary embodiments of the invention.

FIG. 20 is a bar graph illustrating weight loss % as a function of PB concentration (%) for PEI 25,000 MW nanocomposite particles with different SI:PEI weight ratios according to various exemplary embodiments of the invention;

FIG. 21 is a bar graph illustrating weight loss % as a function of PB concentration (%) for PEI 10,000 MW nanocomposite particles with different SI:PEI weight ratios according to various exemplary embodiments of the invention; and FIG. 22 is a bar graph illustrating weight loss % as a function of PB concentration (%) for PEI 800 MW nanocomposite particles with different SI:PEI weight ratios according to various exemplary embodiments of the invention.

These graphical summaries make it clear that the grafting reaction occurs with different parameters and after optimization, the SC-07-25 composition was selected as the most promising, since it has the highest grafted PEI with minimum reagents used (i.e. it will be cheaper than others).

Example 16

Exemplary Scale Up

The description above refers primarily to laboratory scale procedures.

In order to move towards industrial production, limited scale up has been conducted and is described here in detail. This should provide sufficient guidance for an industrial process specialist to scale the process up further.

A 100 L container was placed in a cooling bath. A desired amount of nanoparticles (e.g. AEROSIL 200) was added to ethanol 99.9% with a volume ratio of 1% kg/liter and the cooling system was activated.

Nanoparticles were dispersed by sonication for at least 2 hours using a 4500 W sonicator in intervals of 15 minutes at an amplitude of 50%.

PEI 25000 MW was pre-dissolved in 1 L ethanol and sonicated using a 750 W sonicator for 15 minutes (3 intervals of 5 minutes and an amplitude of 25%). For lower MW PEI sonication the pre-dissolving may be reduced or eliminated as the viscosity is lower.

The pre-dissolved PEI 25000 MW solution and the desired amount of recrystallized BP were added to the silica dispersion (in the 100 L container). The nanoparticles, PEI and BP were sonicated together for at least 1 hour using the 4500 W sonicator at 15 minutes intervals and an amplitude of 50%.

The resultant solution was pumped to another container and the reaction was allowed to come to completion during 24 hours. The reaction mixture was filtered using a vacuum filtration funnel to produce a filter cake. The filter cake was collected and dried in a vacuum oven at 60° C. overnight. In some embodiments further washing with ethanol and/or extraction with xylene is conducted as described hereinabove.

The following tables show exemplary reagent amounts.

TABLE 3

Exemplary SI/PEI nanocomposite recipe

| SC25-07-T1 | Characteristics | MW g/mol | m, g | V, mL | actual, g | CAS |
|---|---|---|---|---|---|---|
| Aerosil 200 | Hydrophilic fumed silica | | 160 | | 160 | 112945-52-5 |
| PEI 25 000 Lupasol WF | Polymer | 25K | 52.8 | | 52.8 | 9002-98-6 |
| BP recrystallized ($C_{14}H_{10}O_4$) | Initiator | 242.23 | 0.8 | | 0.8006 | 94-36-0 |
| EtOH (C2H5OH) | Solvent | 46.07 | | 16,000 | | |
| | wt. ratio NP/PEI | 3 | | | | |
| | wt. ratio BP/silica | 0.5% | | | | |

TABLE 4

Additional Exemplary SI/PEI Nanocomposite Recipe

| SC25-07-T2 | Characteristics | MW g/mol | m, g | V, mL | actual, g | CAS |
|---|---|---|---|---|---|---|
| Aerosil 200 | Hydrophilic fumed silica | | 150 | | 150 | 112945-52-5 |
| PEI 25 000 Lupasol WF | Polymer | 25K | 49.5 | | 49.5 | 9002-98-6 |
| BP recrystallized ($C_{14}H_{10}O_4$) | Initiator | 242.23 | 0.75 | | 0.7505 | 94-36-0 |

TABLE 4-continued

Additional Exemplary SI/PEI Nanocomposite Recipe

| SC25-07-T2 | Characteristics | MW g/mol | m, g | V, mL | actual, g | CAS |
|---|---|---|---|---|---|---|
| EtOH (C2H5OH) | Solvent | 46.07 | | 15,000 | | |
| | wt. ratio NP/PEI | 3 | | | | |
| | wt. ratio BP/silica | 0.5% | | | | |

TABLE 5

Further Additional Exemplary SI/PEI Nanocomposite Recipe

| SC25-07-T3 | Characteristics | MW g/mol | m, g | V, mL | actual, g | CAS |
|---|---|---|---|---|---|---|
| Aerosil 200 | Hydrophilic fumed silica | | 210 | | 210 | 112945-52-5 |
| PEI 25 000 Lupasol WF | Polymer | 25K | 69.3 | | 69.3 | 9002-98-6 |
| BP recrystallized ($C_{14}H_{10}O_4$) | Initiator | 242.23 | 1.05 | | 1.0505 | 94-36-0 |
| EtOH (C2H5OH) | Solvent | 46.07 | | 21,000 | | |
| | wt. ratio NP/PEI | 3 | | | | |
| | Wt. ratio BP/silica | 0.5% | | | | |

Example 17

PEI Grafted to Carbon Black Nanoparticles

In order to demonstrate that the grafting PEI methods described above are applicable to a wide range of nanoparticle types an additional experiment was conducted using EC 300 Carbon black nanoparticles and PEI 25,000 MW or PEI 25,000 MW as a reference standard. A weight ratio of 3:1 nanoparticles to PEI was employed.

Figure 23A:
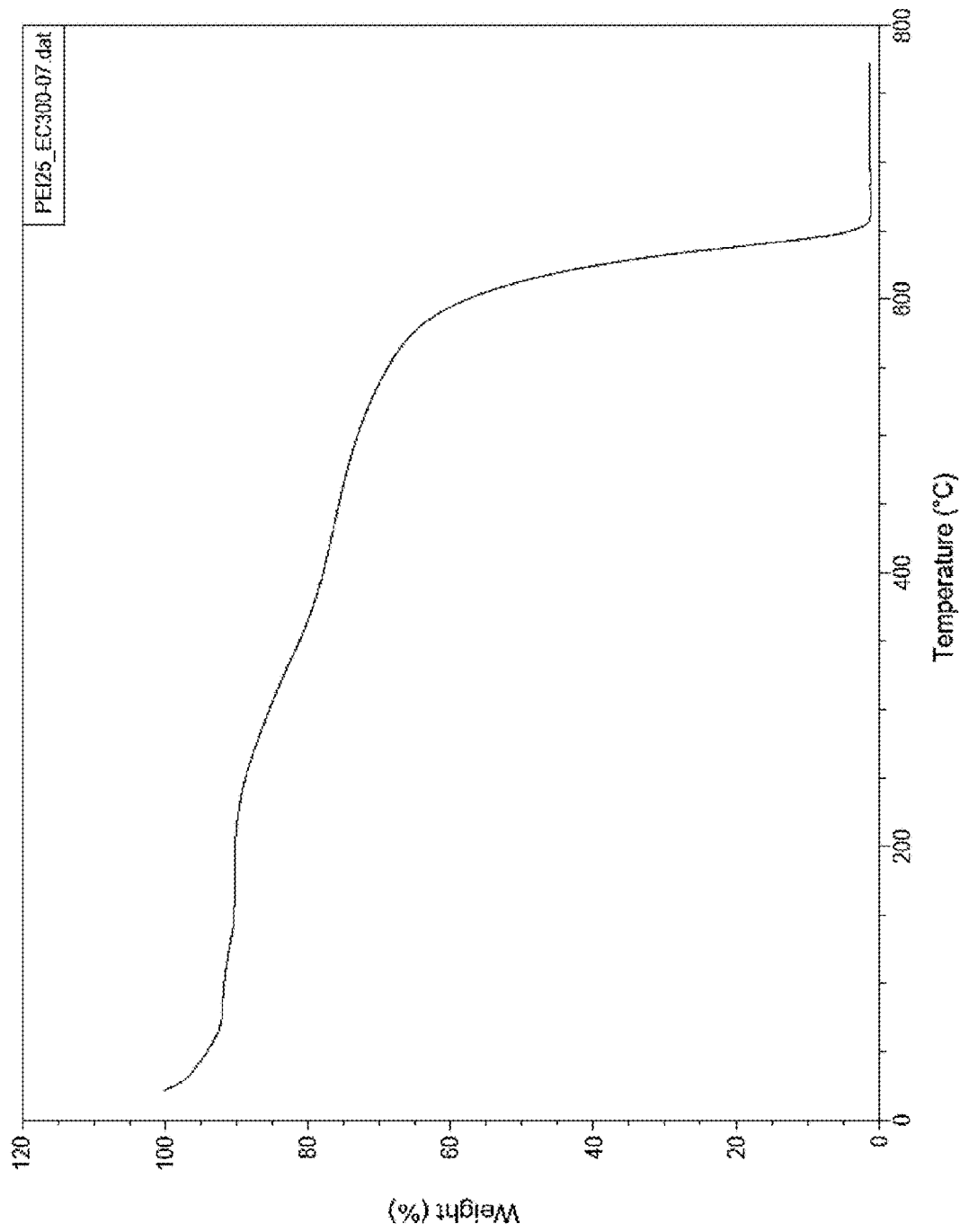
FIG. 23A is a TGA thermogram (Weight % as a function of temperature in ° C.) of nanocomposite particles according to exemplary embodiments of the invention in in which EC 300 Carbon black nanoparticles were grafted to for PEI 25,000 MW after xylene extraction.
Figure 23B:
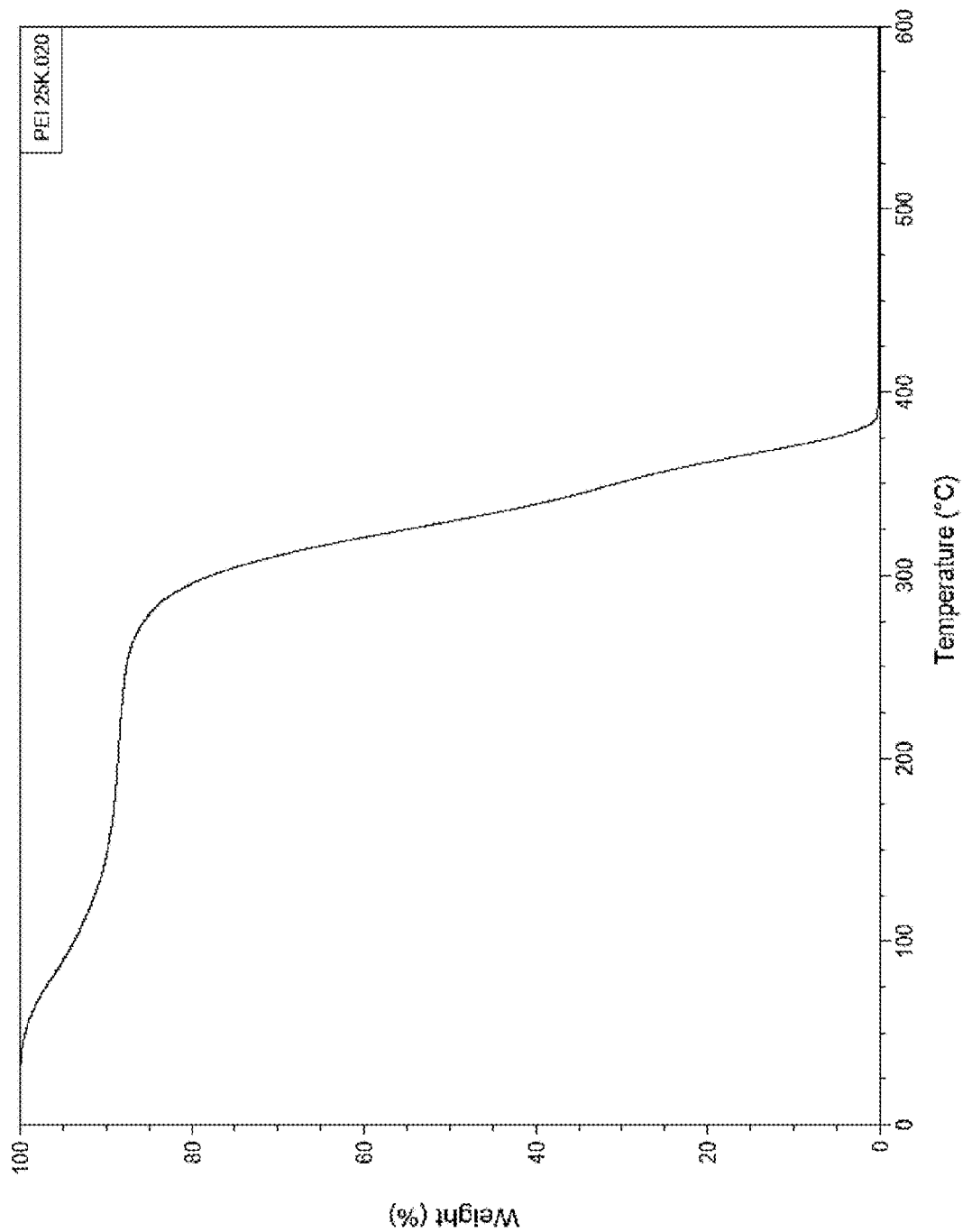
FIG. 23B is a TGA thermogram (Weight % as a function of temperature in ° C.) for PEI 25,000 MW as a reference standard for FIG. 23A.
Figure 23C:
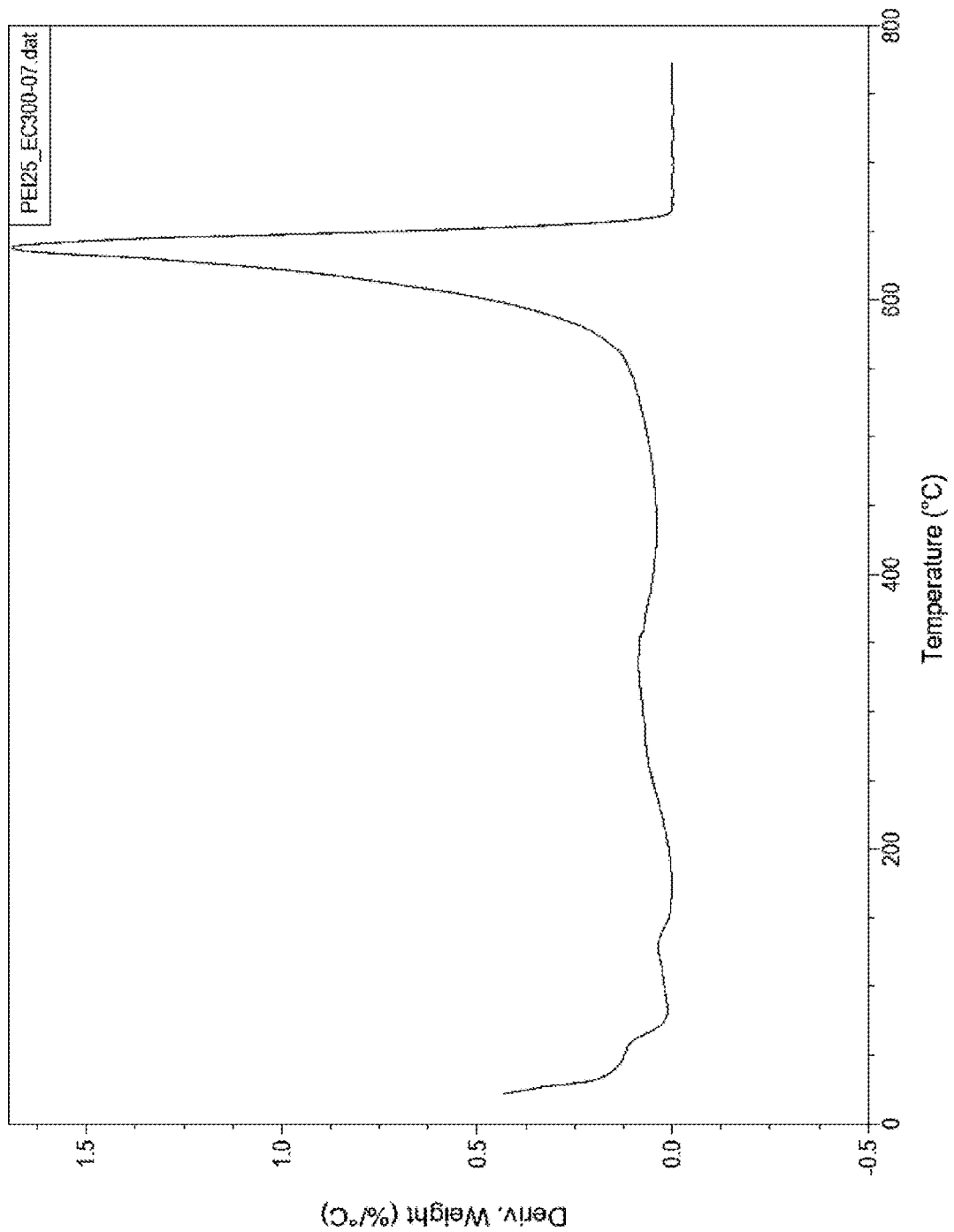
FIG. 23C is a DTG thermogram ([Weight derivative (%/° C.)] as a function of temperature in ° C.) of nanocomposite particles according to exemplary embodiments of the invention in in which EC 300 Carbon black nanoparticles were grafted to for PEI 25,000 MW after xylene extraction (as in FIG. 23A)
Figure 23D:
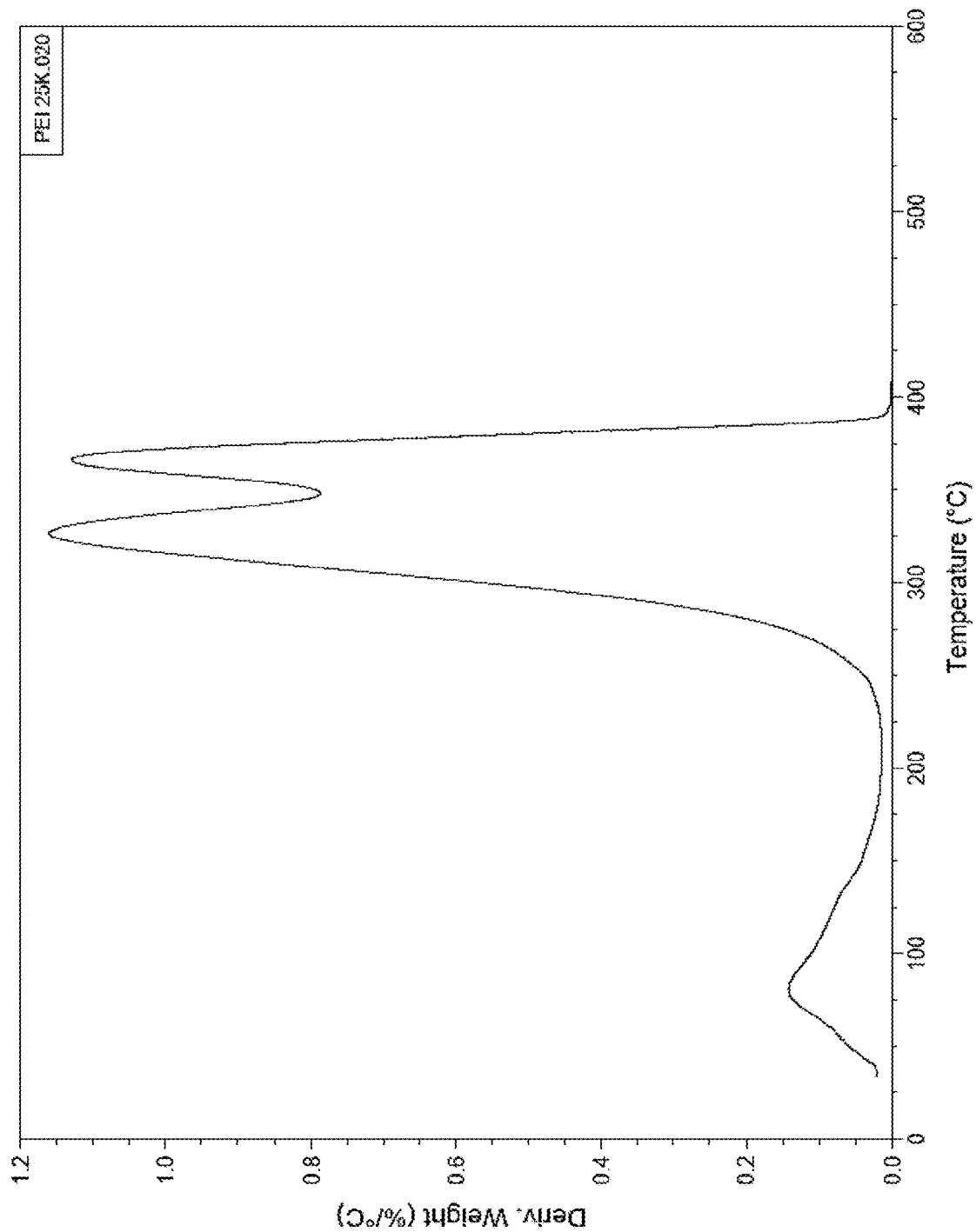
FIG. 23D is a DTG thermogram ([Weight derivative (%/° C.)] as a function of temperature in ° C.) for PEI 25,000 MW as a reference standard for FIG. 23C.

Results are summarized graphically in FIG. 23A and FIG. 23B which present TGA thermograms, and FIG. 23C and FIG. 23D which present DTG thermograms.

FIG. 23A and FIG. 23C show results for nanocomposite particles according to exemplary embodiments of the invention in which EC 300 Carbon black nanoparticles were grafted to PEI 25,000 MW after xylene extraction.

FIG. 23B and FIG. 23D show results for PEI 25,000 MW as a reference standard

These results demonstrate that PEI grafts to carbonaceous particles. In this experiment the grafting percentage was calculated as 14% or 56% of the PEI initially added to the reaction.

When compared to previous examples 5 and 6 these results suggest that grafting of PEI to carbon black was slightly less than for silica particles. However, use of carbonaceous particle has the potential to broaden the range of odorants which can be suppressed.

Example 18

PEI Grafted to Carbon Nanotube Nanoparticles

In order to demonstrate that the grafting PEI methods described above are applicable to a wide range of nanoparticle types an additional experiment was conducted using SW 07 Carbon nanotube nanoparticles and PEI 25,000 MW or SW 07 Carbon nanotube nanoparticles without PEI as a reference standard. A weight ratio of 3:1 nanoparticles to PEI was employed.

Figure 24A:
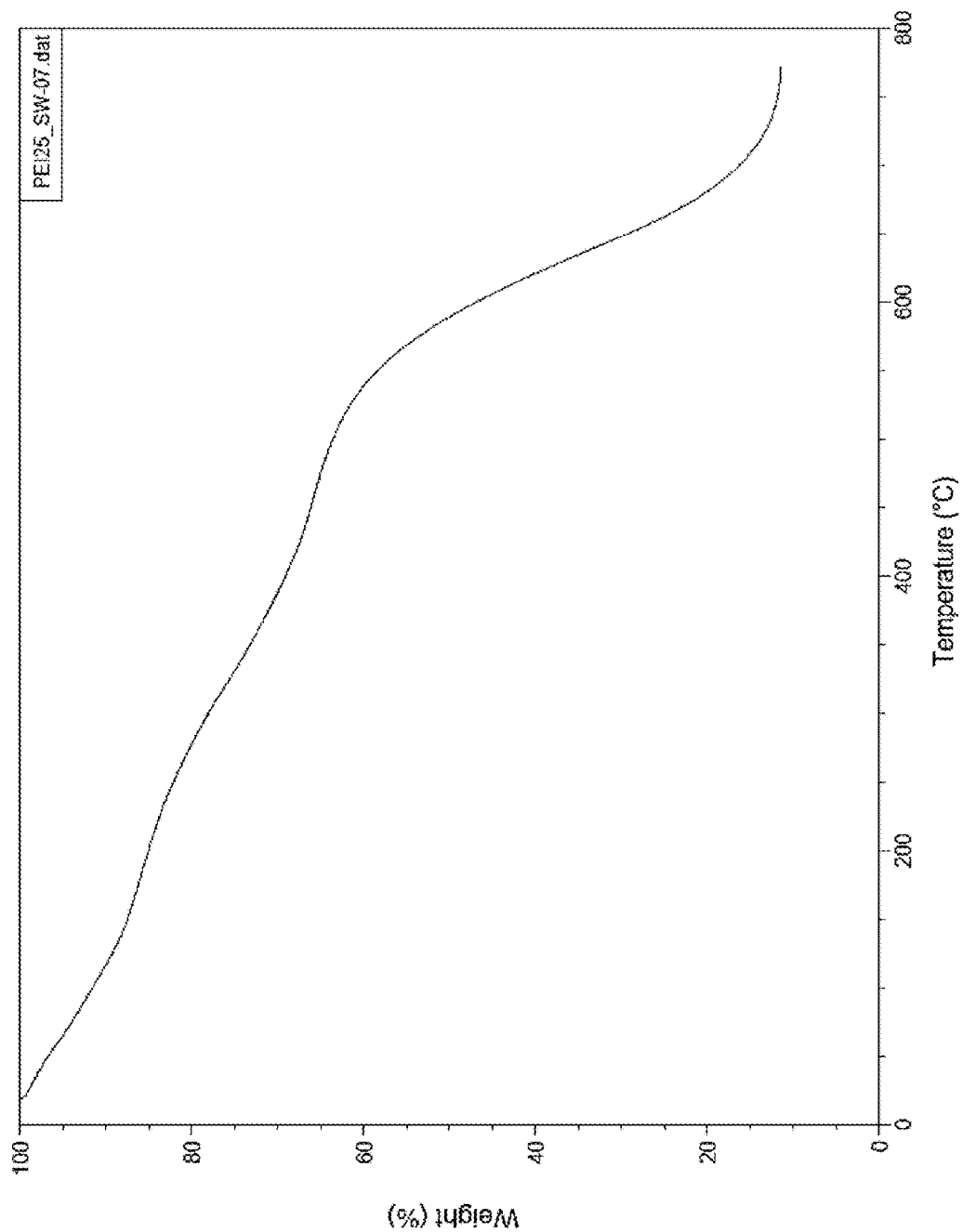
FIG. 24A is a TGA thermogram (Weight % as a function of temperature in ° C.) of nanocomposite particles according to exemplary embodiments of the invention in which SW 07 single wall Carbon Nanotube nanoparticles were grafted to for PEI 25,000 MW (after xylene extraction.
Figure 24B:
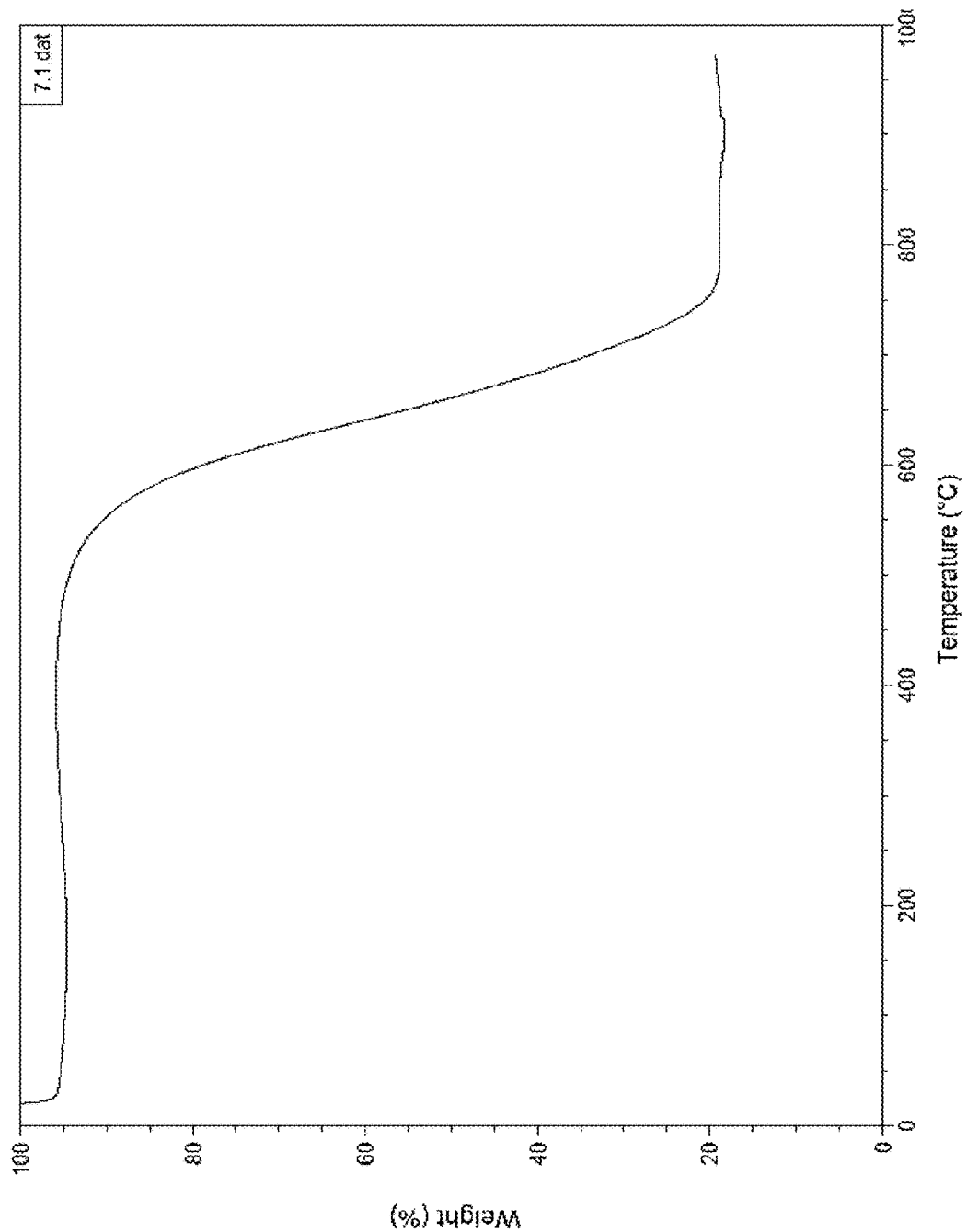
FIG. 24B is a TGA thermogram (Weight % as a function of temperature in ° C.) of SW 07 Carbon nanotube nanoparticles without PEI as a reference standard for FIG. 24A.
Figure 24C:
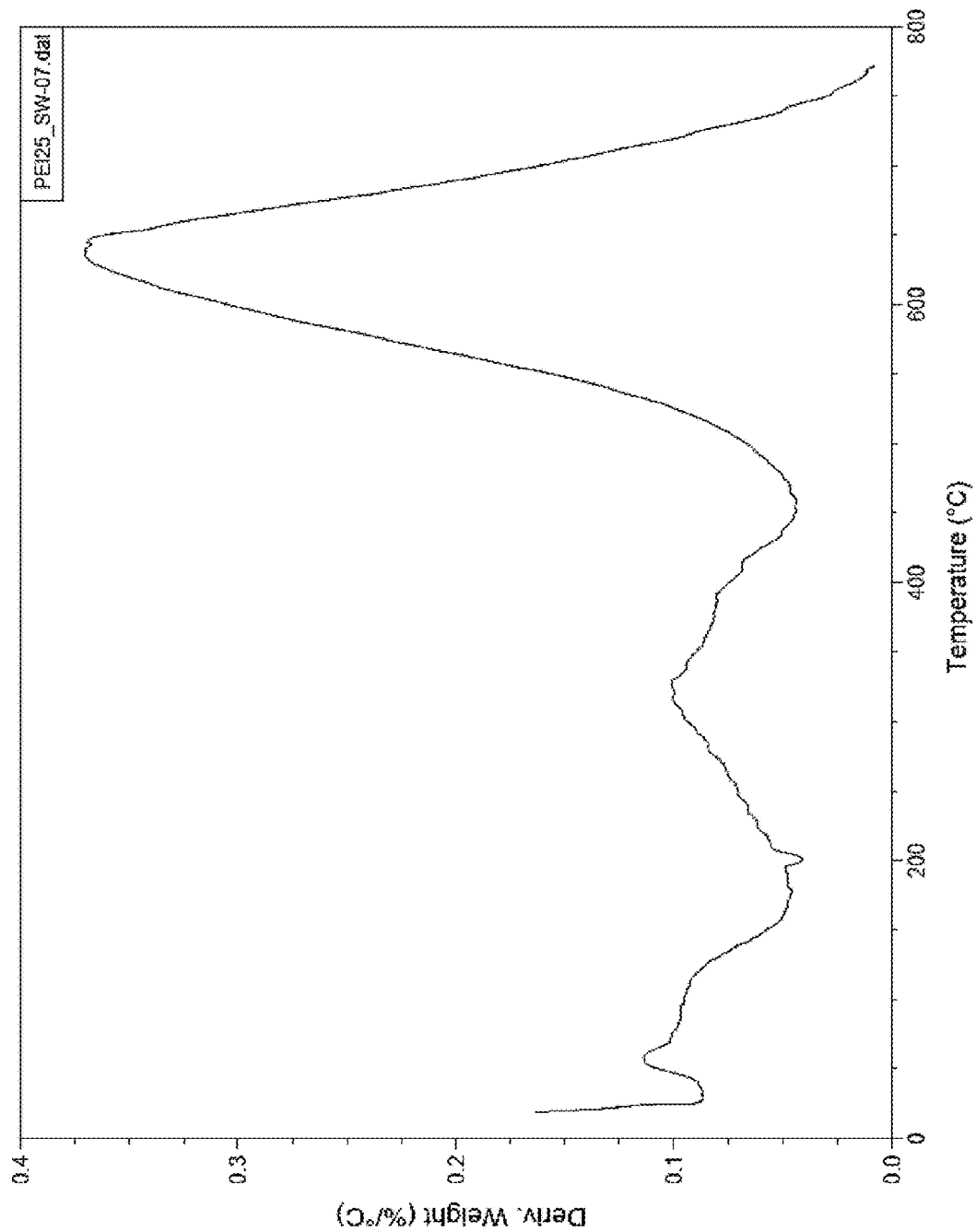
FIG. 24C is a DTG thermogram [Weight derivative (%/° C.)] as a function of temperature in ° C. of nanocomposite particles according to exemplary embodiments of the invention in which SW 07 single wall Carbon Nanotube nanoparticles were grafted to for PEI 25,000 MW (after xylene extraction.
Figure 24D:
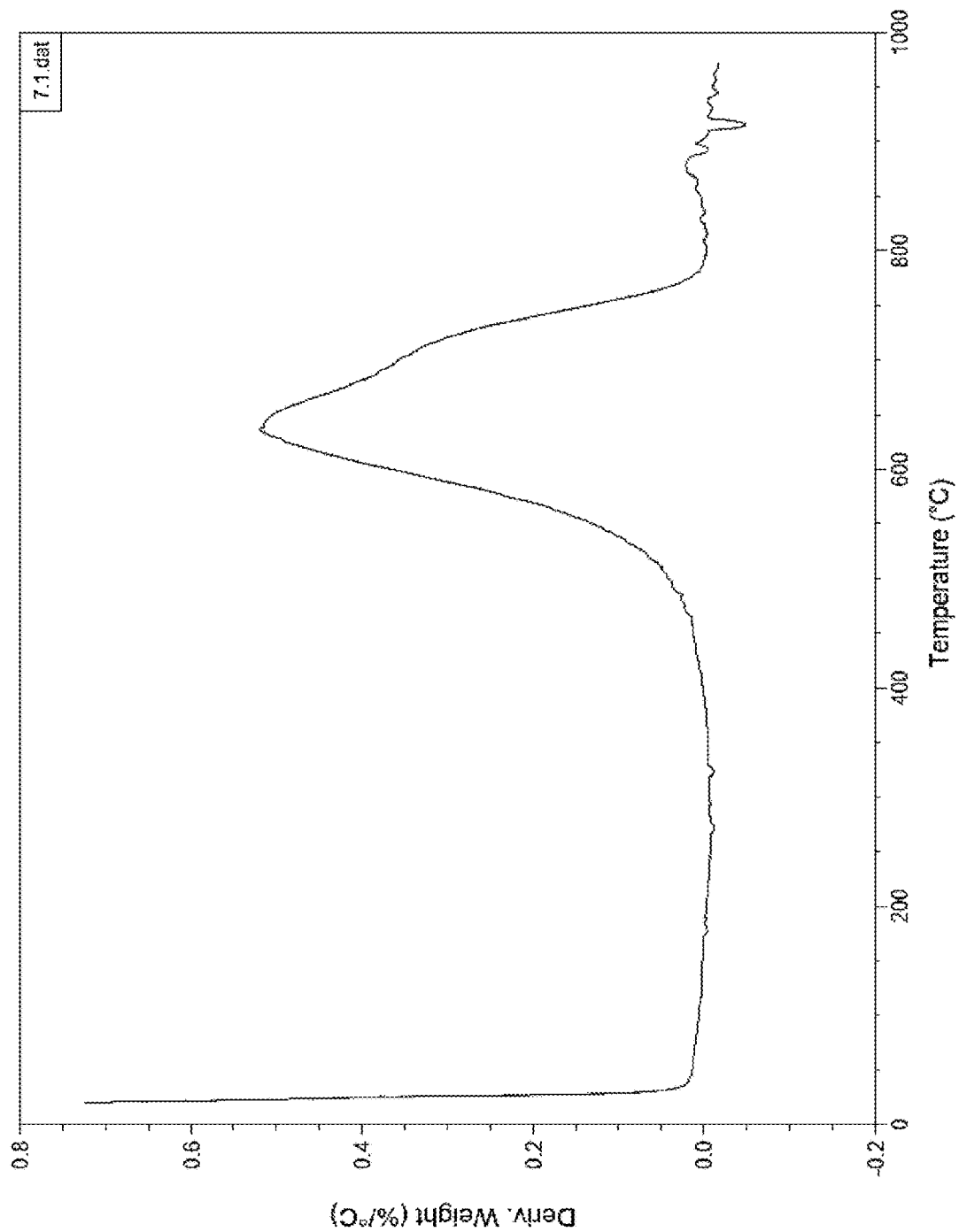
FIG. 24D is a DTG thermogram [Weight derivative (%/° C.)] as a function of temperature in ° C. SW 07 Carbon nanotube nanoparticles without PEI as a reference standard for FIG. 24C.

Results are summarized graphically in FIG. 24A and FIG. 24B which present TGA thermograms and FIG. 24C and FIG. 24D which present DTG thermograms.

FIG. 24A and FIG. 24C show results for nanocomposite particles according to exemplary embodiments of the invention in which SW 07 Carbon nanotube nanoparticles were grafted to for PEI 25,000 MW after xylene extraction.

FIG. 24 B and FIG. 24 D show results SW 07 Carbon nanotube nanoparticles without PEI as a reference standard.

These results demonstrate that PEI grafts to carbon nanotube particles. In this experiment the grafting percentage was calculated as 21% or 84% of the PEI initially added to the reaction.

When compared to previous examples 5 and 6 these results suggest that grafting of PEI to carbon nanotubes was slightly more than for silica particles. Again, use of carbon nanotube particles has the potential to broaden the range of odorants which can be suppressed.

The invention claimed is:

1. A method comprising:
   (a) to a mixture of nanoparticles dispersed in an organic solvent, adding at least 5% poly (ethylene imine) (PEI) relative to the nanoparticles on a w/w basis;
   (b) adding at least 0.1% benzoyl peroxide (BP) relative to said nanoparticles on a w/w basis;
   (c) sonicating the mixture thereby covalently grafting the PEI to the nanoparticles; and
   (d) extracting non-grafted PEI fractions.

2. The method according to claim 1, wherein said nanoparticles comprise one of: fumed silica, methacrylic silica, aluminum oxide ($Al_2O_3$), ZnO, zeolites, $TiO_2$, carbon nanotubes, graphene, and carbon black.

3. The method according to claim 1, further comprising at least one of: adding at least 30% (w/w) PEI relative to the nanoparticles in the mixture, adding at least 100% (w/w) PEI relative to the nanoparticles in the mixture, adding at least 1% (w/w) BP relative to the nanoparticles, and adding at least 2% BP relative to nanoparticles.

4. A method comprising:
   (a) premixing nanoparticles coated with a PEI-grafted coating with polymeric material to form a premix;
   (b) mixing additional polymeric material with the premix to form a final mixture; and
   (c) extruding the final mixture.

5. The method according to claim 4, wherein said polymeric material and/or additional polymeric material are being recycled.

6. The method according to claim 4, comprising adding filler during said mixing.

7. The method according to claim 4, comprising adding filler during said extruding.

8. The method according to claim 4, wherein said polymeric material and said additional polymeric material each independently include at least one material selected from the group consisting of polyvinyl chloride (PVC), Polyethylene (PE, LDPE, HDPE, PEX), polypropylene (PP), polycarbonate (PC), polyamide (PA), polyacrylate, polymethacrylate (PAM), polystyrene (PS), Ethylene vinyl alcohol (EVOH), Ethylene-vinyl acetate (EVA), Isoprene, styrene-isoprene-styrene (SIS) block copolymer, butadiene and Acrylonitrile butadiene styrene (ABS).

9. The method according to claim 4, wherein said final mixture comprises at least 0.01% (w/w) nanoparticles coated with PEI.

10. The method according to claim 4, wherein said final mixture comprises 25% (w/w) or less nanoparticles coated with PEI.

11. A product produced by the method according to claim 4.

12. A method comprising:
(a) dispersing PEI-grafted nanoparticles in a liquid media to produce a suspension;
(b) applying said suspension to a surface of a product; and
(c) evaporating said liquid media.

13. The method according to claim 12, comprising gelation of said liquid media.

14. The method according to claim 12, wherein said liquid media comprises water.

15. The method according to claim 12, wherein said liquid media comprises an organic solvent.

16. The method according to claim 15, wherein said organic solvent comprises ethanol.

17. The method according to claim 12, wherein said nanoparticles coated with PEI comprise at least one member of the group consisting of silica nanoparticles, methacrylic silica nanoparticles, aluminum oxide ($Al_2O_3$) nanoparticles, ZnO nanoparticles, Zeolite nanoparticles, $TiO_2$ nanoparticles, Carbon nanotube nanoparticles and graphene nanoparticles.

18. The method according to claim 12, wherein said nanoparticles coated with PEI are present in said liquid media at a concentration of at least 0.01% w/w.

19. The method according to claim 12, wherein said applying comprises at least one action selected from the group consisting of spraying, brushing, daubing, rolling, smear coating and dipping.

20. The method according to claim 12, wherein said product comprises at least one material selected from the group consisting of polyvinyl chloride (PVC), Polyethylene (PE, LDPE, HDPE, PEX), polypropylene (PP), polycarbonate (PC), polyamide (PA), polyacrylate, polymethacrylate (PAM), polystyrene (PS), high-density polystyrene (HIPS), Ethylene vinyl alcohol (EVOH), Ethylene-vinyl acetate (EVA), Isoprene, styrene-isoprene-styrene (SIS) block copolymer, butadiene and Acrylonitrile butadiene styrene (ABS).

* * * * *